US012590176B2

(12) United States Patent
Kaneko et al.

(10) Patent No.: US 12,590,176 B2
(45) Date of Patent: Mar. 31, 2026

(54) HIPE FOAM AND METHOD FOR PRODUCING SAME

(71) Applicant: JSP CORPORATION, Chiyoda-ku (JP)

(72) Inventors: Yohei Kaneko, Mie (JP); Kenji Haraguchi, Mie (JP)

(73) Assignee: JSP CORPORATION, Chiyoda-ku (JP)

( * ) Notice: Subject to any disclaimer, the term of this patent is extended or adjusted under 35 U.S.C. 154(b) by 721 days.

(21) Appl. No.: 17/760,410

(22) PCT Filed: Feb. 17, 2021

(86) PCT No.: PCT/JP2021/005885
§ 371 (c)(1),
(2) Date: Aug. 9, 2022

(87) PCT Pub. No.: WO2021/166947
PCT Pub. Date: Aug. 26, 2021

(65) Prior Publication Data
US 2023/0075291 A1      Mar. 9, 2023

(30) Foreign Application Priority Data

| Feb. 17, 2020 | (JP) | ................................. | 2020-024743 |
| Feb. 17, 2020 | (JP) | ................................. | 2020-024744 |
| Nov. 24, 2020 | (JP) | ................................. | 2020-194659 |

(51) Int. Cl.
| *C08F 220/18* | (2006.01) |
| *C08F 2/32* | (2006.01) |
| *C08F 212/08* | (2006.01) |
| *C08F 218/04* | (2006.01) |
| *C08J 9/22* | (2006.01) |

(52) U.S. Cl.
CPC .............. *C08F 220/18* (2013.01); *C08F 2/32* (2013.01); *C08F 212/08* (2013.01); *C08F 218/04* (2013.01); *C08J 9/22* (2013.01)

(58) Field of Classification Search
CPC .. C08F 2/30; C08F 2/32; C08F 212/08; C08F 212/36; C08F 218/04; C08F 220/18; C08F 220/1804; C08F 222/1063; C08J 2201/026; C08J 2201/028; C08J 2201/05; C08J 2205/044; C08J 2325/14; C08J 9/22; C08J 9/283; C08L 25/14
See application file for complete search history.

(56) References Cited

U.S. PATENT DOCUMENTS

| 5,563,179 A | 10/1996 | Stone et al. |
| 5,632,737 A | 5/1997 | Stone et al. |
| 5,633,291 A | 5/1997 | Dyer et al. |
| 5,728,743 A | 3/1998 | Dyer et al. |
| 5,786,395 A | 7/1998 | Stone et al. |
| 5,851,648 A | 12/1998 | Stone et al. |
| 6,365,642 B1 | 4/2002 | Dyer et al. |
| 6,376,565 B1 | 4/2002 | Dyer et al. |
| 2013/0210301 A1 | 8/2013 | Hirao et al. |
| 2013/0216814 A1 | 8/2013 | Hirao et al. |
| 2013/0224467 A1 | 8/2013 | Hirao et al. |

FOREIGN PATENT DOCUMENTS

| CN | 1498242 A | 5/2004 |
| EP | 2 612 886 A1 | 7/2013 |
| JP | 11-503177 A | 3/1999 |
| JP | 2003-51 4052 A | 4/2003 |
| JP | 2003-246809 A | 9/2003 |
| JP | 2004-529212 A | 9/2004 |
| JP | 2012-51984 A | 3/2012 |

OTHER PUBLICATIONS

Partial Supplementary European Search Report issued Dec. 13, 2023 in European Patent Application No. 21756782.5, 12 pages.
Extended European Search Report issued Mar. 6, 2024 in European Patent Application No. 21756782.5, 10 pages.
Jiang, Q. et al., "Robust macroporous polymers: Using polyurethane diacrylate as property defining crosslinker," Polymer, vol. 97, May 27, 2016, XP029635005, 6 pages.
English translation of Written Opinion issued Apr. 13, 2021 in PCT/JP2021/005885, 3 pages.
Combined Chinese Office Action and Search Report issued Mar. 17, 2023 in Patent Application No. 202180007315.7 (with English machine translation), 17 pages.
Notice of Reasons for Refusal issued May 30, 2023 in Japanese Patent Application No. 2020-024743 (with English machine translation), 6 pages.
Notice of Reasons for Refusal issued May 30, 2023 in Japanese Patent Application No. 2020-024744 (with English machine translation), 6 pages.
International Search Report Issued Apr. 13, 2021, in PCT/JP2021/005885, filed on Feb. 17, 2021, 2 pages.

*Primary Examiner* — Ana L. Woodward

(74) *Attorney, Agent, or Firm* — Oblon, McClelland, Maier & Neustadt, L.L.P.

(57) ABSTRACT

A HIPE foam may including a vinyl-based crosslinked polymer as a base material resin. The vinyl-based crosslinked polymer may be formed by crosslinking a polymer of a styrene-based monomer and/or an acryl-based monomer. An apparent density $\rho$ of the HIPE foam may be 35 kg/m$^3$ or more and 500 kg/m$^3$ or less. A molecular weight between crosslinking points of the vinyl-based crosslinked polymer forming the HIPE foam may be $2\times10^3$ or more and $2\times10^5$ or less. The HIPE foam may be used as, for example, a machinable material or an impact absorbing material.

20 Claims, 3 Drawing Sheets

HIPE FOAM AND METHOD FOR PRODUCING SAME

CROSS-REFERENCE TO RELATED APPLICATIONS

The present application is the national stage of international application PCT/JP2021/005885, filed on Feb. 17, 2021, and claims the benefit of the filing date of Japanese Appl. No. 2020-024743, 2020-024744, and 2020-194659, respectively filed on Feb. 17, 2020, Feb. 17, 2020, and Nov. 24, 2020.

TECHNICAL FIELD

The present disclosure relates to a HIPE foam suitable for machinable materials, impact absorbing materials, and the like, and a method for producing a porous vinyl-based crosslinked polymer (i.e., HIPE foam) obtained by polymerization of a high internal phase emulsion.

BACKGROUND ART

There has been heretofore known a method for obtaining a porous polymer called a HIPE foam, the method including forming a high internal phase water-in-oil emulsion (i.e., HIPE) in which an aqueous phase including an aqueous liquid such as water is included at a high ratio in an organic phase containing a vinyl-based monomer, a crosslinking agent, an emulsifier, a polymerization initiator, and the like, and polymerizing the organic phase in the emulsion. The porous polymer is a polymer reflecting a dispersion form of the organic phase and the aqueous phase and a dispersion shape of the aqueous phase in the high internal phase emulsion during polymerization, and has a cell structure in which a large number of cells are homogeneously present in the polymer, and an open-cell structure in which a large number of fine pores communicating between the cells are formed. Thus, the HIPE foam is expected to be applied to uses such as absorbing materials and separating materials.

For example, Patent Literature 1 proposes a HIPE foam whose density, glass transition temperature, and toughness index are adjusted. According to Patent Literature 1, such a HIPE foam is excellent in toughness and suitable for articles such as wiping products. Patent Literature 2 proposes an organic porous material (i.e., HIPE foam) obtained by a so-called HIPE method and having a predetermined cell structure. According to Patent Literature 2, such a HIPE foam is used as an adsorbent having high physical strength and an excellent adsorption capacity and adsorption rate, an ion exchanger excellent in durability against swelling and shrinkage, and a packing material for chromatography which is excellent in separation capacity.

CITATIONS LIST

Patent Literature

Patent Literature 1: JP-T-2003-514052
Patent Literature 2: JP-A-2003-246809

SUMMARY OF INVENTION

Problems to be Solved by the Invention

However, when the HIPE foam is used as a machinable material for forming a machined product by machining, the technique in Patent Literature 2 has a possibility that the toughness of the HIPE foam is insufficient, leading to occurrence of cracking or chipping during machining, and the technique in Patent Literature 1 has a possibility that the stiffness of the HIPE foam is insufficient, so that the cut surface is not smooth. Thus, in conventional techniques, it is not possible to obtain a HIPE foam having both toughness and stiffness, and it is not possible to obtain a HIPE foam suitable as a machinable material for forming a machined product by machining.

As described above, a porous polymer (specifically a HIPE foam) obtained by a method for polymerizing an organic phase of a high internal phase water-in-oil emulsion (i.e., a HIPE method) is expected to be used as, for example, a machinable material for forming a machined product by machining. However, for example, the porous polymer disclosed in Patent Literature 2 is hard, but is brittle and low in toughness, and the porous polymer disclosed in Patent Literature 1 is soft, but is low in stiffness. That is, a porous polymer having both toughness and stiffness has not been obtained by the HIPE method, and actually, such a porous polymer has hardly come into practical use in various applications such as machinable materials.

The HIPE foam is also expected to be applied to impact absorbing material use for protecting an object from an external force in the fields of automobile materials, building materials, logistic materials, and the like. However, when the HIPE foam is used as an impact absorbing material, the technique in Patent Literature 1 has a possibility that the energy absorption capacity per unit weight decreases, and the technique in Patent Literature 2 has a possibility that energy absorption performance at high strain is deteriorated. Thus, conventional techniques have not realized a HIPE foam suitable as an impact absorbing material.

The present disclosure has been made in view of such circumstances, and an object of the present disclosure is to provide a HIPE foam suitable for a wide range of applications such as machinable materials and impact absorbing materials, and a method for producing the HIPE foam. Specifically, for example, the present disclosure is directed to providing a HIPE foam which is excellent in smoothness of a cut surface, less likely to be cracked or chipped during machining, and excellent in machinability when used as a machinable material, and a HIPE foam which is excellent in energy absorption capacity per unit weight and undergoes little change in energy absorption performance over a wide range of strain amounts when used as an impact absorbing material. Specifically, for example, the present disclosure is directed to providing a method for producing a HIPE foam which is obtained by polymerization of a high internal phase water-in-oil emulsion and is excellent in stiffness and toughness.

Means for Solving the Problems

A first aspect of the present disclosure is a HIPE foam including, as a base material resin, a crosslinked polymer formed by crosslinking a polymer of a styrene-based monomer and/or an acryl-based monomer, wherein a molecular weight between crosslinking points of the crosslinked polymer is $2 \times 10^3$ or more and $2 \times 10^5$ or less, and an apparent density $\rho$ of the HIPE foam is 35 kg/m$^3$ or more and 500 kg/m$^3$ or less.

A second aspect of the present disclosure is a machinable material including the HIPE foam, wherein a molecular weight between crosslinking points Mc of the crosslinked polymer is $2\times10^3$ or more and $2\times10^4$ or less, a value $S/\rho$ of Charpy impact strength S of the HIPE foam per apparent density $\rho$ of the HIPE foam is 4.5 J·m/kg or more, and a value $E'/\rho$ of a storage elastic modulus E' at 23° C. of the HTPE foam per apparent density $\rho$ of the HIPE foam is 50 kN·m/kg or more.

A third aspect of the present disclosure is an impact absorbing material including the HIPE foam, wherein a glass transition temperature of the crosslinked polymer is 60° C. or higher, a molecular weight between crosslinking points of the crosslinked polymer is $3\times10^3$ or more and $2\times10^5$ or less, an apparent density of the HIPE foam is 35 kg/m³ or more and less than 100 kg/m³, and a ratio of compressive stress at a strain of 10% to compressive stress at a strain of 50% at 23° C. in the HIPE foam is more than 0.70 and 1.0 or less.

A fourth aspect of the present disclosure is a method for producing a HIPE foam, the method including: forming a high internal phase water-in-oil emulsion in which an aqueous phase containing water is included in an organic phase containing a styrene-based monomer and/or an acryl-based monomer, a crosslinking agent, an emulsifier, and a polymerization initiator; and polymerizing the styrene-based monomer and/or the acryl-based monomer in the emulsion, wherein the crosslinking agent is a vinyl-based compound having at least two functional groups selected from a vinyl group and an isopropenyl group in the molecule and contains a first crosslinking agent having a functional group equivalent of 130 g/mol or less and a second crosslinking agent having a functional group equivalent of more than 130 g/mol and 5000 g/mol or less, the addition amount of the crosslinking agent is 7 parts by weight or more and 27 parts by weight or less based on a total of 100 parts by weight of the styrene-based monomer, the acryl-based monomer, and the crosslinking agent, the addition amount of the first crosslinking agent is 3 parts by weight or more and 17 parts by weight or less based on a total of 100 parts by weight of the styrene-based monomer, the acryl-based monomer, and the crosslinking agent, and a ratio of a weight of the first crosslinking agent to a weight of the second crosslinking agent is 0.3 or more and 5 or less.

Advantageous Effects of Invention

In the HIPE foam according to the first aspect, the molecular weight between crosslinking points and the apparent density are adjusted to be within the above-described ranges. Thus, the HIPE foam is suitable for a wide range of applications such as machinable materials and impact absorbing materials.

The machinable material according to the second aspect includes a HIPE foam of which the apparent density $\rho$, the value $S/\rho$ of Charpy impact strength per apparent density, the molecular weight between crosslinking points Mc, and $E'/\rho$ are within the above-described ranges. Thus, the machinable material is excellent in smoothness of a cut surface and in machinability because cracking and chipping are less likely occur during machining.

The impact absorbing material according to the third aspect includes a HIPE foam of which the apparent density, the glass transition temperature, the molecular weight between crosslinking points, and the ratio of compressive stress at a strain of 10% to compressive stress at a strain of 50% are within the above-described ranges. Thus, the impact absorbing material is excellent in energy absorption capacity per unit weight and undergoes little change in energy absorption performance over a wide range of strain amounts.

In the production method according to the fourth aspect, a styrene-based monomer and/or an acryl-based monomer are polymerized in a high internal phase water-in-oil emulsion in which an aqueous phase containing water is included in an organic phase containing the styrene-based monomer and/or acryl-based monomer, a crosslinking agent, an emulsifier, and a polymerization initiator. In the polymerization, the predetermined first crosslinking agent and second crosslinking agent are used at the above-described ratio. This ensures that a HIPE foam excellent in stiffness and toughness can be obtained. The HIPE foam obtained by the production method is suitable for a wide range of applications such as machinable materials and impact absorbing materials.

MODES FOR CARRYING OUT THE INVENTION

Figures 1, 2:
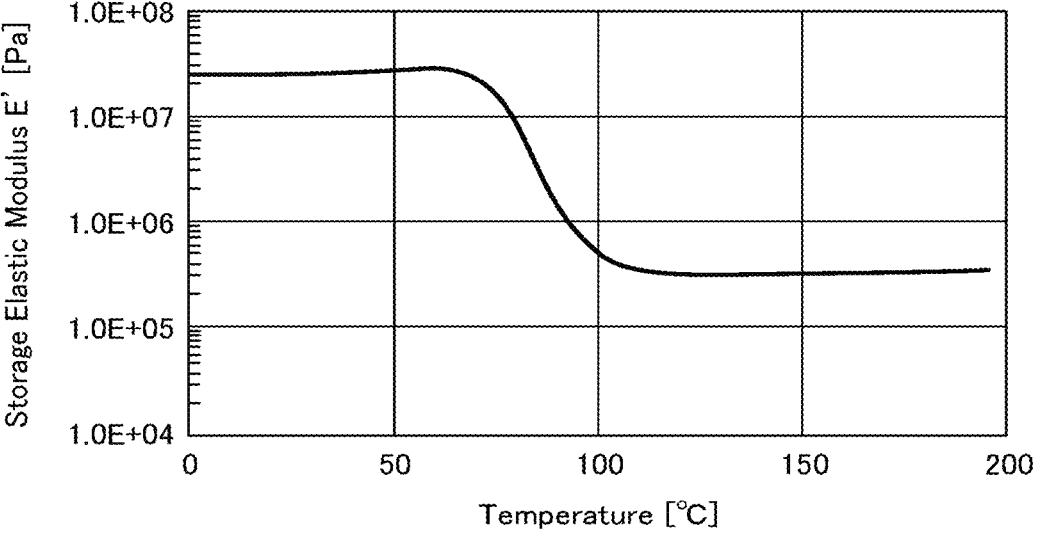
FIG. 1 is a low-vacuum scanning electron micrograph (magnification: 500 times) of a HIPE foam of an example.
FIG. 2 is a DMA curve obtained by dynamic mechanical analysis (i.e., DMA) in an example.

Next, preferred embodiments of the HIPE foam, the porous vinyl-based crosslinked polymer, the machinable material, and the impact absorbing material will be described. Herein, when numerical values or physical property values are put before and after the term "to" to express a range, the term "to" is used in the sense that the range includes the values before and after the term "to". A numerical value or physical property value described as a lower limit means being no less than the numerical value or physical property value, and a numerical value or physical property value described as an upper limit means being no more than the numerical value or physical property value. The terms "parts by weight" and "wt %" are substantially synonymous with "parts by mass" and "mass %", respectively.

First, a HIPE foam according to a first aspect of the present disclosure will be described.

In the HIPE foam according to the first aspect, the molecular weight between crosslinking points of a crosslinked polymer is $2\times10^3$ or more and $2\times10^5$ or less. The apparent density $\rho$ of the HIPE foam is 35 kg/m³ or more and 500 kg/m³ or less. By adjusting the molecular weight between crosslinking points and the apparent density to be within the above-described ranges, for example, physical properties desired for a machinable material and an impact absorbing material are optimized, and the HIPE foam can be suitably applied to the machinable material and impact absorbing material. The physical properties are as described later. If the molecular weight between crosslinking points and the apparent density fall outside the above-described ranges, it is difficult to apply the HIPE foam to the machinable material and the impact absorbing material. A specific reason for this is described later.

Next, a machinable material according to the second aspect will be described. For the HIPE foam according to the first aspect of the present disclosure, the descriptions in a second aspect, a third aspect, and a fourth aspect are appropriately referred to.

[HIPE Foam]

The HIPE foam is generally a porous polymer also called a polyHIPE foam, a polyHIPE material, a high internal phase emulsion porous material, a high internal phase emulsion foam, or the like, and is obtained by, for example, polymerizing a monomer in a high internal phase water-in-oil emulsion in which an aqueous phase is included in an organic phase at a high ratio. The high internal phase emulsion is commonly called HIPE. More specifically, the HIPE foam is a porous vinyl-based crosslinked polymer, e.g., a porous vinyl-based crosslinked polymer obtained by polymerizing a vinyl-based monomer in the presence of a crosslinking agent in a high internal phase water-in-oil emulsion in which an aqueous phase is included in an organic phase at a high ratio. It can also be said that the HIPE foam is a porous cured product obtained by curing a high internal phase emulsion, and the cell wall thereof includes the vinyl-based crosslinked polymer. The cells can also be referred to as pores.

The HIPE foam (i.e., the HIPE foams according to the first to fourth aspects) in the present disclosure has, as a base material resin, a crosslinked polymer formed by crosslinking a polymer of a styrene-based monomer and/or an acryl-based monomer.

The HIPE foam is a polymer (specifically, a porous crosslinked polymer) reflecting a dispersion form of the organic phase and the aqueous phase and a dispersion shape of the aqueous phase (i.e., a dispersion phase) in the high internal phase emulsion during polymerization. As illustrated in FIG. 1, a HIPE foam 1 has a cell structure in which a large number of cells 13 are homogeneously present in a porous crosslinked polymer 11 forming the HIPE foam 1, and an open-cell structure in which a large number of fine pores 14 communicating between the cells are formed. In FIG. 1, the cell 13 is a portion surrounded by a cell wall 12. The fine pore 14 can also be referred to as a micropore, a through-window, a through hole, or a connecting hole.

The HIPE foam is a structure formed by a crosslinked polymer, and therefore forms a relatively brittle polymer which is likely to have low resistance to a load and grinding shear (specifically, shear stress and grinding stress). Because the polymer is hardly stretched in the production process of the HIPE foam, the polymer is less likely to generate molecular orientation and has little anisotropy. The HIPE foam is distinguished from foams produced by stretching during production, such as foams obtained by an extrusion foaming method using an extruder, and foamed bead molded products obtained by in-mold molding of expanded beads obtained by foaming expandable resin beads.

The sizes of the cell and through-hole of the HIPE foam are not particularly limited, but for example, the average diameter of the cells of the HIPE foam is approximately 5 μm or more and 100 μm or less, preferably 20 μm or more and 100 μm or less. The average diameter of the through-holes of the HIPE foam is approximately 1 μm or more and 30 μm or less. Since the through-hole is a hole that is generated in the cell wall and passes through between the cells, the through-hole diameter is typically smaller than the cell diameter.

The average value of the numbers of cells per unit area in the HIPE foam is preferably 120 cells/mm² or more and 2400 cells/mm² or less.

For a method for measuring the average value of the numbers of cells per unit area in the HIPE foam, it is possible to refer to the description in the third aspect.

The HIPE foam has high stiffness, excellent toughness, and a good balance between stiffness and toughness, and is excellent in machinability. Thus, the machined product is particularly suitable for a wooden model for casting described later.

The cell diameter of the HIPE foam can be controlled by adjusting the water droplet diameter of the aqueous phase (i.e., dispersed phase) of the high internal phase emulsion in a production method described later, so that the cell diameter can be made very small. In the HIPE foam, the average cell diameter can be easily adjusted to 100 μm or less. The average cell diameter (in other words, the average diameter of cells) of the HIPE foam is an average value of the equivalent circle diameters of the cells, and the measuring method will be described in examples.

[Use Application]

The HIPE foam is used, for example, for producing a machined product by machining, and can also be used for impact absorbing materials and other applications. Because the HIPE foam includes a vinyl-based crosslinked polymer, and is porous, a lightweight machined product can be obtained by machining. In the following description, the vinyl-based crosslinked polymer is referred to as a "crosslinked polymer" as appropriate.

The machined product is, for example, a model. Examples of the model include various models such as building models of buildings and the like, machine models of machine equipment and the like, vehicle models of cars, trains, and the like, casting models for producing sand molds for casting called wooden models, art models of art works, articles on display, and the like, and pre-product models. Such a model material is produced by machining a material to be cut (i.e., machinable material). Thus, the machinable material is required to be machinable at a high cutting rate, excellent in smoothness of a cut surface, unlikely to be cracked and chipped, less likely to undergo a time-dependent change in size, etc. Examples of the machining include processing with a NC cutting machine or the like, processing with a band saw, and processing with a cutter.

The casting model is, for example, a model which is used for forming a sand mold. Such a model is referred to as a "wooden model" as appropriate. Here, to form a sand mold, first, a casting model is produced as a machined product from the HIPE foam by machining. The casting model is embedded in a mixture of silica sand, a furan resin, a binder, and the like which are sand mold forming materials, and the furan resin mixture is cured by emission of carbon dioxide gas or contact with air. After the curing, the wooden model is released from the cured furan resin mixture to obtain a sand mold which is used as a mold. A casting can be obtained by pouring hot metal such as molten metal into the sand mold and cooling the hot metal. The particle size of a main particle fraction of the silica sand is generally 75 μm to 850 μm. For enhancing the transferability of a surface of the wooden model, it is preferable that the particle fraction of the silica sand at a portion in contact with the wooden model is small. The particle size scale (size) of the silica sand is measured in accordance with JIS G 5901: 2016. In the measured particle size distribution of the silica sand, a screen aperture with the highest weight ratio corresponds to the main particle fraction.

It is preferable that the machinable material including a HIPE foam is used for a casting model, and the machined product is preferably a casting model. In this case, the casting surface of the casting can be made smooth. This is because the crosslinked polymer forming the HIPE foam is excellent in smoothness of a cut surface.

[Apparent Density ρ]

In the case where the apparent density ρ of the HIPE foam is excessively low in the machinable material including the HIPE foam, the HIPE foam is excessively brittle. Thus, chipping or cracking may occur during machining. From the viewpoint of preventing chipping and cracking in machining, the apparent density ρ of the HIPE foam is preferably 50 kg/m$^3$ or more, more preferably 70 kg/m$^3$ or more, and still more preferably 90 kg/m$^3$ or more. On the other hand, in the case where the apparent density of the HIPE foam is excessively high, the HIPE foam is excessively hard, so that the processing rate during machining decreases, leading to deterioration of productivity of the machined product. From the viewpoint of improving the processing rate, the apparent density ρ of the HIPE foam is preferably 500 kg/m$^3$ or less, more preferably 400 kg/m$^3$ or less, and still more preferably 300 kg/m$^3$ or less. The HIPE foam obtained by curing a high internal phase emulsion having an aqueous phase included in an organic phase at a high ratio typically has an apparent density of 500 kg/m$^3$ or less.

The apparent density ρ of the HIPE foam is calculated by dividing the weight by the volume.

The apparent density ρ of the HIPE foam is adjusted to be within the above-described range by adjusting the ratio between the total amount of the vinyl-based monomer, the crosslinking agent, the emulsifier, and the polymerization initiator to the amount of the aqueous phase (specifically, aqueous liquid) in a method for producing a HIPE foam as described later.

[Charpy Impact Strength]

The Charpy impact strength S is an index of the toughness of the HIPE foam. In the case where the value of S/ρ of Charpy impact strength S per apparent density ρ is excessively low in the machinable material including the HIPE foam, the HIPE foam may be brittle, leading to occurrence of chipping and cracking. From the viewpoint of preventing chipping and cracking in machining, S/ρ is preferably 4.5 J·m/kg or more, more preferably 5.0 J·m/kg or more, still more preferably 5.5 J·m/kg or more. S/ρ is preferably 20 J·m/kg or less because the stiffness of the HIPE foam can be increased to further improve the processing accuracy of the HIPE foam, and the shape of a machined product obtained by machining can be easily maintained. The magnitude of the Charpy impact strength S of the HIPE foam highly depends on the apparent density. On the other hand, the apparent density of the HIPE foam is adjusted to be within a predetermined range depending on a use and a purpose thereof. Thus, by setting the value S/ρ of Charpy impact strength S per apparent density ρ within the above-described range, the HIPE foam becomes excellent in cutting property within a predetermined range of apparent densities.

The Charpy impact strength is measured under a notch-free condition at a measurement temperature of 23° C. in accordance with the method described in JIS K 7111:2006.

The value S/ρ of Charpy impact strength per apparent density in the HIPE foam can be increased by, for example, blending a predetermined crosslinking agent in a predetermined amount in a method for producing a HIPE foam as described later. S/ρ is adjusted to be within the above-described range by adjusting the type of a monomer as described later, the blending ratio thereof, the type of a crosslinking agent, the blending ratio thereof, and the like.

[Storage Elastic Modulus E' at 23° C.]

The storage elastic modulus at 23° C. is an index of the hardness of the HIPE foam. In the machinable material including a HIPE foam, it is preferable that the storage elastic modulus E' at 23° C. and the apparent density ρ satisfy the relationship of expression I. That is, the value E'/ρ of the storage elastic modulus E' at 23° C. of the HIPE foam per apparent density ρ is preferably 50 kN·m/kg or more.

$$E'/\rho \geq 50 \text{ kN·m/kg} \tag{I}$$

If E'/ρ is excessively low in the machinable material including the HIPE foam, the HIPE foam is excessively soft, so that machinability is deteriorated, leading to deterioration of smoothness of a cut surface. In addition, there is a possibility that the HIPE foam is easily deformed, so that the size precision of the casting is deteriorated when the machined product is used as a casting model. This is because the casting model is deformed, for example, during formation of a sand mold. From the viewpoint of forming a cut surface excellent in smoothness and enhancing the size precision of a casting, the storage elastic modulus E' at 23° C. per apparent density ρ is 50 kN-m/kg or more, preferably 100 kN·m/kg or more, more preferably 150 kN·m/kg or more. E'/ρ is preferably 250 kN·m/kg or less because the processing rate of the HIPE foam can be increased and occurrence of chipping and cracking during processing can be further suppressed.

The storage elastic modulus E' of the HIPE foam is measured by performing dynamic mechanical analysis on the HIPE foam under the conditions of frequency: 1 Hz, load: 98 mN, and deformation mode: compression. The frequency in the measurement conditions is a parameter for regulating the cycle of deformation of the measurement sample. The load of the measurement conditions is a force applied to the measurement sample. By setting the above-described measurement conditions, occurrence of a deviation between deformation to be applied to the HIPE foam and a response thereto can be suppressed. The HIPE foam can be restored to a state before application of the load (i.e., the initial state) without causing plastic deformation in the HIPE foam. Thus, the storage elastic modulus E' of the HIPE foam can be appropriately evaluated by the above-described measurement.

The magnitude of the storage elastic modulus E' of the HIPE foam highly depends on the apparent density ρ. On the other hand, the apparent density ρ of the HIPE foam is adjusted within a predetermined range depending on a use and a purpose thereof. Thus, by setting the value E'/ρ of the storage elastic modulus E' per apparent density ρ within the above-described range, the HIPE foam becomes excellent in cutting property within a predetermined range of apparent densities.

The storage elastic modulus E' per apparent density ρ in the HIPE foam can be increased by, for example, blending a monomer that increases the storage elastic modulus of a polymer to be obtained. The storage elastic modulus E' per apparent density $\rho$ in the HIPE foam is adjusted to be within the above-described range by adjusting the type of a monomer as described later, the blending ratio thereof, the type of a crosslinking agent, the blending ratio thereof, and the like.

[Molecular Weight Between Crosslinking Points Mc]

The molecular weight between crosslinking points Mc is an index of the degree of crosslinking in the HIPE foam. In the case where the molecular weight between crosslinking points Mc of the crosslinked polymer forming the HIPE foam is excessively large (i.e., the crosslinking density is excessively low) in the machinable material including the HIPE foam, the flowability of the resin in micro regions in the HIPE foam during machining is high, so that the resin is easily scraped off by a processing blade of a mill or the like, leading to a deterioration of smoothness of a cut surface. From the viewpoint of forming a cut surface excellent in smoothness, the molecular weight between crosslinking points Mc is preferably $2\times10^4$ or less, more preferably $1\times10^4$ or less, still more preferably $8\times10^3$ or less, and particularly preferably $5\times10^3$ or less. From the viewpoint of enabling further suppression of chipping and cracking during machining by suppressing deterioration of toughness, the molecular weight between crosslinking points Mc is preferably $2\times10^3$ or more, more preferably $3\times10^3$ or more, and still more preferably $4\times10^3$ or more.

The molecular weight between crosslinking points Mc of the HIPE foam is measured as follows. Dynamic mechanical analysis (DMA) is performed on the HIPE foam under the conditions of frequency: 1 Hz, load: 98 mN and deformation mode: compression. Here, the crosslinked polymer forming the HIPE foam makes a transition from a glassy state to a rubbery state as the temperature rises, and therefore in a DMA curve obtained by plotting a temperature on the abscissa and the storage elastic modulus E' on the ordinate, the storage elastic modulus E' starts to rapidly decrease at a glass transition temperature Tg (see FIG. 2). This is followed by a plateau region (rubber-like flat portion) in the DMA curve. Since E' is proportional to the temperature in this plateau region, the molecular weight between crosslinking points Mc can be calculated from the following expression (II).

$$Mc = 2(1+\mu)\rho RT/E' \qquad (II)$$

In expression (II), $\mu=0.5$, where $\mu$ is a Poisson's ratio. $\rho$ is the apparent density kg/m$^3$ of the HIPE foam, and R is the gas constant: 8.314 J/K/mol. T and E' are a temperature (unit: K) and a storage elastic modulus (unit: kPa), respectively, at a certain point in the rubber-like flat portion. T and E' are numerical values determined at the rubber-like flat portion. From the viewpoint of enabling the molecular weight between crosslinking points Mc to be appropriately calculated, it is preferable that the E' is measured in a temperature range of Tg+50° C. to Tg+80° C. (where Tg is a glass transition temperature of the HIPE foam). The Poisson's ratio is a value unique to a material, and is obtained by dividing a strain generated in a perpendicular direction by a strain generated in a parallel direction in application of stress to an object, and multiplying the resulting quotient by −1. Theoretically, the Poisson's ratio takes a value in the range of −1 to 0.5, and in the case where the value of the Poisson's ratio is a negative, it is meant that when a material is collapsed in a longitudinal direction, the material is also collapsed in a lateral direction. In contrast, in the case where the value of the Poisson's ratio is positive, it is meant that when a material is collapsed in a longitudinal direction, the material is stretched in a lateral direction. Under the measurement conditions in the dynamic mechanical analysis, the strain generated in the crosslinked polymer forming the HIPE foam is extremely small, and it can be considered that there is no volume change. Thus, the storage elastic modulus E' and the molecular weight between crosslinking points Mc are calculated under a constant volume condition, i.e., with the Poisson's ratio set to 0.5.

The molecular weight between crosslinking points Mc of the crosslinked polymer forming the HIPE foam can be decreased by blending a crosslinking agent in a method for producing a HIPE foam as described later. The molecular weight between crosslinking points Mc is adjusted to be within the above-described range by adjusting the type of a crosslinking agent as described later, the blending ratio thereof, the type of a monomer, the blending ratio thereof, and the like.

[Average Cell Diameter]

The average cell diameter of the HIPE foam is preferably 100 μm or less. In this case, the machined product of the HIPE foam is more suitable as a model for casting (i.e., a casting model) using a sand mold. This is because ingress of casting sand such as silica sand in cells of the HIPE foam forming the machined product is suppressed. That is, it is possible to prevent the casting model from catching the casting sand. In this case, even when the surface of the casting model is not subjected to a coating treatment, catch of the casting sand can be suppressed, so that it is possible to reduce the production cost and simplify the production process. In addition, since the average cell diameter of the HIPE foam is small, it is possible to obtain a machined product having a clear appearance (i.e., fine texture) and high designability.

Typical example of the heretofore used machinable material include hard polyurethane foams. From the viewpoint of increasing the machining rate, a hard polyurethane foam having a relatively low apparent density is typically used. However, since the average cell diameter of such a hard polyurethane foam is about 150 to 300 μm, sand such as silica sand easily enters cells of the hard polyurethane foam. This may cause a situation in which when a casting model including a hard polyurethane foam is embedded in a sand mold, sand is caught due to ingress of the sand in cells of the hard polyurethane foam, so that it is sometimes difficult to release the casting model. Thus, in general, a coating layer for preventing catch of sand is formed on the surface of a casting model of a hard polyurethane foam.

In a hard polyurethane foam, it is necessary to decrease the expansion ratio (i.e., increase the density) for reducing the average cell diameter. In this case, there is a possibility that the hardness of the hard polyurethane foam increases, so that the machining rate decreases, leading to deterioration of productivity. Thus, in the hard polyurethane foam, it is difficult to increase the machining rate while suppressing catch of sand.

In the machinable material including the HIPE foam, the average cell diameter of the HIPE foam is more preferably 80 μm or less, still more preferably 70 μm or less, particularly preferably 50 μm or less, from the viewpoint of ensuring that the casting model is easily released, the necessity of formation of the coating layer is eliminated, and a machined product having high designability can be obtained. The average cell diameter of the HIPE foam is preferably 5 μm or more, more preferably 10 μm or more, still more preferably 15 μm or more because the time required for dewatering and drying steps in the production process is easily shortened, so that productivity can be improved.

The average cell diameter of the HIPE foam is measured by image analysis. The measurement method is described in examples.

The average cell diameter of the HIPE foam is adjusted to be within the above-described range by adjusting the stirring rate, the stirring time, the type of an emulsifier, the addition amount of the emulsifier, the viscosity of an emulsion, and the like in an emulsification step in a production method described later.

[Glass Transition Temperature]

In the machinable material including the HIPE foam, the glass transition temperature of the crosslinked polymer forming the HIPE foam is preferably 40° C. or higher and 120° C. or lower. In this case, a HIPE foam excellent in machinability can be stably obtained. For securing sufficient hardness at an environmental temperature during machining and preventing a change in size of the machined product in a high-temperature environment, the glass transition temperature of the HIPE foam is more preferably 50° C. or higher, still more preferably 60° C. or higher. The glass transition temperature of the HIPE foam is preferably 100° C. or lower because deterioration of toughness of the HIPE foam can be further suppressed, and occurrence of chipping and cracking during machining can be further suppressed.

The glass transition temperature of the HIPE foam is measured by differential scanning calorimetry (DSC) analysis based on JIS K 7121:1987. The glass transition temperature is a glass transition temperature at a midpoint of the DSC curve. As conditioning of a test piece, that in "(3) Measurement of glass transition temperature after certain heat treatment" is adopted.

The glass transition temperature of the HIPE foam is adjusted to be within the above-described range by adjusting the type of a vinyl-based monomer, the blending ratio thereof, the type of a crosslinking agent, the blending ratio thereof, and the like in a method for producing a HIPE foam as described later.

[Constituent Component]

Specifically, the crosslinked polymer forming the HIPE foam is a polymer of a monofunctional vinyl-based monomer and a crosslinking agent, and has a component derived from the monofunctional vinyl-based monomer. Herein, the monofunctional vinyl-based monomer is a styrene-based monomer, an acryl-based monomer, or the like. As the vinyl-based monomer, a styrene-based monomer and/or an acryl-based monomer can be used.

The base material resin of the HIPE foam is a crosslinked polymer obtained by crosslinking a polymer of a vinyl-based monomer.

It is preferable that the crosslinked polymer includes a polymer of a vinyl monomer containing a styrene-based monomer and/or an acryl-based monomer, and a crosslinking agent. That is, it is preferable that the crosslinked polymer has a styrene-based monomer component and/or an aryl-based monomer component. In this case, the balance between toughness and stiffness of the HIPE foam is further improved. The styrene-based monomer component means a constituent unit derived from a styrene-based monomer in the crosslinked polymer, and the acryl-based monomer component means a constituent unit derived from an acryl-based monomer in the crosslinked polymer. The content ratio of the styrene-based monomer component and/or the acryl-based monomer component in the crosslinked polymer is preferably 50 wt % or more, more preferably 60 wt % or more, still more preferably 70 wt % or more, particularly preferably 80 wt % or more.

Examples of the styrene-based monomer include styrene compounds such as styrene, α-methylstyrene, o-methylstyrene, m-methylstyrene, p-methylstyrene, p-ethylstyrene, 2,4-dimethylstyrene, p-methoxystyrene, p-n-butylstyrene, p-t-butylstyrene, o-chlorostyrene, m-chlorostyrene, p-chlorostyrene, 2,4,6-tribromostyrene, styrenesulfonic acid, and sodium styrenesulfonate. Examples of the acryl-based monomer include: acrylic acid alkyl esters such as methyl acrylate, ethyl acrylate, propyl acrylate, butyl acrylate, 2-ethylhexyl acrylate, hydroxyethyl acrylate, cyclohexyl acrylate, phenyl acrylate, benzyl acrylate, isobornyl acrylate, dicyclopentanyl acrylate, and adamantyl acrylate; and methacrylic acid alkyl esters such as methyl methacrylate, ethyl methacrylate, propyl methacrylate, butyl methacrylate, 2-ethylhexyl methacrylate, hydroxyethyl methacrylate, hydroxypropyl methacrylate, cyclohexyl methacrylate, phenyl methacrylate, benzyl methacrylate, isobornyl methacrylate, dicyclopentanyl methacrylate, and adamantyl methacrylate. In addition, examples of the acryl-based monomer include acrylamide, methacrylamide, and acrylonitrile.

It is preferable that the crosslinked polymer includes a copolymer of a vinyl-based monomer containing styrene and/or methyl methacrylate and a (meth)acrylic acid alkyl ester other than methyl methacrylate, and a crosslinking agent. In this case, a HIPE foam including a crosslinked polymer having desired physical properties is easily obtained. The (meth)acrylic acid alkyl ester is an ester of (meth)acrylic acid and an alcohol, preferably an ester of (meth)acrylic acid and an alcohol having 1 to 20 carbon atoms.

When the vinyl-based monomer contains styrene and/or methyl methacrylate, the content ratio of styrene and/or methyl methacrylate in the vinyl-based monomer is preferably 40 wt % or more, more preferably 50 wt % or more, and still more preferably 60 wt % or more. The weight ratio of styrene and/or methyl methacrylate to the (meth)acrylic acid alkyl ester other than methyl methacrylate is preferably 40:60 to 90:10, and more preferably 50:50 to 80:20. In this case, effects such as reduction of the production cost and easy adjustment of desired physical properties are obtained. The (meth)acrylic acid means acrylic acid and/or methacrylic acid.

From the viewpoint of making it possible to stably obtain a HIPE foam (specifically, crosslinked polymer) which is excellent in physical properties and has a desired glass transition temperature, the number of carbon atoms in the alkyl group forming the (meth)acrylic acid alkyl ester other than methyl methacrylate is preferably 1 to 20, more preferably 2 to 18, still more preferably 3 to 16, and even more preferably 4 to 12. Among these, butyl acrylate is particularly preferably used.

The crosslinked polymer has a crosslinked structure and contains a crosslinking agent component. The crosslinking agent component is a constituent unit derived from the crosslinking agent in the crosslinked polymer. The crosslinking agent is a compound which forms a crosslinked structure in a polymer by crosslinking (i.e., binding) polymer chains forming the polymer. As the crosslinking agent, for example, a vinyl-based compound having at least two functional groups selected from a vinyl group and an isopropenyl group in the molecule is used. When the crosslinked polymer contains a predetermined amount of the crosslinking agent component, the value of the Charpy impact strength of the HIPE foam can be increased, and value of the molecular weight between crosslinking points of the crosslinked polymer can be decreased. The vinyl-based compound also includes compounds containing a vinyl group and/or an isopropenyl group in the structure of the functional group like an acryloyl group and a methacryloyl group. From the viewpoint of stably polymerizing the crosslinking agent, the number of functional groups in the vinyl-based compound is preferably 6 or less, preferably 5 or less, still more preferably 4 or less. From the viewpoint of more easily enhancing the machinability of the HIPE foam, it is preferable that the crosslinking agent has functional groups at least at both ends of the molecule, and it is more preferable that the crosslinking agent has functional groups only at both ends of the molecule.

The crosslinked polymer may contain, for example, a single kind of crosslinking agent component prepared using a single kind of crosslinking agent. The crosslinked polymer preferably contains a hard crosslinking agent component derived from a hard crosslinking agent having a relatively short molecular chain and a soft crosslinking agent component derived from a soft crosslinking agent having a relatively long molecular chain because the stiffness of the HIPE foam is easily enhanced while the toughness of the HIPE foam is enhanced. In this case, the molecular weight between crosslinking points Mc, the value S/ρ of Charpy impact strength per apparent density, and the value E'/ρ of the storage elastic modulus at 23° C. per apparent density in the HIPE foam are easily adjusted within the above-described ranges. It is noted that the hard crosslinking agent can be referred to as a first crosslinking agent, and the soft crosslinking agent can be referred to as a second crosslinking agent.

The hard crosslinking agent (i.e., first crosslinking agent) is preferably a vinyl-based compound having a functional group equivalent of 130 g/mol or less. Such a hard crosslinking agent has a relatively short molecular chain, and therefore may reduce the mobility of the polymer molecular chain when copolymerized with a vinyl-based monomer. By using the hard crosslinking agent, the stiffness of the HIPE foam is easily enhanced. From the viewpoint of easily producing the HIPE foam, the lower limit of the functional group equivalent of the hard crosslinking agent is preferably about 30 g/mol, more preferably 40 g/mol, still more preferably 50 g/mol, even more preferably 60 g/mol. The upper limit of the functional group equivalent of the hard crosslinking agent is preferably 120 g/mol. The functional group equivalent of the hard crosslinking agent means a molar mass of the hard crosslinking agent per functional group. The unit of the functional group equivalent can also be expressed as [g/eq]. For the functional group equivalent of the hard crosslinking agent, the third aspect described later is the same as described here.

The soft crosslinking agent (i.e., second crosslinking agent) is preferably a vinyl-based compound having a functional group equivalent of more than 130 g/mol and 5000 g/mol or less. Such a soft crosslinking agent has a relatively long molecular chain, and therefore may be capable of crosslinking polymer molecular chains without significantly reducing the mobility of the polymer molecular chain when copolymerized with a vinyl-based monomer. By using the soft crosslinking agent, the toughness of the HIPE foam is easily enhanced. From the viewpoint of the handleability of the HIPE foam, the upper limit of the functional group equivalent of the soft crosslinking agent is preferably about 3000 g/mol, more preferably 2000 g/mol, still more preferably 1000 g/mol. The lower limit of the functional group equivalent of the soft crosslinking agent is preferably about 150 g/mol, more preferably 180 g/mol, still more preferably 200 g/mol. The functional group equivalent of the soft crosslinking agent means a molar mass of the soft crosslinking agent per functional group. The unit of the functional group equivalent can also be expressed as [g/eq]. For the functional group equivalent of the soft crosslinking agent, the third aspect described later is the same as described here.

From the viewpoint of further improving the above-described effects, specifically, more easily enhancing the toughness and stiffness of the HIPE foam, the functional group equivalent of the soft crosslinking agent is larger than the functional group equivalent of the hard crosslinking agent preferably by 60 g/mol or more, more preferably by 80 g/mol or more, still more preferably by 100 g/mol or more, even more preferably by 120 g/mol or more. In other words, the difference between the functional group equivalent of the soft crosslinking agent and the functional group equivalent of the hard crosslinking agent is preferably 60 g/mol or more, more preferably 80 g/mol or more, still more preferably 100 g/mol or more, even more preferably 120 g/mol or more. When two or more types of hard crosslinking agents are used, a weight average value of functional group equivalents of all hard crosslinking agents is calculated, and this value is taken as a functional group equivalent of the hard crosslinking agent. Similarly, when two or more types of soft crosslinking agents are used, a weight average value of functional group equivalents of all soft crosslinking agents is calculated, and this value is taken as a functional group equivalent of the soft crosslinking agent.

Examples of the vinyl-based compound that is used as the hard crosslinking agent include vinyl-based compounds such as divinylbenzene (i.e., DVB); triallyl isocyanurate; and esters of a polyhydric alcohol and (meth)acrylic acid. Examples of the ester of a polyhydric alcohol and (meth) acrylic acid include vinyl-based compounds such as butanediol (meth)acrylates such as butanediol diacrylate; trimethylolpropane (meth)acrylates such as trimethylolpropane triacrylate; hexanediol (meth)acrylates such as hexanediol diacrylate; and pentaerythritol (meth)acrylates such as pentaerythritol tetraacrylate. It is to be noted that the number of functional groups in the hard crosslinking agent is 2 or more. The functional group is preferably a vinyl group and/or an isopropenyl group. There may be one or more hard crosslinking agents. That is, there may be one or more hard crosslinking agent components forming the crosslinked polymer. From the viewpoint of easily adjusting the stiffness of the HIPE foam, it is preferable to use divinylbenzene and/or butanediol (meth)acrylate as the hard crosslinking agent. For the vinyl-based compound that is used as a hard crosslinking agent, the third aspect described later is the same as described here.

Examples of the vinyl-based compound that is used as the soft crosslinking agent include esters of a polyhydric alcohol and (meth)acrylic acid, esters of polyether glycol and (meth) acrylic acid, esters of a urethane oligomer and (meth)acrylic acid, esters of an epoxy oligomer and (meth)acrylic acid, and (meth)acrylic-modified silicone. More specific examples of the vinyl-based compound include nonanediol (meth)acrylates such as nonanediol diacrylate; decanediol (meth)acrylates such as decanediol diacrylate; polyethylene glycol (meth)acrylates such as polyethylene glycol diacrylate; polypropylene (meth)acrylates such as polypropylene glycol diacrylate; polytetramethylene glycol (meth)acrylates such as polytetramethylene glycol diacrylate; polyglycerin (meth)acrylates such as polyglycerin diacrylate; urethane (meth)acrylates such as urethane diacrylate; epoxy (meth) acrylates such as epoxy diacrylate; polyester (meth)acrylates such as polyester diacrylate; (meth)acrylic-modified silicones such as (meth)acrylic-modified silicone on both ends; caprolactone-modified isocyanurate such as caprolactone-modified tris-isocyanurate; and ethoxylated bisphenol A (meth)acrylates such as ethoxylated bisphenol A dimethacrylate. It is to be noted that the number of functional groups in the soft crosslinking agent is 2 or more. The functional group is preferably a vinyl group and/or an isopropenyl group. There may be one or more soft crosslinking agents. That is, there may be one or more soft crosslinking agent components forming the crosslinked polymer. From the viewpoint of easily adjusting the toughness of the HIPE foam, it is preferable to use polyethylene glycol di(meth)acrylate as the soft crosslinking agent. In this case, the number of repeating structural units derived from ethylene glycol in the polyethylene glycol di(meth)acrylate is preferably 3 to 23. For the vinyl-based compound that is used as a soft crosslinking agent, the third aspect described later is the same as described here.

Table 1 shows the molecular weights and the molecular weights per functional group (i.e., functional group equivalents) of typical crosslinking agents. The description of the typical crosslinking agents shown in Table 1 is also applicable to the third aspect described later.

the styrene-based monomer is preferably 50 wt % or more, more preferably 80 wt % or more, still more preferably 90 wt % or more.

When the crosslinked polymer includes a copolymer of at least methyl methacrylate, styrene, a (meth)acrylic acid alkyl ester other than methyl methacrylate, and a crosslinking agent, the total content of the methyl methacrylate component and the styrene component in the crosslinked polymer is preferably 30 parts by weight or more and 80 parts by weight or less, more preferably 40 parts by weight or more and 70 parts by weight or less, based on a total of 100 parts by weight of the vinyl-based monomer component and the crosslinking agent component forming the crosslinked polymer. In this case, the content of the (meth)acrylic acid alkyl ester other than methyl methacrylate in the crosslinked polymer is preferably 5 parts by weight or more and 50 parts by weight or less, more preferably 10 parts by weight or more and 40 parts by weight or less, still more preferably 15 parts by weight or more and 30 parts by weight or less, based on a total of 100 parts by weight of the vinyl-based monomer component and the crosslinking agent

TABLE 1

| Type of Crosslinking Agent | Number of Functional Groups | Molecular Weight Mw | Molecular Weight per Functional Group (g/mol) |
| --- | --- | --- | --- |
| DVB (divinylbenzene) | 2 | 130 | 65 |
| BDODA (butanediol diacrylate) | 2 | 198 | 99 |
| TMPTA (trimethylolpropane triacrylate) | 3 | 338 | 113 |
| HDODA (hexanediol diacrylate) | 2 | 226 | 113 |
| HDODMA (hexanediol dimethacrylate) | 2 | 254 | 127 |
| NDODA (nonanediol diacrylate) | 2 | 268 | 134 |
| PEGDA (polyethylene glycol diacrylate) | 2 | 508 | 254 |
| UDA (urethane diacrylate) | 2 | 1500 | 750 |
| EpDA (epoxy diacrylate) | 2 | 1500 | 750 |
| Methacrylic-modified silicone (both ends modified type) | 2 | 4800 | 2400 |

When the crosslinked polymer includes a copolymer of at least a styrene-based monomer, an acrylic acid alkyl ester other than methyl methacrylate, and a crosslinking agent, the content of the styrene-based monomer component in the crosslinked polymer is preferably 30 parts by weight or more and 90 parts by weight or less, more preferably 40 parts by weight or more and 80 parts by weight or less, still more preferably 50 parts by weight or more and 70 parts by weight or less, based on a total of 100 parts by weight of the vinyl-based monomer component and the crosslinking agent component forming the crosslinked polymer, from the viewpoint of easily adjusting the molecular weight between crosslinking points Mc, the value S/ρ of Charpy impact strength per apparent density, and the value E'/ρ of the storage elastic modulus at 23° C. per apparent density in the HIPE foam to be within the above-described ranges, and further improving the balance between the toughness and the stiffness of the HIPE foam. From the same viewpoint, the content of the (meth)acrylic acid alkyl ester component other than methyl methacrylate in the crosslinked polymer is preferably 5 parts by weight or more and 50 parts by weight or less, more preferably 10 parts by weight or more and 40 parts by weight or less, still more preferably 15 parts by weight or more and 30 parts by weight or less, based on a total of 100 parts by weight of the vinyl-based monomer component and the crosslinking agent component forming the crosslinked polymer. As the styrene-based monomer, styrene is preferably used, and the content ratio of styrene in component forming the crosslinked polymer. Further, in this case, the content ratio of the methyl methacrylate component is preferably 50 wt % or more, more preferably 60 wt % or more, and still more preferably 70 wt % or more, based on a total of 100 wt % of the methyl methacrylate component and the styrene component.

From the viewpoint of easily adjusting the molecular weight between crosslinking points Mc, the value S/ρ of Charpy impact strength per apparent density, and the value E'/ρ of the storage elastic modulus at 23° C. per apparent density in the HIPE foam to be within the above-described ranges, the content of the crosslinking agent component (specifically, the total content of the soft crosslinking agent component and the hard crosslinking agent component) in the crosslinked polymer is preferably 7 parts by weight or more and 27 parts by weight or less, more preferably 8 parts by weight or more and 26 parts by weight or less, based on a total of 100 parts by weight of the vinyl-based monomer component and the crosslinking agent component forming the crosslinked polymer.

From the viewpoint of easily adjusting the molecular weight between crosslinking points Mc, the value S/ρ of Charpy impact strength per apparent density, and the value E'/ρ of the storage elastic modulus at 23° C. per apparent density in the HIPE foam to be within the above-described ranges, the content of the hard crosslinking agent component in the crosslinked polymer is preferably 3 parts by weight or more and 17 parts by weight or less, preferably 4 parts by weight or more and 16 parts by weight or less, based on a total of 100 parts by weight of the vinyl-based monomer component and the crosslinking agent component forming the crosslinked polymer. From the same viewpoint, the content of the soft crosslinking component in the crosslinked polymer is preferably 2 parts by weight or more and 18 parts by weight or less, preferably 3 parts by weight or more and 16 parts by weight or less, based on a total of 100 parts by weight of the vinyl-based monomer component and the crosslinking agent component forming the crosslinked polymer. From the same viewpoint, the weight ratio of the hard crosslinking agent component to the soft crosslinking agent component is preferably 0.3 or more and 5 or less, more preferably 0.4 or more and 4 or less.

[Production Method]

The HIPE foam is produced by polymerizing a high internal phase emulsion, specifically, polymerizing a high internal phase water-in-oil emulsion. The organic phase of the high internal phase water-in-oil emulsion is a continuous phase containing a vinyl-based monomer, a crosslinking agent, an emulsifier, a polymerization initiator, and the like, and the aqueous phase is a dispersed phase containing water such as deionized water. Specifically, a high internal phase emulsion porous material (HIPE foam) can be produced by carrying out an emulsification step, a polymerization step, and a drying step as follows.

First, an aqueous liquid (aqueous phase) containing water is added dropwise to an oily liquid (organic phase) containing organic substances such as a vinyl-based monomer, a crosslinking agent, an emulsifier, and a polymerization initiator with stirring, thereby preparing a high internal phase water-in-oil emulsion (emulsification step). In the emulsification step, the high internal phase emulsion can be produced by adding the aqueous liquid to the oily liquid in such a manner that the volume ratio of the aqueous phase to the organic phase is, for example, 3 or more. The ratio of the aqueous phase included in the organic phase can be adjusted by a weight ratio between the organic phase and the aqueous phase. The content of the aqueous phase in the high internal phase emulsion is preferably 300 to 3000 parts by weight, more preferably 300 to 1600 parts by weight, still more preferably 350 to 1400 parts by weight, particularly preferably 400 to 1200 parts by weight, based on 100 parts by weight of the organic phase. Subsequently, the high internal phase emulsion is heated to polymerize the vinyl-based monomer, the crosslinking agent, and the like of the organic phase, thereby obtaining a polymerized product (specifically, crosslinked polymer containing water) (polymerization step). Thereafter, the polymerized product is dried to obtain a HIPE foam including a crosslinked polymer (drying step).

The stirring rate in the emulsification step is not particularly limited, and can be adjusted to be within the range of, for example, 0.01 kW/m$^3$ to 5 kW/m$^3$ in terms of stirring power density, preferably 0.1 kW/m$^3$ to 5 kW/m$^3$ in terms of stirring power density. In the emulsification step, a method can be adopted in which emulsification is performed by starting stirring with an oily liquid and an aqueous liquid put in a stirring vessel, or emulsification is performed by starting stirring with only an oily liquid put in a stirring vessel, and putting an aqueous liquid into the vessel with a pump or the like under stirring. The addition rate of the aqueous liquid in this case is not particularly limited, and can be adjusted to be within the range of, for example, 10 wt %/min to 1000 wt %/min based on 100 wt % of the oily liquid. Examples of the method for emulsification include a batch-type emulsification step of performing emulsification using a stirring vessel equipped with a stirrer, or a centrifugal shaker, and a continuous emulsification step of continuously supplying and mixing an oily liquid and an aqueous liquid in a line equipped with a static mixer, a mesh, and the like. The method for emulsification is not particularly limited. The stirring power density (kW/m$^3$) is determined by dividing the power (kW) of stirring by a stirrer or the like provided in the vessel by the volume (m$^3$) of the contents of the vessel.

The aqueous phase can contain water such as deionized water, a polymerization initiator, an electrolyte, and the like. In the emulsification step, for example, an oily liquid and an aqueous liquid are each prepared, and the aqueous liquid is added to the oily liquid under stirring to prepare a high internal phase emulsion. In the emulsification step, additives such as a flame retardant, a light resistance agent, and a colorant can be appropriately blended.

The polymerization initiator is used for initiating polymerization of the vinyl-based monomer such as a styrene-based monomer and/or an acryl-based monomer. As the polymerization initiator, for example, a radical polymerization initiator can be used.

Specifically, organic peroxides such as dilauroyl peroxide (LPO), 1,1,3,3-tetramethylbutylperoxy-2-ethylhexanoate, di(3,5,5-trimethylhexanoyl)peroxide, t-butyl peroxypivalate, t-hexyl peroxypivalate, t-butyl peroxyneoheptanoate, t-butyl peroxyneodecanoate, t-hexyl peroxyneodecanoate, di(2-ethylhexyl)peroxydicarbonate, di(4-t-butylcyclohexyl) peroxydicarbonate, 1,1,3,3-tetramethylbutyl peroxyneodecanoate, and benzoyl peroxide; azo compounds such as 2,2'-azobisisobutyronitrile, 2,2'-azobis(4-methoxy-2,4-dimethylvaleronitrile), 2,2'-azobis(4-dimethylvaleronitrile), dimethyl-2,2'-azobis(2-methylpropionate), and 2,2'-azobis (2-methylbutyronitrile); and the like are used. For the polymerization initiator, one or more types of substances can be used. The polymerization initiator can be added to the organic phase and/or the aqueous phase. When the polymerization initiator is added to the aqueous phase, a water-soluble polymerization initiator such as 2,2'-azobis(2-(2-imidazoline-2-yl)propane)dihydrochloride, 2,2'-azobis(2-methylpropionamidine dihydrochloride, potassium persulfate or ammonium persulfate may be used. The addition amount of the polymerization initiator can be, for example, in the range of 0.1 to 5 parts by weight based on a total of 100 parts by weight of the vinyl-based monomer and the crosslinking agent.

From the viewpoint of suppressing boiling of water during polymerization, the one-hour half-life decomposition temperature of the polymerization initiator is preferably 95° C. or lower, and more preferably 90° C. or lower. For suppressing decomposition of the polymerization initiator at room temperature from the viewpoint of safety, the one-hour half-life decomposition temperature of the polymerization initiator is preferably 50° C. or higher, more preferably 55° C. or higher.

From the viewpoint of enabling the polymerization time to be shortened without deteriorating the uniformity of the density of the HIPE foam, it is preferable that an organic peroxide having a one-hour half-life decomposition temperature of 50° C. or higher and lower than 70° C. and an organic peroxide having a one-hour half-life decomposition temperature of 70° C. or higher and 90° C. or lower are used in combination.

The emulsifier is used for formation and stabilization of the high internal phase emulsion. As the emulsifier, for example, a surfactant can be used. Specifically, glycerol esters such as polyglycerol polyricinoleate, polyglycerol stearate, polyglycerol oleate, polyglycerol laurate, and polyglycerol myristate; sorbitol esters such as sorbitol oleate, sorbitol stearate, sorbitol laurate, and sorbitol palmitate; ethylene glycol sorbitol esters; ethylene glycol esters; copolymers of polyethylene glycol and polypropylene glycol; and the like are used. The addition amount of the emulsifier can be, for example, in the range of 1 to 30 parts by weight based on a total of 100 parts by weight of the vinyl-based monomer, the crosslinking agent and the emulsifier.

The electrolyte is used for imparting ionic strength to the aqueous phase to enhance the stability of the emulsion. As the electrolyte, for example, an electrolyte having high water solubility can be used. Specifically, calcium chloride, sodium chloride, magnesium chloride, sodium acetate, sodium citrate, sodium sulfate, calcium sulfate, magnesium sulfate, and the like are used. The addition amount of the electrolyte can be, for example, in the range of 0.1 to 10 parts by weight based on 100 parts by weight of the aqueous liquid.

The polymerization temperature in the polymerization step is adjusted by, for example, the type of the vinyl-based polymer, the type of the polymerization initiator, the type of the crosslinking agent, and the like. The polymerization temperature is, for example, 50° C. to 90° C.

In the drying step, the crosslinked polymer containing water is dried using an oven, a vacuum dryer, a high-frequency/microwave dryer, or the like. When the drying is completed, portions where water droplets are present in the emulsion before polymerization become cells in the polymer after drying, so that a porous material can be obtained. As long as the crosslinked polymer can be squeezed using a pressing machine or the like, dewatering may be performed by squeezing before drying. The squeezing may be performed at room temperature (e.g., 23° C.), or may be performed at, for example, a temperature equal to or higher than the glass transition temperature of the crosslinked polymer forming the HIPE foam. In this case, dewatering by squeezing becomes easy, so that the drying time can be shortened. The crosslinked polymer can also be dewatered by centrifugation. Also in this case, the drying time is shortened.

Next, a reference embodiment of the second aspect will be described. The reference embodiment herein is an embodiment for exhibiting the above-described effect, and does not limit the aspects of the present disclosure.

The reference embodiment of the second aspect is a HIPE foam (i.e., machinable material) that includes a vinyl-based crosslinked polymer and is used for forming a machined product by machining, in which an apparent density ρ is 50 to 500 kg/m³, a value S/ρ of Charpy impact strength per apparent density ρ is 4.5 J·m/kg or more, a storage elastic modulus E' at 23° C. as measured by dynamic mechanical analysis on the HIPE foam under the conditions of frequency: 1 Hz, load: 98 mN, and deformation mode: compression, and the apparent density ρ satisfy the relationship of the following expression (I), and a molecular weight between crosslinking points Mc measured by performing the dynamic mechanical analysis is $2 \times 10^4$ or less.

$$E'/\rho \geq 50 \text{ kN·m/kg} \qquad (I)$$

Next, a method for producing a HIPE foam according to a fourth aspect of the present disclosure will be described. The porous vinyl-based crosslinked polymer herein is substantially synonymous with the HIPE foam. In the fourth aspect of the present disclosure, the porous vinyl-based crosslinked polymer is also referred to simply as a porous material. In production of the HIPE foam according to the first aspect, the machinable material according to the second aspect, and the impact absorbing material according to the third aspect of the present disclosure, it is possible to refer to the method for producing a HIPE foam according to the fourth aspect of the present disclosure.

[High Internal Phase Emulsion]

The high internal phase emulsion is a water-in-oil emulsion in which an aqueous phase containing water is included at a high ratio in an organic phase containing a monomer, an emulsifier, a crosslinking agent, and a polymerization initiator. The high internal phase emulsion is commonly called HIPE. HIPE is produced by, for example, adding dropwise an aqueous liquid containing water or the like to an oily liquid containing a monomer, an emulsifier, a polymerization initiator, and the like. In general, the high internal phase emulsion means one having a high internal phase ratio, where the content ratio of an internal phase (specifically, aqueous phase) to a continuous phase (specifically, organic phase) is high. The internal phase is also called a dispersed phase.

(Monomer)

As the monomer, a monofunctional vinyl-based monomer is used. Specifically, a styrene-based monomer and/or an acryl-based monomer are used. The addition amount of the styrene-based monomer or acryl-based monomer may be 0. That is, as the monomer, a styrene-based monomer or an acryl-based monomer is used, or a styrene-based monomer and an acryl-based monomer are used. As a result, a porous material having excellent toughness and stiffness in a well-balanced manner can be obtained. A monomer copolymerizable with the styrene-based monomer and/or the acryl-based monomer may be used as long as the intended purpose of the present disclosure is not hindered. The copolymerizable monomer is referred to as "another monomer" as appropriate. The other monomer is, for example, a vinyl-based monomer other than styrene-based monomers and acryl-based monomers. In this case, the content ratio of the other monomer in the vinyl-based monomer is preferably 20 wt % or less, more preferably 10 wt % or less, and, still more preferably 5 wt % or less. It is particularly preferable that the vinyl-based monomer includes a styrene-based monomer and/or an acryl-based monomer.

Examples of the styrene-based monomer and the acryl-based monomer include those that are the same as in the second aspect of the present disclosure. These styrene-based and acryl-based monomers may be used alone, or two or more types these monomers may be used in combination. Examples of the other monomer (Specifically, monomer copolymerizable with the styrene-based monomer and/or the acryl-based monomer) include ethylene, chloroethylene, propylene, chloropropene, butylene, and chlorobutylene. These other monomers may be used alone, or two or more types of these monomers may be used in combination.

The high internal phase emulsion contains, as monomers, preferably styrene and/or methyl methacrylate and a (meth) acrylic acid alkyl ester other than methyl methacrylate, more preferably at least styrene and a (meth)acrylic acid alkyl ester. In this case, effects of reducing the production cost and easily making an adjustment to desired physical properties (specifically, physical properties such as compressive stress and bending rupture point strain to be within the ranges described later) are obtained. From the viewpoint of sufficiently obtaining these effects, the (meth)acrylic acid alkyl ester is an ester of (meth)acrylic acid and an alcohol, preferably an ester of (meth)acrylic acid and an alcohol having 1 to 20 carbon atoms. From the viewpoint of enhancing stiffness and toughness in a well-balanced manner, the total content ratio of styrene and methyl methacrylate in the monomer is preferably 40 wt % or more, more preferably 50 wt % or more, still more preferably 60 wt % or more. From the viewpoint of easily obtaining a crosslinked polymer having a desired glass transition temperature with stability, the weight ratio of the total content of styrene and methyl methacrylate to the content of the (meth)acrylic acid alkyl ester other than methyl methacrylate is preferably 40:60 to 90:10, more preferably 50:50 to 80:20. This weight ratio is represented by the total content of styrene and methyl methacrylate:the content of the (meth)acrylic acid alkyl ester other than methyl methacrylate. The content of either one of styrene and methyl methacrylate may be 0.

The main component of the styrene-based monomer is preferably styrene. In this case, the content ratio of styrene in the styrene-based monomer is preferably 50 wt % or more, more preferably 80 wt % or more, still more preferably 90 wt % or more. In this case, the balance between toughness and stiffness can be more easily adjusted while the stiffness of the porous material is enhanced. The (meth) acrylic acid means acrylic acid and/or methacrylic acid.

When the vinyl-based monomer contains a styrene-based monomer and a (meth)acrylic acid alkyl ester other than methyl methacrylate, the crosslinked polymer includes a copolymer of the styrene-based monomer, the (meth)acrylic acid alkyl ester other than methyl methacrylate, and a crosslinking agent. In this case, the content of the styrene-based monomer forming the high internal phase emulsion is preferably 30 parts by weight or more and 90 parts by weight or less, more preferably 40 parts by weight or more and 80 parts by weight or less, still more preferably 50 parts by weight or more and 70 parts by weight or less, based on a total of 100 parts by weight of the vinyl-based monomer and the crosslinking agent. The content of the (meth)acrylic acid alkyl ester other than methyl methacrylate which forms high internal phase emulsion is preferably 5 parts by weight or more and 50 parts by weight or less, more preferably 10 parts by weight or more and 40 parts by weight or less, still more preferably 15 parts by weight or more and 30 parts by weight or less, based on a total of 100 parts by weight of the vinyl-based monomer and the crosslinking agent.

When the vinyl-based monomer contains methyl methacrylate, styrene, and a (meth)acrylic acid alkyl ester other than methyl methacrylate, the crosslinked polymer includes a copolymer of methyl methacrylate, the (meth)acrylic acid alkyl ester other than methyl methacrylate, and a crosslinking agent. In this case, the total content of methyl methacrylate and styrene forming the high internal phase emulsion is preferably 30 parts by weight or more and 80 parts by weight or less, and more preferably 40 parts by weight or more and 70 parts by weight or less, based on a total of 100 parts by weight of the vinyl-based monomer and the crosslinking agent. In this case, the content of the (meth)acrylic acid alkyl ester other than methyl methacrylate which forms the high internal phase emulsion is preferably 5 parts by weight or more and 50 parts by weight or less, more preferably 10 parts by weight or more and 40 parts by weight or less, still more preferably 15 parts by weight or more and 30 parts by weight or less, based on a total of 100 parts by weight of the vinyl-based monomer and the crosslinking agent component. Further, in this case, the content ratio of methyl methacrylate forming the high internal phase emulsion is preferably 50 wt % or more, more preferably 60 wt % or more, and still more preferably 70 wt % or more, based on a total of 100 wt % of methyl methacrylate and styrene.

From the viewpoint of ensuring that it is possible to stably obtain a porous vinyl-based crosslinked polymer which is excellent physical properties (specifically, compressive stress, bending rupture point strain, etc. described later) and has a desired glass transition temperature, the number of carbon atoms in the alkyl group forming the (meth)acrylic acid alkyl ester other than methyl methacrylate (specifically, the number of carbon atoms in an alcohol forming the (meth)acrylic acid alkyl ester) is preferably 1 to 20, more preferably 2 to 18, still more preferably 3 to 16, even more preferably 4 to 12. Among them, butyl acrylate is particularly preferably used.

(Emulsifier)

The emulsifier in the fourth aspect of the present disclosure is the same as in the second aspect of the present disclosure. The glycerol ester is also called a polyglycerol fatty acid ester, and the sorbitol ester is also called a sorbitan fatty acid ester.

In the fourth aspect, the emulsifier is preferably a polyglycerol fatty acid ester and/or a sorbitan fatty acid ester. In this case, it is possible to obtain an effect of improving the emulsion stability of the high internal phase water-in-oil emulsion, so that the ratio of the aqueous phase to the organic phase can be increased.

In the fourth aspect, the addition amount of the emulsifier depends on the type of an emulsifier used, and can be, for example, in the range of 1 to 30 parts by weight based on a total of 100 parts by weight of the vinyl-based monomer, the crosslinking agent, and the emulsifier. The addition amount of the emulsifier is more preferably 2 to 25 parts by weight, still more preferably 3 to 20 parts by weight.

(Crosslinking Agent)

The crosslinking agent that is used in the HIPE foam according to the fourth aspect of the present disclosure is a vinyl-based compound having at least two functional groups selected from a vinyl group and an isopropenyl group in the molecule. As the crosslinking agent, a crosslinking agent A and a crosslinking agent B are used. By using the crosslinking agent A and the crosslinking agent B as the crosslinking agent, toughness can be enhanced while stiffness is enhanced, so that it is possible to obtain a porous material having both stiffness and toughness. The crosslinking agent A and the crosslinking agent B can also be referred to as a first crosslinking agent and a second crosslinking agent, respectively. The vinyl-based compound also includes compounds containing a vinyl group and/or an isopropenyl group in the structure of the functional group like an acryloyl group and a methacryloyl group. From the viewpoint of stably polymerizing the crosslinking agent, the number of functional groups selected from a vinyl group and an isopropenyl group in the vinyl-based compound is preferably 6 or less, preferably 5 or less, still more preferably 4 or less.

The crosslinking agent A is a vinyl-based compound having a functional group equivalent A of 130 g/mol or less. Such a crosslinking agent A has a relatively short molecular chain, and therefore may reduce the mobility of the polymer molecular chain when a vinyl-based monomer is copolymerized with the crosslinking agent A. By using the crosslinking agent A, the stiffness of the porous material can be enhanced. The crosslinking agent A can also be referred to as a "hard crosslinking agent".

The crosslinking agent B is a vinyl-based compound having a functional group equivalent B of more than 130 g/mol and 5000 g/mol or less. Such a crosslinking agent B has a relatively long molecular chain, and therefore may be capable of crosslinking polymer molecular chains without significantly reducing the mobility of the polymer molecular chain when a vinyl-based monomer is copolymerized with the crosslinking agent B. By using the crosslinking agent B, the toughness of the porous material can be enhanced. The crosslinking agent B can also be referred to as a "soft crosslinking agent".

In the HIPE foam according to the fourth aspect of the present disclosure, it is difficult to sufficiently enhance the stiffness of the porous material if the crosslinking agent A is not used. It is difficult to sufficiently enhance the toughness of the porous material if the crosslinking agent B is not used. From the viewpoint of easily producing the porous material, the lower limit of the functional group equivalent of the crosslinking agent A is about 30 g/mol, more preferably 40 g/mol, still more preferably 50 g/mol, even more preferably 60 g/mol. From the viewpoint of easily enhancing the stiffness of the porous material, the upper limit of the functional group equivalent of the hard crosslinking agent A is preferably 120 g/mol.

If the crosslinking agent B having an excessively large functional group equivalent B is used in the HIPE foam according to the fourth aspect of the present disclosure, the viscosity may be high, leading to difficulty of handling during production, and deterioration of polymerization stability. From the viewpoint of the handleability, the upper limit of the functional group equivalent of the crosslinking agent B is preferably 3000 g/mol, more preferably 2000 g/mol, still more preferably 1000 g/mol. From the viewpoint of more easily enhancing the toughness of the porous material, the lower limit of the functional group equivalent of the crosslinking agent B is preferably 150 g/mol, more preferably 180 g/mol, still more preferably 200 g/mol.

The functional group equivalent A is a molar mass of the crosslinking agent A per functional group, and the functional group equivalent B is a molar mass of the crosslinking agent B per functional group. The unit of the functional group equivalent can also be expressed as [g/eq].

When two or more crosslinking agents A are used, the weight average value of the functional group equivalents of all the crosslinking agents A (i.e., weight average functional group equivalent A) is calculated, and the value thereof is taken as the functional group equivalent A. Similarly, when two or more crosslinking agents B are used, the weight average value of the functional group equivalents of all the crosslinking agents B (i.e., weight average functional group equivalent B) is calculated, and the value thereof is taken as the functional group equivalent B.

The functional group equivalent B is preferably larger than the functional group equivalent A by 60 g/mol or more. In other words, the difference between the functional group equivalent B and the functional group equivalent A is preferably 60 g/mol or more. In this case, the stiffness and the toughness of the porous material can be improved in a further well-balanced manner. From the viewpoint of improving this effect, the functional group equivalent B is larger than the functional group equivalent A more preferably by 80 g/mol or more, still more preferably by 100 g/mol or more, particularly preferably by 120 g/mol or more. From the viewpoint of further enhancing the polymerization stability and easily obtaining a porous material excellent in stiffness and toughness with stability, the difference between the functional group equivalent B and the functional group equivalent A is preferably 3000 g/mol or less, more preferably 2000 g/mol or less, still more preferably 1000 g/mol or less.

As the crosslinking agent A (i.e., hard crosslinking agent), the same vinyl-based compound as in the second aspect of the present disclosure can be used. It is to be noted that the number of functional groups in the vinyl-based compound is 2 or more. For the crosslinking agent A, one or more types of vinyl-based compounds can be used. From the viewpoint of more easily enhancing the stiffness of the porous material, it is preferable that the crosslinking agent A has functional groups at least at both ends of the molecule, and it is more preferable that the crosslinking agent has functional groups only at both ends of the molecule.

As the crosslinking agent A, divinylbenzene (DVB) is preferably used. In this case, the stiffness of the porous material is easily enhanced.

As the crosslinking agent B (i.e., soft crosslinking agent), the same vinyl-based compound as in the second aspect of the present disclosure can be used. It is to be noted that the number of functional groups in the vinyl-based compound is 2 or more. As the crosslinking agent B, one or more types of vinyl-based compounds can be used. From the viewpoint of more easily enhancing the toughness of the porous material, it is preferable that the crosslinking agent B has functional groups at least at both ends of the molecule, and it is more preferable that the crosslinking agent has functional groups only at both ends of the molecule.

The crosslinking agent B is preferably at least one compound selected from the group consisting of polyethylene glycol (meth)acrylate, urethane (meth)acrylate, epoxy (meth)acrylate, and (meth)acrylic-modified silicone. In this case, the toughness of the porous material is easily enhanced. Further, from the viewpoint of easily adjusting the toughness of the porous material, it is preferable to use polyethylene glycol (meth)acrylate as the crosslinking agent B. In this case, the number of repeating structural units derived from ethylene glycol in the polyethylene glycol (meth)acrylate is preferably 3 to 23.

In the HIPE foam according to the fourth aspect of the present disclosure, the addition amount of the crosslinking agent (specifically, the total addition amount of the crosslinking agent A and the crosslinking agent B) is 7 parts by weight or more based on a total of 100 parts by weight of the styrene-based monomer, the acryl-based monomer, and the crosslinking agent. It is difficult to obtain a porous material excellent in stiffness and toughness if the addition amount is excessively small. From the viewpoint of improving the stiffness and the toughness of the porous material in a further well-balanced manner, the addition amount of the crosslinking agent is preferably 8 parts by weight or more, more preferably 9 parts by weight or more, based on a total of 100 parts by weight of the styrene-based monomer, the acryl-based monomer, and the crosslinking agent.

In the HIPE foam according to the fourth aspect of the present disclosure, the addition amount of the crosslinking agent (specifically, the total addition amount of the crosslinking agent A and the crosslinking agent B) is 27 parts by weight or less based on a total of 100 parts by weight of the styrene-based monomer, the acryl-based monomer, and the crosslinking agent. If the addition amount is excessively large, the porous materials embrittles, leading to deterioration of toughness. From the viewpoint of further suppressing embrittlement to further improve toughness, the addition amount of the crosslinking agent is preferably 26 parts by weight or less, more preferably 24 parts by weight or less, based on a total of 100 parts by weight of the styrene-based monomer, the acryl-based monomer, and the crosslinking agent.

In the HIPE foam according to the fourth aspect of the present disclosure, the addition amount of the crosslinking agent A is 3 parts by weight or more based on a total of 100 parts by weight of the styrene-based monomer, the acryl-based monomer, and the crosslinking agent. If the addition amount is excessively small, it is difficult to sufficiently enhance stiffness, so that it is difficult to obtain a porous material excellent in balance between stiffness and toughness. From the viewpoint of improving the stiffness and the toughness of the porous material in a well-balanced manner, the addition amount of the crosslinking agent A is preferably 4 parts by weight or more, more preferably 5 parts by weight or more, based on a total of 100 parts by weight of the styrene-based monomer, the acryl-based monomer, and the crosslinking agent.

In the HIPE foam according to the fourth aspect of the present disclosure, the addition amount of the crosslinking agent A is 17 parts by weight or less based on a total of 100 parts by weight of the styrene-based monomer, the acryl-based monomer, and the crosslinking agent. If the addition amount is excessively large, the porous materials embrittles, leading to deterioration of toughness. From the viewpoint of further suppressing embrittlement of the porous material to further improve toughness, the addition amount of the crosslinking agent A is preferably 16 parts by weight or less, more preferably 14 parts by weight or less, based on a total of 100 parts by weight of the styrene-based monomer, the acryl-based monomer, and the crosslinking agent.

In the HIPE foam according to the fourth aspect of the present disclosure, the addition amount of the crosslinking agent A with respect to the crosslinking agent B is 0.3 or more in terms of a weight ratio A/B. It is difficult to enhance the stiffness of the porous material if the weight ratio A/B is excessively low. From the viewpoint of further improving the stiffness of the porous material, the addition amount of the crosslinking agent A with respect to the crosslinking agent B is preferably 0.4 or more, more preferably 0.5 or more in terms of a weight ratio A/B.

In the HIPE foam according to the fourth aspect of the present disclosure, the addition amount of the crosslinking agent A with respect to the crosslinking agent B is 5 or less in terms of a weight ratio A/B. It is difficult to enhance the toughness of the porous material if the weight ratio A/B is excessively high. From the viewpoint of further improving the toughness of the porous material, the addition amount of the crosslinking agent A with respect to the crosslinking agent B is preferably 4 or less, more preferably 3 or less in terms of a weight ratio A/B.

The addition amount of the crosslinking agent B is preferably 2 parts by weight or more based on a total of 100 parts by weight of the styrene-based monomer, the acryl-based monomer, and the crosslinking agent. In this case, the toughness of the porous material is easily enhanced, and the stiffness and the toughness of the porous material can be improved in a further well-balanced manner. From the viewpoint of further improving this effect, the addition amount of the crosslinking agent B is more preferably 3 parts by weight or more, still more preferably 4 parts by weight or more, based on a total of 100 parts by weight of the styrene-based monomer, the acryl-based monomer, and the crosslinking agent.

The addition amount of the crosslinking agent B is preferably 18 parts by weight or less based on a total of 100 parts by weight of the styrene-based monomer, the acryl-based monomer, and the crosslinking agent. In this case, the stiffness of the porous material is easily enhanced while the toughness of the porous material is maintained, and the stiffness and the toughness of the porous material can be improved in a further well-balanced manner. From the viewpoint of further improving this effect, the addition amount of the crosslinking agent B is more preferably 16 parts by weight or less, still more preferably 14 parts by weight or less, even more preferably 12 parts by weight or less, based on a total of 100 parts by weight of the styrene-based monomer, the acryl-based monomer, and the crosslinking agent.

(Polymerization Initiator)

The polymerization initiator is used for initiating polymerization of the styrene-based monomer and/or the acryl-based monomer. As the polymerization initiator, the same polymerization initiator as in the second aspect of the present disclosure can be used. The addition amount of the polymerization initiator can be, for example, in the range of 0.1 to 5 parts by weight based on a total of 100 parts by weight of the vinyl-based monomer and the crosslinking agent.

(Aqueous Phase)

The content of the aqueous phase in the high internal phase emulsion is preferably 300 parts by weight or more based on 100 parts by weight of the organic phase. In this case, a porous material having a low apparent density can be stably obtained. From the viewpoint of further improving this effect, the content of the aqueous phase based on 100 parts by weight of the organic phase is more preferably 350 parts by weight or more, still more preferably 400 parts by weight or more. On the other hand, the content of the aqueous phase in the high internal phase emulsion can be, for example, 3000 parts by weight or less based on 100 parts by weight of the organic phase. The content of the aqueous phase in the high internal phase emulsion is preferably 1600 parts by weight or less based on 100 parts by weight of the organic phase. In this case, the high internal phase emulsion can be more stably formed, and the porous material is easily produced. From the viewpoint of further improving this effect, the content of the aqueous phase based on 100 parts by weight of the organic phase is more preferably 1400 parts by weight or less, still more preferably 1200 parts by weight or less.

The aqueous phase can contain a water-soluble electrolyte. The electrolyte is used for imparting ionic strength to the aqueous phase to enhance the stability of the emulsion. Specifically, the same electrolyte as in the second aspect of the present disclosure is used. The addition amount of the electrolyte is also the same as in the second aspect of the present disclosure.

[Production of Porous Material]

The porous material is produced by polymerizing a vinyl-based monomer and a crosslinking agent in the above-described high internal phase water-in-oil emulsion. Such a porous material is called a HIPE foam, a poly-HIPE foam, or the like. Specifically, the porous material is produced by, for example, carrying out an emulsification step, a polymerization step, and a drying step.

(Emulsification Step)

In the emulsification step, a high internal phase emulsion is prepared as described above. In the emulsification step, a high internal phase water-in-oil emulsion is prepared by adopting, for example, a method in which while an oily liquid (organic phase) containing a monomer, an emulsifier, a crosslinking agent, a polymerization initiator, and the like is stirred in a preparation tank equipped with a stirrer, an aqueous liquid (aqueous phase) containing water is added dropwise to the oily liquid, or a method in which an aqueous phase is injected into a pipe through which an organic phase flows, and the organic phase and the aqueous phase are continuously mixed by a static mixer. In the high internal phase emulsion, a large number of aqueous phases formed from an aqueous liquid are dispersed in an organic phase formed from an oily liquid.

The stirring rate and the addition rate of the aqueous liquid in the emulsification step may be in the same ranges as in the second aspect of the present disclosure. The stirring rate in the emulsification step is adjusted to be within the range of, for example, $0.01$ kW/m$^3$ to $5$ kW/m$^3$ in terms of stirring power density, preferably $0.1$ kW/m$^3$ to $5$ kW/m$^3$ in terms of stirring power density. The addition rate of the aqueous liquid can be adjusted to be within the range of, for example, 10 wt %/min to 1000 wt %/min based on 100 wt % of the oily liquid.

(Polymerization Step)

In the polymerization step, the high internal phase emulsion is heated to polymerize the monomer of the organic phase, thereby obtaining a polymerized product (specifically, crosslinked polymer containing water).

The polymerization temperature in the polymerization step is adjusted according to the type of a monomer, the type of a polymerization initiator, the type of a crosslinking agent, and the like. The polymerization temperature is, for example, $50°$ C. to $90°$ C.

(Drying Step)

In the drying step, the polymerized product containing water is dewatered and dried using an oven, a vacuum dryer, a high-frequency/microwave heated-air dryer, or the like, so that water is removed to obtain a porous material.

When the drying is completed, portions where water droplets are present in the emulsion before polymerization become cells in the polymer after drying, so that a porous material can be obtained.

For the drying step, the same method as in the second aspect of the present disclosure can be adopted.

(Porous Material)

Figure 3:
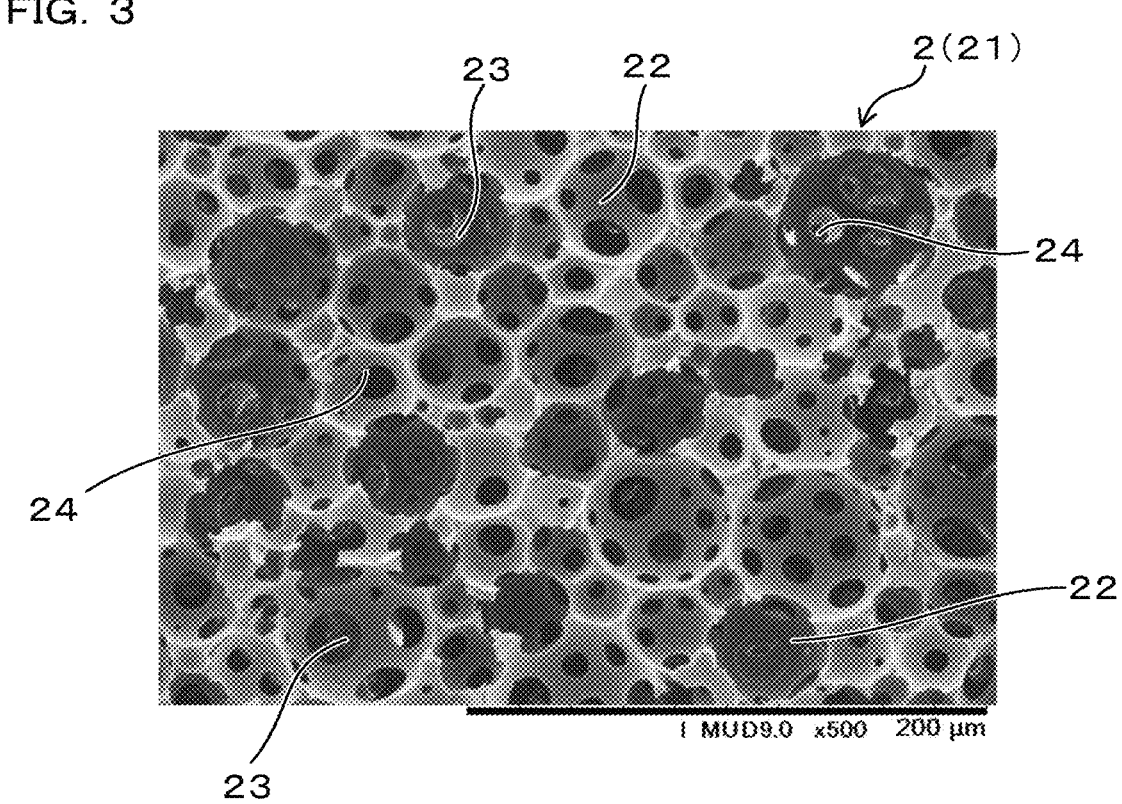
FIG. 3 is a low-vacuum scanning electron micrograph of a porous vinyl-based crosslinked polymer of an example.

The porous vinyl-based crosslinked polymer produced by polymerizing a vinyl-based monomer and a crosslinking agent in a high internal phase water-in-oil emulsion is referred to as a HIPE foam, a poly-HIPE foam, or the like as described above. Such a porous material 2 is a polymer reflecting a dispersion form of the organic phase and the aqueous phase (specifically, dispersed phase) and a dispersion shape of the aqueous phase in the high internal phase emulsion during polymerization, and has a cell structure in which a large number of cells 23 are homogeneously present and an open-cell structure in which a large number of fine pores 24 communicating between the cells 23 are formed as illustrated in FIG. 3. In FIG. 3, the cell 23 is a portion surrounded by a cell wall 22. The fine pore 24 can also be referred to as a micropore, a through-window, a through hole, or a connecting hole. The porous material obtained by the above-described production method using a high internal phase emulsion generally forms a polymer which is less likely to be molecularly oriented and has little anisotropy because the polymer is hardly stretched in the production process. The HIPE foam is distinguished from foams produced by stretching during production, such as foams obtained by an extrusion foaming method using an extruder, and foamed bead molded products obtained by in-mold molding of expanded beads obtained by foaming expandable resin beads. The porous material 2 is also a porous cured product obtained by, for example, curing a high internal phase emulsion, and the cell wall 22 thereof includes the vinyl-based crosslinked polymer (see FIG. 3).

The sizes of the cell and the through-hole of the porous material are not particularly limited, and for example, the average diameter of the cells is approximately 5 to 100 μm, and the average diameter of the through-holes is approximately 1 to 30 μm. Since the fine pore is a through-hole that is generated in the cell wall and passes through between the cells, the through-hole diameter is typically smaller than the cell diameter.

The average diameter of the cells of the porous material can be controlled by adjusting the water droplet diameter of the aqueous phase (i.e., dispersed phase) of the high internal phase emulsion in the method for production thereof, and the cell diameter can be made very small. In the porous material obtained using a high internal phase emulsion, the average cell diameter can be easily adjusted to 100 μm or less. The average cell diameter (the average diameter of cells) of the porous material is an average value of the equivalent circle diameters of the cells, and the method for measurement thereof is described in examples.

(Use Application of Porous Material)

Since the porous material is excellent in stiffness and toughness, the use application thereof is not particularly limited, and the porous material is used in various applications in which stiffness and toughness are required. In addition, since the porous material has an open-cell structure and is lightweight, the porous material is used for various applications in which weight reduction is required. Specifically, for example, the porous material is used for supports, absorbing materials, separating materials, machinable materials, building materials, automobile materials, heat insulating materials, sound absorbing materials, and the like.

The porous material has a homogeneous open-cell structure, and has both stiffness and toughness as described above. Thus, when the porous material is used as a machinable material, it is possible to increase the processing rate while suppressing occurrence of cracking and chipping during machining, and a machined product excellent in smoothness of a cut surface is obtained. Thus, the porous material is suitable as a machinable material (material to be cut) as an application in which machining is performed. The machined products are the same as in the second aspect of the present disclosure.

It is preferable that the porous material is used for a casting model, and the machined product is preferably a casting model. In this case, the casting surface of the casting can be made smooth. This is because the porous material having excellent stiffness and toughness is excellent in smoothness of a cut surface

[Physical Properties of Porous Material]

(Apparent Density)

From the viewpoint of enhancing the stiffness and the toughness of the porous material and ensuring that the porous material is more suitable for formation of a machined product, the apparent density of the porous material is preferably 50 kg/m$^3$ or more. When the apparent density is 50 kg/m$^3$ or more, the porous material can be further prevented from becoming brittle, so that it is possible to prevent occurrence of chipping and cracking during machining. From the viewpoint of further improving this effect, the apparent density of the porous material is more preferably 70 kg/m$^3$ or more, still more preferably 90 kg/m$^3$ or more. From the viewpoint of reducing the weight of the porous material and ensuring that the porous material is more suitable for formation of a machined product, the apparent density of the porous material is preferably 500 kg/m$^3$ or less. When the apparent density is 500 kg/m$^3$ or less, the porous material is further prevented from becoming excessively hard, so that it is possible to prevent a decrease in processing rate during machining. From the viewpoint of further improving this effect, the apparent density of the porous material is more preferably 400 kg/m³ or less, still more preferably 300 kg/m³ or less. The apparent density of the porous material is calculated by dividing the weight by the volume.

(Glass Transition Temperature)

The glass transition temperature of the crosslinked polymer forming the porous material is preferably 40° C. or higher and 120° C. or lower. In this case, sufficient hardness and toughness can be secured at a normal operating temperature, and a change in size of the porous material in a high-temperature environment can be prevented. From the same viewpoint, the glass transition temperature of the crosslinked polymer is more preferably 50° C. or higher, still more preferably 60° C. or higher. The glass transition temperature of the crosslinked polymer is more preferably 100° C. or lower. The glass transition temperature of the crosslinked polymer can be measured in the same manner as in the second aspect of the present disclosure.

(Molecular Weight Between Crosslinking Points)

From the viewpoint of ensuring that the porous material is more suitable for formation of a machined product, the molecular weight between crosslinking points $Mc$ of the crosslinked polymer forming the porous material is preferably $5 \times 10^4$ or less. This makes the porous material less likely to be scraped off by a processing blade of a mill or the like under machining conditions, so that the smoothness of a cut surface can be improved.

From the viewpoint of improving this effect, the molecular weight between crosslinking points $Mc$ of the crosslinked polymer is more preferably $2 \times 10^4$ or less, still more preferably $1 \times 10^4$ or less. From the viewpoint of enabling further suppression of chipping and cracking during machining by suppressing deterioration of toughness, the molecular weight between crosslinking points $Mc$ is preferably $2 \times 10^3$ or more, more preferably $3 \times 10^3$ or more. The molecular weight between crosslinking points $Mc$ can be decreased by blending a crosslinking agent. The molecular weight between crosslinking points $Mc$ can be adjusted to be within the above-described range by adjusting the type of the crosslinking agent as described above, the blending ratio thereof, the type of the monomer, the blending ratio thereof, and the like.

(Average Cell Diameter)

The average cell diameter of the porous material is preferably 100 μm or less, more preferably 80 μm or less, still more preferably 70 μm or less, particularly preferably 50 μm or less. The average cell diameter of the porous material is preferably 5 μm or more, more preferably 10 μm or more, still more preferably 15 μm or more. The reason why the average cell diameter of the porous material is preferably in the above-described range is identical to the reason why the average cell diameter is preferably in the range described in the second aspect of the present disclosure.

The average cell diameter of the porous material is measured by image analysis. The measurement method is described in examples.

A reference embodiment of the fourth aspect is a method for producing a porous vinyl-based crosslinked polymer, the method including: forming a high internal phase water-in-oil emulsion in which an aqueous phase containing water is included in an organic phase containing a styrene-based monomer and/or an acryl-based monomer, a crosslinking agent, an emulsifier, and a polymerization initiator; and polymerizing the styrene-based monomer and/or the acryl-based monomer in the emulsion, in which the crosslinking agent is a vinyl-based compound having at least two functional groups selected from a vinyl group and an isopropenyl group in the molecule, and contains a crosslinking agent A (i.e., first crosslinking agent) having a functional group equivalent of 130 g/mol or less and a crosslinking agent B (i.e., second crosslinking agent) having a functional group equivalent of more than 130 g/mol and 5000 g/mol or less, the addition amount of the crosslinking agent is 7 to 27 parts by weight based on a total of 100 parts by weight of the styrene-based monomer, the acryl-based monomer, and the crosslinking agent, the addition amount of the crosslinking agent A is 3 to 17 parts by weight or less based on a total of 100 parts by weight of the styrene-based monomer, the acryl-based monomer, and the crosslinking agent, and a weight ratio A/B of the crosslinking agent A to the crosslinking agent B is 0.3 to 5.

Next, an impact absorbing material according to the third aspect of the present disclosure will be described.

[Impact Absorbing Material]

The impact absorbing material includes a HIPE foam as described above. For example, the impact absorbing material is used for automobile materials, building materials, logistic materials, cushioning materials, bedding, and the like. For example, the impact absorbing material is suitable for automobile materials such as tibia pads, door pads, and bumpers.

In particular, if a large impact is generated at the time of collision or the like, the impact absorbing material in automobile materials should appropriately absorb the impact to reduce an impact acceleration applied to passengers. As described later, the HIPE foam has excellent suitability for tibia pads, door pads, and bumpers for vehicles and are particularly suitable for tibia pads because the HIPE foam is lightweight and excellent in energy absorption capacity per unit weight, and can appropriately absorb energy over a wide strain amount range.

[HIPE Foam]

For the HIPE foam forming the impact absorbing material according to the third aspect, the descriptions of the HIPE foams (in other words, the porous vinyl-based crosslinked polymers) in the first aspect, the second aspect, and the fourth aspect are referred to. More specifically, the HIPE foam is a porous material having an open-cell structure having a large number of cells and having a crosslinked polymer as a base material resin. Since the HIPE foam has an open-cell structure, the HIPE foam is hardly affected by a so-called air spring that occurs in a foam having a closed-cell structure when the HIPE foam is compressed and deformed. In addition, since the HIPE foam has a moderately brittle cell structure, buckling of cell walls easily occurs if relatively large compressive stress is applied. When the HIPE foam having such properties is adjusted to have physical properties in the ranges described later, an increase in compressive stress with an increase in strain amount can be made gradual, and it is possible to appropriately absorb energy over a wide strain amount range.

The HIPE foam is, for example, a porous crosslinked polymer obtained by polymerizing a vinyl-based monomer (specifically, styrene-based monomer and/or acryl-based monomer) in the presence of a crosslinking agent in a high internal phase water-in-oil emulsion in which an aqueous phase is included in an organic phase at a high ratio. The HIPE foam contains, as a base material resin, a crosslinked polymer which is obtained by polymerizing a styrene-based monomer and/or an acryl-based monomer in a high internal phase water-in-oil emulsion, and contains a component derived from a styrene-based monomer and/or an acryl-based monomer. Specifically, the HIPE foam contains a component derived from a styrene-based monomer and/or an acryl-based monomer in a polymer backbone of the crosslinked polymer.

[Cell Structure]

Figure 4:
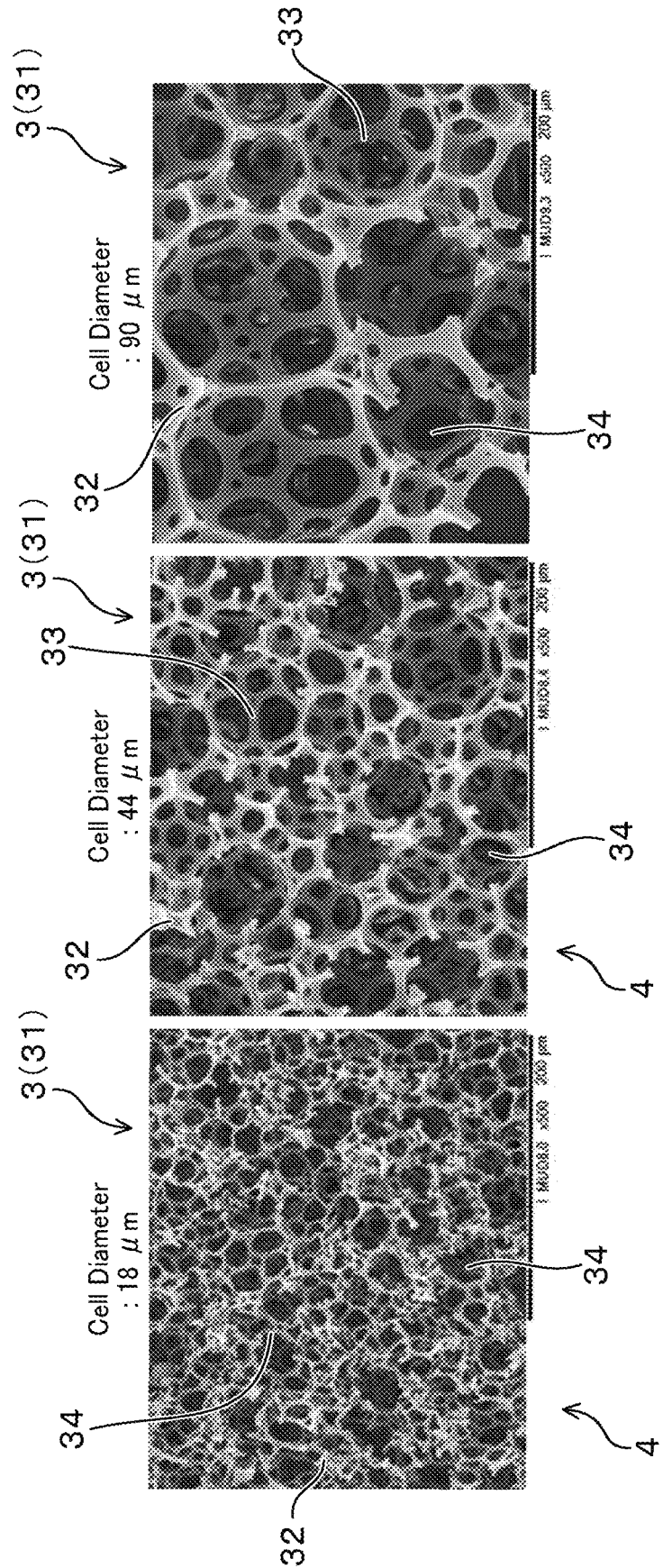
FIG. 4 shows, on the left, a low-vacuum scanning electron micrograph (magnification: 500 times) of a HIPE foam having an average cell diameter of 18 μm, in the middle a low-vacuum scanning electron micrograph (magnification: 500 times) of a HIPE foam having an average cell diameter of 44 μm, and, on the right, a low-vacuum scanning electron micrograph (magnification: 500 times) of a HIPE foam having an average cell diameter of 90 μm.

The HIPE foam is a porous material having an open-cell structure as described above. As illustrated in FIGS. 4(a) to 4(c), a HIPE foam 3 has a cell structure in which a large number of cells 33 are homogeneously present in a porous crosslinked polymer 31 forming the HIPE foam 3, and an open-cell structure in which a large number of through-holes 34 extending through cell walls 32 and communicating between adjacent cells are formed. In FIGS. 4(a) to 4(c), the cell 33 is a portion surrounded by the cell wall 32. The through-hole 34 is a hole extending through the cell wall 32 and communicating between adjacent cells 33. Specifically, the through-hole 34 is a hole that is formed in the cell wall 32 and passes through between cells 33 adjacent to each other with the cell wall 32 interposed therebetween. The through-hole 34 can also be referred to as a fine pore, a micropore, a through-window, or a connecting hole.

In the HIPE foam, an average diameter $\Phi_1$ of the cells is approximately 5 to 100 µm, and an average diameter $\Phi_2$ of the through-holes is approximately 1 to 30 µm. Since the through-hole is a hole that is formed in the cell wall and passes through between the cells, the average diameter $\Phi_2$ of the through-holes is typically smaller than the average diameter $\Phi_1$ of the cells. The average diameter $\Phi_1$ of the cells is an average value of the equivalent circle diameters of the cells, and the equivalent circle diameter of the cell is a diameter of a perfect circle having an area equal to the area of the cell at a cross-section of the HIPE foam. The average diameter $\Phi_2$ of the through-holes is an average value of the equivalent circle diameters of the through-holes, and the equivalent circle diameter of the through-hole is a diameter of a perfect circle having an area equal to the area of the through-hole at a cross-section of the HIPE foam. Methods for measuring the average diameter $\Phi_1$ of the cells and the average diameter $\Phi_2$ of the through-holes are described later. For example, these average diameters are measured by image analysis of the open-cell structure of the HIPE foam.

In the impact absorbing material including a HIPE foam, the average diameter $\Phi_1$ of the cells is preferably 20 µm or more and 100 µm or less, the average diameter $\Phi_2$ of the through-holes is preferably 5 µm or more and 20 µm or less, and the ratio $\Phi_1/\Phi_2$ of the average diameter $\Phi_1$ of the cells to the average diameter $\Phi_2$ of the through-holes is preferably 3 or more and 5 or less. In this case, it is possible to suppress excessive deformation of the cell structure of the HIPE foam by a load while suppressing excessive embrittlement of the cell structure. This ensures that deterioration of the energy absorption performance of the impact absorbing material at high strain is further suppressed, and the energy absorption capacity per unit weight of the impact absorbing material is further improved. From the viewpoint of further improving this effect, the average diameter $\Phi_1$ of the cells is preferably 25 µm or more and 95 µm or less. The average diameter $\Phi_2$ of the through-holes is preferably 6 µm or more and 18 µm or less, more preferably 8 µm or more and 16 µm or less. The ratio $\Phi_1/\Phi_2$ is preferably 3.0 or more and 5.0 or less, more preferably 3.2 or more and 4.8 or less, still more preferably 3.4 or more and 4.6 or less.

The average diameter of the cells can be controlled by adjusting the water droplet diameter of the aqueous phase (i.e., dispersed phase) of the high internal phase emulsion in a method for producing a HIPE foam as described later. In example, by decreasing the water droplet diameter, the cell diameter is made very small, and in the HIPE foam, the average diameter of the cells can be easily adjusted to, for example, 100 µm or less.

In the method for producing a HIPE foam as described later, the through-hole is formed by breakage of an oil film due to volumetric shrinkage or the like of a polymer in polymerization of a monomer in a high internal phase water-in-oil emulsion. The oil film forms the above-described cell wall through progression of polymerization and crosslinking. The average diameter of the through-holes can be controlled by adjusting the stirring power density, the polymerization rate, the viscosity of the oily phase, and the like in a method for producing a HIPE foam as described later. For example, by increasing the stirring power density, the through-hole diameter is made very small, and in the HIPE foam, the average diameter of the through-holes can be easily adjusted to, for example, 20 µm or less.

In the impact absorbing material including a HIPE foam, the average value of the numbers of cells per unit area in the HIPE foam is preferably 120 cells/mm$^2$ or more and 2400 cells/mm$^2$ or less. In this case, it is possible to suppress excessive deformation of the cell structure of the HIPE foam by a load while suppressing excessive embrittlement of the cell structure. From the viewpoint of further improving this effect, the average value of the numbers of cells is preferably 150 cells/mm$^2$ or more and 2200 cells/mm$^2$ or less, more preferably 300 cells/mm$^2$ or more and 2100 cells/mm$^2$ or less, and still more preferably 500 cells/mm$^2$ or more and 2000 cells/mm$^2$ or less.

In the impact absorbing material including a HTPE foam, the average value of the numbers of through-holes per unit area in the HIPE foam is preferably 700 cells/mm$^2$ or more and 8000 cells/mm$^2$ or less, more preferably 800 cells/mm$^2$ or more and 7000 cells/mm$^2$ or less. In this case, it becomes easy to moderately buckle the cell wall, and a variation in compressive stress depending on the strain amount is easily reduced.

Methods for measuring the average value of the numbers of cells and the average value of numbers of through-holes per unit area in the HIPE foam are described later. For example, these average values are measured by image analysis. The average value of the numbers of cells can be controlled by adjusting the water droplet diameter of the aqueous phase (i.e., dispersed phase) of the high internal phase emulsion in a method for producing a HIPE foam as described later. For example, by decreasing the water droplet diameter, the cell diameter is made very small, and the average value of the numbers of cells is increased. The average value of the numbers of through-holes can be controlled by adjusting the stirring power density, the polymerization rate, the viscosity of the oily phase, and the like in a method for producing a HIPE foam as described later. For example, by increasing the stirring power density, the through-hole diameter is made very small, and in the HIPE foam, the average value of the numbers of through-holes is increased.

[Apparent Density ρ]

In the impact absorbing material including a HIPE foam, the apparent density ρ of the HIPE foam is preferably 35 kg/m$^3$ or more and less than 100 kg/m$^3$. When the apparent density ρ is in the above-mentioned range, a HIPE foam having certain stiffness and a moderately brittle cell structure can be obtained. This ensures that moderately high compressive stress is exhibited in a region where strain caused by compression is small, while with an increase in strain caused by compression, cell walls moderately buckle, so that it is possible to suppress a situation in which compressive stress at high strain becomes excessively high. Thus, a variation in compressive stress depending on the strain amount can be reduced. If the apparent density $\rho$ of the HIPE foam is excessively low, stiffness is deteriorated, so that the energy absorption capacity per unit weight decreases. From the viewpoint of further improving the energy absorption capacity per unit weight of the impact absorbing material, the apparent density $\rho$ of the HIPE foam is more preferably 38 kg/m$^3$ or more, still more preferably 40 kg/m$^3$ or more. On the other hand, if the apparent density of the HIPE foam is excessively high, the HIPE foam is excessively hard, so that the compressive load at high strain increases. Thus, the energy absorption performance of the impact absorbing material at high strain is deteriorated. From the viewpoint of further improving energy absorption performance at high strain and enabling further reduction of the weight of the impact absorbing material, the apparent density $\rho$ of the HIPE foam is preferably 90 kg/m$^3$ or less, more preferably 80 kg/m$^3$ or less, still more preferably 60 kg/m$^3$ or less.

The methods for calculating and adjusting the apparent density $\rho$ of the HIPE foam are the same as in the second aspect of the present disclosure.

The ratio of the cell wall equivalent thickness t of the HIPE foam to the apparent density $\rho$ of the HIPE foam is preferably 0.0060 $\mu$m/[kg/m$^3$] or more, more preferably 0.0065 $\mu$m/[kg/m$^3$] or more, still more preferably 0.0070 $\mu$m/[kg/m$^3$] or more. In this case, the energy absorption capacity per unit weight is more easily improved. On the other hand, the above-described ratio is preferably 0.035 $\mu$m/[kg/m$^3$] or less, more preferably 0.032 $\mu$m/[kg/m$^3$] or less, still more preferably 0.030 $\mu$m/[kg/m$^3$] or less. In this case, a variation in compressive stress depending on the strain amount can be easily suppressed.

The cell wall equivalent thickness t of the HIPE foam is calculated from the following expression ($\alpha$). In the expression ($\alpha$), d is an average diameter of cells of the HIPE foam, $X=\rho s/\rho f$, $\rho s$ is a density of the base material resin, and $\rho f$ is an apparent density of the HIPE foam.

$$t=d[(X/(X-1))^{1/3}-1] \qquad (\alpha)$$

The expression ($\alpha$) is an expression obtained by setting the density of gas in cells: $\rho g$ to substantially 0 in a relationship of a volume fraction of a base material resin in a HIPE foam which is based on the assumption that no through-holes is present in the HIPE foam (i.e., $(\rho f-\rho g)/(\rho s-\rho g)=[(d+t)^3-d^3]/(d+t)^3)$. From the above-described expression, a cell wall thickness equivalent to the average cell wall thickness of the HIPE foam can be determined.

From the viewpoint of easily and stably exhibiting the physical properties of the HIPE foam which are desired in various applications, the cell wall equivalent thickness t of the HIPE foam is preferably 0.3 $\mu$m or more and 3 $\mu$m or less, more preferably 0.5 $\mu$m or more and 2 $\mu$m or less.

[Glass Transition Temperature]

In the impact absorbing material including a HIPE foam, the glass transition temperature of the crosslinked polymer forming the HIPE foam is preferably 60° C. or higher. This enables enhancement of the stiffness of the HIPE foam. This is because the strength of the resin backbone is improved by increasing the glass transition temperature. If the glass transition temperature is excessively low, stiffness is deteriorated, and the energy absorption capacity per unit weight decreases. In addition, the mechanical properties of the impact absorbing material may be deteriorated when the impact absorbing material is used in an environment at a high ambient temperature. From the viewpoint of further enhancing stiffness and further improving the energy absorption capacity per unit weight of the impact absorbing material, the glass transition temperature of the crosslinked polymer forming the HIPE foam is more preferably 65° C. or higher. From the viewpoint of enabling suppression of excessive embrittlement of the impact absorbing material, the glass transition temperature of the crosslinked polymer forming the HIPE foam is preferably 160° C. or lower, more preferably 150° C. or lower, still more preferably 130° C. or lower.

The methods for measuring and adjusting the glass transition temperature of the crosslinked polymer forming the HIPE foam are the same as in the second aspect of the present disclosure.

[Molecular Weight Between Crosslinking Points Mc]

The molecular weight between crosslinking points Mc is an index of the degree of crosslinking in the crosslinked polymer forming the HIPE foam. In the impact absorbing material including a HIPE foam, the molecular weight between crosslinking points Mc of the crosslinked polymer forming the HIPE foam is preferably 3×10$^3$ or more. This enables enhancement of the stiffness of the HIPE foam while suppressing excessive embrittlement of the HIPE foam. If the molecular weight between crosslinking points is excessively small, the degree of the crosslinking is excessively high, and embrittlement easily occurs, leading to a decrease in energy absorption capacity per unit weight. From the viewpoint of suppressing embrittlement to further improve the energy absorption capacity per unit weight, the molecular weight between crosslinking points Mc of the crosslinked polymer forming the HIPE foam is preferably 4×10$^3$ or more, more preferably 5×10$^3$ or more, still more preferably 6×10$^3$ or more. From the viewpoint of further improving the energy absorption capacity per unit weight while suppressing deterioration of stiffness due to a decrease in the degree of crosslinking in the polymer, the molecular weight between crosslinking points Mc of the crosslinked polymer forming the HIPE foam is preferably 2×10$^5$ or less, more preferably 1×10$^5$ or less, still more preferably 9×10$^4$ or less.

The methods for measuring and adjusting the molecular weight between crosslinking points Mc of the crosslinked polymer forming the HIPE foam are the same as in the second aspect of the present disclosure. The unit of the storage elastic modulus in the expression (I) is kPa.

[Ratio $\sigma10/\sigma50$ of compressive stress at a strain of 10% ($\sigma10$) to compressive stress at a strain of 50% ($\sigma50$)]

The compressive stress at a strain of 50% (($50$) represents compressive stress at high strain, and the compressive stress at a strain of 10% ($\sigma10$) represents compressive stress at low strain. Hereinafter, the ratio $\sigma10/\sigma50$ of compressive stress at a strain of 10% ($\sigma10$) to compressive stress at a strain of 50% ($\sigma50$) is referred to as a "compressive stress ratio $\sigma10/\sigma50$" as appropriate. In the impact absorbing material including a HIPE foam, the compressive stress ratio $\sigma10/\sigma50$ of the HIPE foam at a temperature of 23° C. is preferably more than 0.70 and 1.0 or less. This reduces a variation in energy absorption performance over a wide strain amount range. If the compressive stress ratio $\sigma10/\sigma50$ is excessively low, the compressive load at high strain increases, so that energy absorption performance at high strain is deteriorated. From the viewpoint of further improving energy absorption performance at high strain, the compressive stress ratio σ10/σ50 is more preferably 0.72 or more, still more preferably 0.75 or more. On the other hand, from the viewpoint of enhancing energy absorption performance at low strain while suppressing a variation in energy absorption performance depending on the strain amount, the compressive stress ratio σ10/σ50 is more preferably 0.95 or less, still more preferably 0.90 or less. The method for measuring the compressive stress at a strain of 50% (σ50) and the compressive stress at a strain of 10% (σ10) is described in examples.

From the viewpoint of suppressing a variation in energy absorption performance in a region with a small strain amount, the ratio σ10/σ30 of the compressive stress at a strain of 10% (σ10) to the compressive stress at a strain of 30% (σ30) is preferably 0.85 or more and 1.0 or less, more preferably 0.90 or more and 1.0 or less.

From the viewpoint of suppressing a variation in energy absorption performance over a wider strain amount range, the ratio σ10/σ70 of the compressive stress at a strain of 10% (σ10) to the compressive stress at a strain of 70% (σ70) is preferably 0.35 or more and 0.50 or less.

The compressive stress ratio such as σ10/σ50 can be adjusted to be within the above-described range by adjusting the apparent density of a HIPE foam, the component derived from the monomer forming the base material resin, the type and amount of a crosslinking agent used, the average diameter of through-holes, the ratio of the average diameter of cells to the average diameter of through-holes, and the like.
[Constituent Component]

For the crosslinked polymer forming the HIPE foam, it is possible to refer to the description in the second aspect of the present disclosure.

Specifically, the crosslinked polymer is a polymer of a monofunctional vinyl-based monomer and a crosslinking agent, and has a component derived from the monofunctional vinyl-based monomer. As the monofunctional vinyl-based monomer, a styrene-based monomer and/or an acryl-based monomer can be used.

It can also be said that the HIPE foam has, as a base material resin, a crosslinked polymer obtained by crosslinking a polymer or copolymer of a styrene-based monomer and/or an acryl-based monomer.

It is preferable that the crosslinked polymer includes a polymer of a vinyl monomer containing a styrene-based monomer and/or an acryl-based monomer, and a crosslinking agent. Specifically, it is preferable that the crosslinked polymer has a styrene-based monomer component and/or an acryl-based monomer component in the polymer backbone, and has a crosslinking agent component as described later. In this case, the balance between toughness and stiffness of the HIPE foam is further improved. The styrene-based monomer component means a constituent unit derived from a styrene-based monomer in the crosslinked polymer, and the acryl-based monomer component means a constituent unit derived from an acryl-based monomer in the crosslinked polymer.

From the viewpoint of easily obtaining an impact absorbing material having desired physical properties, the content ratio of the styrene-based monomer component and/or the acryl-based monomer component in the crosslinked polymer is preferably 50 wt % or more, more preferably 60 wt % or more, still more preferably 70 wt % or more. From the same viewpoint, the content ratio of the styrene-based monomer component and/or the acryl-based monomer component in the crosslinked polymer is preferably 95 wt % or less, more preferably 90 wt % or less.

The content of components derived from monomers other than the styrene-based monomer component, the acryl-based monomer component, and the crosslinking agent component in the crosslinked polymer is preferably 20 wt % or less, more preferably 10 wt % or less, still more preferably 5 wt % or less, based on a total of 100 wt % of the styrene-based monomer component, the acryl-based monomer component, and the crosslinking agent component that constitute the crosslinked polymer.

Examples of the styrene-based monomer and the acryl-based monomer include those that are the same as in the second aspect of the present disclosure.

The crosslinked polymer may include a copolymer of a vinyl-based monomer containing methyl methacrylate and a (meth)acrylic acid ester other than methyl methacrylate, and a crosslinking agent, and it is preferable that the crosslinked polymer includes a copolymer of a vinyl-based monomer containing a styrene-based monomer and a (meth)acrylic acid ester, and a crosslinking agent. In other words, it is preferable that the crosslinked polymer has components (i.e., constituent units) derived from a styrene-based monomer and a (meth)acrylic acid ester in the polymer backbone. In this case, a HIPE foam including a crosslinked polymer having desired physical properties is easily obtained.

Since the crosslinked polymer is a polymer that is crosslinked, the crosslinked polymer has a component (i.e., constituent unit) derived from the crosslinking agent in the polymer backbone. The (meth)acrylic acid ester is an ester of (meth)acrylic acid and an alcohol, preferably an ester of (meth)acrylic acid and an alcohol having 1 to 20 carbon atoms.

It is preferable that the crosslinked polymer has a component derived from a styrene-based monomer and a component derived from a (meth)acrylic acid ester, and the (meth)acrylic acid ester is an ester of (meth)acrylic acid and an alcohol having 1 to 20 carbon atoms. In this case, it is possible to obtain an effect of easily obtaining a HIPE foam having desired physical properties, and easily adjusting the glass transition temperature of the crosslinked polymer to be within a desired range When the vinyl-based monomer contains a styrene-based monomer, the content ratio of styrene in the vinyl-based monomer is preferably 50 wt % or more, more preferably 60 wt % or more. The weight ratio of the styrene-based monomer to the (meth)acrylic acid ester is preferably 50:50 to 90:10, and more preferably 60:40 to 80:20. In this case, effects of reducing the production cost and easily making an adjustment to desired physical properties are obtained. The (meth)acrylic acid means acrylic acid and/or methacrylic acid.

From the viewpoint of ensuring that it is possible to stably obtain a crosslinked polymer which is excellent in physical properties and has a desired glass transition temperature, the number of carbon atoms in the hydrocarbon group forming the (meth)acrylic acid ester is preferably 1 to 20, more preferably 2 to 18, still more preferably 3 to 16, even more preferably 4 to 12. The hydrocarbon group is more preferably a saturated hydrocarbon group. The hydrocarbon group may be cyclic or acyclic. Among them, isobornyl methacrylate and/or butyl acrylate are preferably used, and butyl acrylate is particularly preferably used. For example, when isobornyl methacrylate is used, the glass transition temperature of the crosslinked polymer can be easily increased, and when butyl acrylate is used, the glass transition temperature of the crosslinked polymer can be easily decreased.

The crosslinked polymer has a crosslinked structure and contains a crosslinking agent component. The crosslinking agent component is a constituent unit derived from the crosslinking agent in the crosslinked polymer. The crosslinking agent is a compound which forms a crosslinked structure in a polymer by crosslinking (binding) polymer chains forming the polymer.

As the crosslinking agent, for example, a vinyl-based compound having at least two functional groups selected from a vinyl group and an isopropenyl group in the molecule is used. When the crosslinked polymer contains a predetermined amount of the crosslinking agent component, the stiffness and the toughness of the crosslinked polymer can be enhanced, and the value of the molecular weight between crosslinking points of the crosslinked polymer can be decreased.

For the crosslinked polymer and the crosslinking agent, it is possible to refer to the descriptions in the second and fourth aspects of the present disclosure.

In the impact absorbing material including a HIPE foam, it is preferable that the crosslinked polymer contains a hard crosslinking agent component derived from a hard crosslinking agent having a relatively short molecular chain and a soft crosslinking agent component derived from a soft crosslinking agent having a relatively long molecular chain because the toughness of the crosslinked polymer is easily enhanced while the stiffness of the crosslinked polymer is enhanced. In this case, the molecular weight between crosslinking points Mc of the crosslinked polymer forming the HIPE foam, the compressive stress ratio σ10/σ50 at a temperature of 23° C., and the like are easily adjusted to be within the above-described ranges. Excessive embrittlement of the impact absorbing material is easily suppressed, and even when a HIPE foam having a complicated shape such as that in which a thin portion is present is produced, occurrence of chipping or the like in the HIPE foam can be suppressed.

From the viewpoint of more easily enhancing the toughness and the stiffness of the HIPE foam, and suppressing excessive embrittlement to further improve handleability particularly in the impact absorbing material, the functional group equivalent of the soft crosslinking agent is larger than the functional group equivalent of the hard crosslinking agent preferably by 60 g/mol or more, more preferably by 80 g/mol or more, still more preferably by 100 g/mol or more, even more preferably by 120 g/mol or more. In other words, the difference between the functional group equivalent of the soft crosslinking agent and the functional group equivalent of the hard crosslinking agent is preferably 60 g/mol or more, more preferably 80 g/mol or more, still more preferably 100 g/mol or more, even more preferably 15 120 g/mol or more. The methods for calculating the functional group equivalent when two or more types of hard crosslinking agents are used and when two or more soft crosslinking agents are used are the same as in the second aspect.

When in the impact absorbing material including a HIPE foam, the crosslinked polymer includes a copolymer of at least a styrene-based monomer, an acrylic acid ester, and a crosslinking agent, the content of the styrene-based monomer component in the crosslinked polymer is preferably 30 parts by weight or more and 90 parts by weight or less, more preferably 35 parts by weight or more and 80 parts by weight or less, still more preferably 40 parts by weight or more and 70 parts by weight or less, based on a total of 100 parts by weight of the vinyl-based monomer component and the crosslinking agent component forming the crosslinked polymer, from the viewpoint of easily adjusting the molecular weight between crosslinking points Mc and the compressive stress ratio σ10/σ50 at a temperature of 23° C. to be within the above-described ranges, and further improving the balance between the toughness and the stiffness of the HIPE foam. From the same viewpoint, the content of the (meth) acrylic acid ester component in the crosslinked polymer is preferably 5 parts by weight or more and 50 parts by weight or less, more preferably 10 parts by weight or more and 40 parts by weight or less, still more preferably 15 parts by weight or more and 35 parts by weight or less, based on a total of 100 parts by weight of the vinyl-based monomer component and the crosslinking agent component forming the crosslinked polymer. As the styrene-based monomer, styrene is preferably used, and the content ratio of styrene in the styrene-based monomer is preferably 50 wt % or more, more preferably 80 wt % or more, still more preferably 90 wt % or more.

In the impact absorbing material including a HIPE foam, the content of the crosslinking agent component (specifically, the total content of the soft crosslinking agent component and the hard crosslinking agent component) in the crosslinked polymer is preferably 5 parts by weight or more and 30 parts by weight or less, more preferably 7 parts by weight or more and 27 parts by weight or less, based on a total of 100 parts by weight of the vinyl-based monomer component and the crosslinking agent component forming the crosslinked polymer, from the viewpoint of easily adjusting the molecular weight between crosslinking points Mc and the compressive stress ratio σ10/σ50 at a temperature of 23° C. in the crosslinked polymer to be within the above-described ranges.

From the viewpoint of easily enhancing the stiffness of the HIPE foam forming the impact absorbing material, and easily adjusting the molecular weight between crosslinking points Mc and the compressive stress ratio σ10/σ50 at a temperature of 23° C. to be within the above-described ranges, the content of the hard crosslinking agent component in the crosslinked polymer is preferably 1 part by weight or more and 18 parts by weight or less, more preferably 3 parts by weight or more and 17 parts by weight or less, still more preferably 5 parts by weight or more and 15 parts by weight or less, based on a total of 100 parts by weight of the vinyl-based monomer component and the crosslinking agent component forming the crosslinked polymer. From the viewpoint of easily adjusting the molecular weight between crosslinking points Mc and the compressive stress ratio σ10/σ50 at a temperature of 23° C. to be within the above-described ranges while suppressing excessive embrittlement of the HIPE foam, the content of the soft crosslinking agent component in the crosslinked polymer is preferably 2 parts by weight or more and 18 parts by weight or less, more preferably 3 parts by weight or more and 10 parts by weight or less, based on a total of 100 parts by weight of the vinyl-based monomer component and the crosslinking agent component forming the crosslinked polymer. From the viewpoint of easily adjusting the molecular weight between crosslinking points Mc and the compressive stress ratio σ10/σ50 at a temperature of 23° C. to be within the above-described ranges, the weight ratio of the hard crosslinking agent component to the soft crosslinking agent component is preferably 0.2 or more and 6 or less, more preferably 0.3 or more and 5 or less, still more preferably 1 or more and 4 or less, particularly preferably 1.2 or more and 3.0 or less.

[Production Method]

The HIPE foam in the third aspect is produced by carrying out an emulsification step, a polymerization step, and a drying step in the same manner as in the second and fourth aspects described above.

First, an aqueous liquid (aqueous phase) containing water is added dropwise to an oily liquid (organic phase) containing organic substances such as a vinyl-based monomer, a crosslinking agent, an emulsifier, and a polymerization initiator with stirring, thereby preparing a high internal phase water-in-oil emulsion (emulsification step). In the third aspect, the content of the aqueous phase in the high internal phase emulsion is preferably 900 to 2700 parts by weight, more preferably 1000 to 2500 parts by weight, still more preferably 1100 to 2400 parts by weight, based on 100 parts by weight of the organic phase. Subsequently, the high internal phase emulsion is heated to polymerize the vinyl-based monomer, the crosslinking agent, and the like of the organic phase, thereby obtaining a polymerized product (specifically, crosslinked polymer containing water) (polymerization step). Thereafter, the polymerized product is dried to obtain a HIPE foam including a crosslinked polymer (drying step).

The stirring rate in the emulsification step, the method for adding the aqueous liquid to the oily liquid, the addition rate of the aqueous liquid, and the emulsification method are the same as in the methods in the second aspect and the fourth aspect described above.

The aqueous phase can contain water such as deionized water, a polymerization initiator, an electrolyte, and the like. In the emulsification step, for example, an oily liquid and an aqueous liquid are each prepared, and the aqueous liquid is added to the oily liquid under stirring to prepare a high internal phase emulsion. In the emulsification step, additives such as a flame retardant, a flame retardant auxiliary, a light resistance agent, and a colorant can be appropriately added to the aqueous phase and/or the organic phase.

The flame retardant is appropriately used for improving the flame retardancy of the HIPE foam. Examples of the flame retardant include: organic compounds including a halogen, phosphorus, nitrogen, silicone, or the like; and inorganic compounds including a metal hydroxide, phosphorus, nitrogen, or the like. The flame retardant can be used within the bounds of not impairing the effects of the present disclosure. When the flame retardant is blended, the blending amount thereof is preferably 5 to 20 parts based on a total of 100 parts by weight of the vinyl-based monomer component and the crosslinking agent component forming the crosslinked polymer. As the flame retardant, a brominated bisphenol-based flame retardant is preferably used, a brominated bisphenol-based flame retardant having a 2,3-dibromo-2-methylpropyl group and/or a brominated bisphenol-based flame retardant having a 2,3-dibromopropyl group are more preferably used, and 2,2-bis(4-(2,3-dibromo-2-methylpropoxy)-3,5-dibromophenyl)propane is still more preferably used, from the viewpoint of easily imparting excellent flame retardancy even in a small addition amount.

A flame retardant auxiliary can be appropriately blended in the HIPE foam for the purpose of improving the flame retardancy efficiency. For example, when a halogen-based flame retardant is used and a radical generator such as dicumyl peroxide is used as a flame retardant auxiliary, it can be expected that elimination of the halogen in the flame retardant is promoted by decomposition of the radical generator to improve flame retardancy efficiency. When a halogen-based flame retardant is used and an antimony compound such as antimony trioxide is used as a flame retardant auxiliary, it can be expected that the radical trapping effect of the halogen-based flame retardant and the air blocking effect of the antimony compound are synergistically combined to improve flame retardancy efficiency. A flame retardant may be used alone, or two or more flame retardants having different flame retardancy mechanisms may be used in combination.

The polymerization initiator is used for initiating polymerization of the vinyl-based monomer. As the polymerization initiator, a radical polymerization initiator can be used. Specifically, the same polymerization initiator as in the second aspect described above is used.

The addition amount of the polymerization initiator can be, for example, in the range of 0.1 to 5 parts by weight based on a total of 100 parts by weight of the vinyl-based monomer and the crosslinking agent.

The emulsifier is the same as in the second aspect described above.

The electrolyte is used for imparting ionic strength to the aqueous phase to enhance the stability of the emulsion. As the electrolyte, for example, an electrolyte having high water solubility can be used. Specifically, calcium chloride, sodium chloride, magnesium chloride, sodium acetate, sodium citrate, sodium sulfate, calcium sulfate, magnesium sulfate, sodium dihydrogen phosphate, disodium hydrogen phosphate, and the like are used. The addition amount of the electrolyte can be in the same range as in the second aspect described above.

The polymerization temperature in the polymerization step, and the method for adjustment thereof are the same as in the second aspect described above.

Details of the drying step are the same as in the second aspect described above.

A reference embodiment of the third aspect is an impact absorbing material including the HIPE foam, in which the HIPE foam contains, as a base material resin, a crosslinked polymer containing a component derived from a styrene-based monomer and/or an acryl-based monomer, a glass transition temperature of the crosslinked polymer is 60° C. or higher, a molecular weight between crosslinking points of the crosslinked polymer is $3 \times 10^3$ or more, an apparent density of the HIPE foam is 35 kg/m$^3$ or more and less than 100 kg/m$^3$, and a ratio of compressive stress at a strain of 10% to compressive stress at a strain of 50% at 23° C. in the HIPE foam is more than 0.70 and 1.0 or less.

EXAMPLES

Hereinafter, examples of HIPE foams in the first and second aspects of the present disclosure, and comparative examples will be described. In the examples, HIPE foams shown in examples in Table 2 and comparative examples in Table 3 were produced by the following methods. The HIPE foams in the first and second aspects of the present disclosure are not limited to the following examples, and the configuration can be changed as appropriate within the spirit of the present disclosure. "%" in examples means wt %.

Example 1-1

First, a glass vessel equipped with a stirrer and having an internal volume of 3 L was charged with 54 g of styrene and 24 g of butyl acrylate as vinyl-based monomers, 12 g of divinyl benzene having a purity of 57% (6.84 g as divinylbenzene) as a hard crosslinking agent (hereinafter, referred to as a first crosslinking agent), 5 g of polyethylene glycol diacrylate (specifically, NK Ester A-400 manufactured by Shin-Nakamura Chemical Co., Ltd./purity: 95%) (4.75 g as polyethylene glycol diacrylate) as a soft crosslinking agent (hereinafter, referred to as a second crosslinking agent), 5 g of polyglycerol polyricinoleate (specifically, CRS-75 manufactured by Sakamoto Yakuhin Kogyo Co., Ltd.) as an emulsifier, and 0.5 g of dilauroyl peroxide as a polymerization initiator. These substances were mixed in a glass vessel to form an organic phase.

As the stirrer, a stirrer with a torque converter was used.

614 g of deionized water was added at a rate of about 450 g/min while the organic phase was stirred at a stirring power density of 1.6 kW/m³. Even after the addition of water was completed, stirring was continued for 10 minutes to prepare a water-in-oil (i.e., W/O) high internal phase emulsion. The stirring power density after completion of emulsification was 1.4 kW/m³.

The stirring power density (kW/m³) is determined by calculating a power (kW) from the torque (N·m) and the rotation speed (rpm) of the stirrer, and dividing the power by the volume (m³) of the contents.

The stirring power density was then reduced to 0.1 kW/m³. An aspirator was then connected to the glass vessel, and the inside of the vessel was decompressed to remove microbubbles contained in the emulsion. Ten minutes after the start of the decompression, stirring was stopped, and the inside of the vessel was returned to atmospheric pressure.

A stainless vessel having a length of about 140 mm, a width of about 110 mm and a depth of about 60 mm was filled with the contents of the glass vessel (high internal phase emulsion). The stainless vessel was placed in an oven adjusted to 70° C., and the vinyl-based monomer and the like were polymerized for about 18 hours to obtain a crosslinked polymer (HIPE foam) containing water. The stainless vessel was removed from the oven and cooled to room temperature.

After the cooling, the HIPE foam was removed from the stainless vessel and washed with water. The HIPE foam was dewatered, and the HIPE foam was then dried to a constant weight in an oven at 85° C. In this way, a rectangular parallelepiped-shaped HIPE foam including a vinyl-based crosslinked polymer was obtained. The apparent density of this HIPE foam was 147 g/L.

Table 2 shows a preparation composition and the like in this example. In the table, compound names are abbreviated as follows.

St: styrene
BA: butyl acrylate
MMA: methyl methacrylate
DVB: divinylbenzene
TMPTA: trimethylolpropane triacrylate
BDODA: butanediol diacrylate
PEGDA: polyethylene glycol diacrylate
UDA: urethane diacrylate
LPO: dilauroyl peroxide Examples 1-2 to 1-13 and Comparative Examples 1-1 to 1-6

HIPE foams were produced in the same manner as in Example 1-1 except that the types and blending ratios of the vinyl-based monomer, the first crosslinking agent and the second crosslinking agent, the blending ratio of the emulsifier, and the addition amount of water were changed as shown in Tables 2 and 3. In Example 1-10, a W/O high internal phase emulsion was adjusted by starting emulsification while stirring the organic phase at a stirring power density of 3.1 kW/m³. The stirring power density after completion of emulsification was 2.0 kW/m³. In Example 1-11, a W/O high internal phase emulsion was adjusted by starting emulsification while stirring the organic phase at a stirring power density of 1.0 kW/m³. The stirring power density after completion of emulsification was 0.9 kW/m³. In Example 1-12, a W/O high internal phase emulsion was adjusted by starting emulsification while stirring the organic phase at a stirring power density of 0.5 kW/m³. The stirring power density after completion of emulsification was 0.4 kW/m³

[Evaluation]

For Examples 1-1 to 1-13 and Comparative Examples 1-1 to 1-6, measurement and evaluation were performed as described below. Table 2 shows results for Examples 1-1 to 1-13, and Table 3 shows results for Comparative Examples 1-1 to 1-6.

(Apparent Density: $\rho$)

Three test pieces having a specified size (specifically, a thickness of 20 mm, a width of 25 mm, and a length of 120 mm) and having no skin layer were cut out from the HIPE foam produced as described above, with the test piece including the center of the HIPE foam. The weight and the actual size (specifically, volume) of the test piece were then measured. The apparent density of the test piece was calculated by dividing the weight by the volume of the test piece. The arithmetic average value of the apparent densities of the three test pieces was taken as an apparent density $\rho$ of the HIPE foam.

(Glass Transition Temperature: Tg)

In accordance with JIS K 7121:1987, Tg was calculated by differential scanning calorimetry (i.e., DSC) analysis using the following method. DSC 250 manufactured by TA Instruments was used as a measuring apparatus. Specifically, first, about 2 mg of a test piece was taken from the vicinity of the center of the HIPE foam. As conditioning of a test piece, that in "(3) Measurement of glass transition temperature after certain heat treatment" was adopted. Specifically, the test piece was heated at a temperature rising rate of 10° C./min to a temperature higher by about 30° C. than the temperature at the end of glass transition, held at this temperature for 10 minutes, and then cooled at a cooling rate of 10° C./min to a temperature lower by about 50° C. than the glass transition temperature to condition the test piece. A DSC measurement was then performed on the conditioned test piece under the condition of a heating rate of 10° C./min to obtain a DSC curve. The midpoint glass transition temperature was determined from this DSC curve, and this value was taken as a glass transition temperature Tg of the crosslinked polymer.

(Storage Elastic Modulus at 23° C.: E')

Three test pieces each having a cubic shape of 5 mm×5 mm×5 mm and having no skin layer were cut out from the vicinity of the center of the HIPE foam. The storage elastic modulus E' at 23° C. was measured by performing dynamic mechanical analysis (DMA) on the three test pieces. DMA 7100 manufactured by Hitachi High-Tech Science Corporation was used as a measuring apparatus. The arithmetic average value of the measured values was taken as a storage elastic modulus E' at 23° C. Details of the measurement conditions are as follows.

Deformation mode: compression
Temperature: 0 to 200° C.
Temperature rising rate: 5° C./min
Frequency: 1 Hz
Load: 98 mN (Molecular weight between crosslinking points: Mc)

The molecular weight between crosslinking points Mc was calculated from the above expression (II) using the storage elastic modulus E' at a rubber-like flat portion and the temperature T, which had been measured by dynamic mechanical analysis on each of the three test pieces. A typical example of the DMA curve for the HIPE foams of examples is shown in FIG. 2. The DMA curve is obtained by plotting the temperature on the abscissa and the storage elastic modulus E' on the ordinate. In examples, first, the storage elastic modulus E' at each of three temperatures randomly selected from the temperature range of Tg+50° C. to Tg+80° C. at a rubber-like flat portion of the crosslinked polymer constituting the HIPE foam was measured. The molecular weight between crosslinking points of each test piece was then calculated from each of the measured storage elastic moduli E'. The arithmetic average value of the nine calculated molecular weight between crosslinking points was calculated, and this value was adopted as a molecular weight between crosslinking points Mc. Tg is a glass transition temperature of the HIPE foam.

(Smoothness of Cut Surface)

First, the HIPE foam was machined as follows. Specifically, a linear groove was formed in the HIPE foam using NCN 8200 manufactured by The SHODA Company as a cutting machine and Square End Mill (4 blades, diameter: 20 mm) manufactured by Fukuda Seiko Co., Ltd. as a cutting tool. Cutting conditions are as follows.

Rotation speed of mill: 3000 rpm

Mill feed rate: 5000 mm/min

Cutting depth: 10 mm

Next, the surface roughness of the cut surface (specifically, bottom surface of the groove) was measured using a 3D shape measuring machine VR-3200 manufactured by KEYENCE CORPORATION. The observation magnification was 12 times, and the actual size of the measurement region was in the range of about 18 mm×24 mm. This range corresponds to the entire region of the observation surface. As the surface roughness, an arithmetic average surface roughness Sa and a maximum surface roughness Sz were measured. The arithmetic average surface roughness Sa is an average value of irregularities with respect to a reference surface, and the maximum surface roughness is a difference between the highest point and the lowest point.

A test piece having an arithmetic average surface roughness Sa of 20 μm or less and a maximum surface roughness Sz of 500 μm or less was rated "○" and a test piece having an arithmetic average surface roughness of more than 20 μm or a maximum surface roughness Sz of more than 500 μm was rated "x" for smoothness.

(Resistance to Chipping)

For evaluating resistance to chipping, a linear groove was formed in the HIPE foam with the same cutting machine and cutting conditions as in the above-described evaluation of the smoothness of a cut surface. The state of the processed HIPE foam was visually evaluated. A test piece which was not chipped or cracked at edge portions (i.e., right angle portions formed by a porous material surface and the groove in the upper portion of the groove) in the processed HIPE foam was rated "○" for resistance to chipping, and a test piece which was chipped or cracked at the edge portions was rated "x" for resistance to chipping.

(Charpy Impact Strength: S)

Test pieces each having a thickness of 4 mm, a width of 10 mm, and a length of 80 mm and having no skin layer were cut out from the vicinity of the center of the HIPE foam. A Charpy impact test was conducted on the test piece in accordance with JIS K 7111:2006 to measure the Charpy impact strength. The measurement was performed under a notch-free condition at a measurement temperature of 23° C. using a Charpy impact testing machine from Toyo Seiki Seisaku-sho, Ltd. The Charpy impact strength was divided by the apparent density of the test piece to calculate the value S/ρ of the Charpy impact strength per apparent density.

Average Cell Diameter (Resistance to Sand Catching)

The average cell diameter of the HIPE foam was measured to determine the resistance to sand catching. For the resistance to sand catching, a test piece having an average cell diameter of 100 μm or less was rated "○" and a test piece having an average cell diameter of more than 100 μm was rated "x". The average cell diameter is measured as follows. Using a feather blade, samples for observation were cut out from the centers in the shorter-size direction and the thickness direction and the centers in the thickness direction at both ends in the shorter-size direction in a rectangular parallelepiped-shaped HIPE foam. The sample was then observed with a low-vacuum scanning electron microscope (Miniscope (registered trademark) TM 3030 Plus manufactured by Hitachi High-Tech Science Corporation), and a picture of a cross-section was taken. A typical example of the picture of a cross-section (magnification: 500 times) in examples is shown in FIG. 1. Detailed observation conditions were as follows.

Pretreatment of sample: conductive treatment of the sample was performed using a metal coating apparatus (MSP-1S from Vacuum Device Inc.). Au—Pd was used for a target electrode.

Observation magnification: 50 times

Acceleration voltage: 5 kV

Observation conditions: Surface

Observation mode: Secondary electron (standard)

Next, the taken picture of a cross-section was analyzed with image processing software (NanoHunter NS2K-Pro from Nanosystem Co., Ltd.), and the average cell diameter of each sample was determined. The obtained three average cell diameters were arithmetically averaged to determine the average cell diameter of the HIPE foam. Detailed analysis procedures and conditions were as follows.

(1) Monochrome conversion (2) Smoothing filter (3×3, 8 neighbors, number of processings=1)

(3) Density unevenness correction (brighter than background, size=5)

(4) NS method binarization (darker than background, sharpness=9, sensitivity=1, noise removal, concentration range=0 to 255)

(5) Shrinkage (8 neighbors, number of processings=1)

(6) Selection of image by amount of characteristic (area) (selection of only 50 to ∞ m$^2$, 8 neighbors)

(7) Expansion without connection to neighbors (8 neighbors, number of processings=3)

(8) Measurement of equivalent circle diameter (calculated from area, 8 neighbors)

TABLE 2

| Example No. | | | Example 1-1 | Example 1-2 | Example 1-3 | Example 1-4 | Example 1-5 | Example 1-6 | Example 1-7 |
|---|---|---|---|---|---|---|---|---|---|
| Organic Phase | Vinyl-based Monomer | St | 54 | 67.5 | 42.5 | 47 | 36 | 64 | 56 |
| | | BA | 24 | 17.5 | 29.5 | 21 | 42 | 14 | 24 |

TABLE 2-continued

| | | | | | | | | | |
|---|---|---|---|---|---|---|---|---|---|
| (Continuous Phase) | [Parts by Weight] | MMA | — | — | — | — | — | — | — |
| | First Crosslinking Agent [Parts by Weight] | DVB | 12 | 5 | 18 | 12 | 12 | 12 | — |
| | | TMPTA | — | — | — | — | — | — | 10 |
| | | BDODA | — | — | — | — | — | — | — |
| | Second Crosslinking Agent [Parts by Weight] | PEGDA | 5 | 5 | 5 | 15 | 5 | 5 | 5 |
| | | UDA | — | — | — | — | — | — | — |
| | Emulsifier [Parts by Weight] | CRS-75 | 5 | 5 | 5 | 5 | 5 | 5 | 5 |
| | Polymerization Initiator [Parts by Weight] | LPO | 0.5 | 0.5 | 0.5 | 0.5 | 0.5 | 0.5 | 0.5 |
| Aqueous Phase (Dispersed Phase) [Parts by Weight] | | Purified Water | 614 | 614 | 614 | 614 | 614 | 614 | 614 |
| Physical Properties | $\rho$ [kg/m³] | | 147 | 146 | 145 | 145 | 148 | 143 | 142 |
| | Tg [°C] | | 69 | 69 | 69 | 60 | 41 | 89 | 63 |
| | E' [MPa] | | 24.9 | 27.4 | 21.8 | 30.6 | 31.7 | 22.4 | 31.8 |
| | E'/$\rho$ [kN·m/kg] | | 169 | 188 | 150 | 211 | 214 | 157 | 224 |
| | Mc | | 4840 | 18170 | 3090 | 3690 | 3780 | 5580 | 5480 |
| | Sa [μm] | | 6 | 18 | 10 | 12 | 14 | 10 | 12 |
| | Sz [μm] | | 200 | 491 | 112 | 494 | 271 | 203 | 199 |
| | Smoothness | | ○ | ○ | ○ | ○ | ○ | ○ | ○ |
| | S [kJ/m²] | | 0.77 | 0.86 | 0.68 | 0.80 | 1.27 | 0.81 | 0.77 |
| | S/$\rho$ [J·m/kg] | | 5.2 | 5.9 | 4.7 | 5.5 | 8.6 | 5.7 | 5.4 |
| | Resistance to Chipping | | ○ | ○ | ○ | ○ | ○ | ○ | ○ |
| | Average Cell Diameter [μm] | | 31 | 32 | 30 | 30 | 30 | 30 | 28 |
| | Resistance to Sand Catching | | ○ | ○ | ○ | ○ | ○ | ○ | ○ |

| | | Example No. | Example 1-8 | Example 1-9 | Example 1-10 | Example 1-11 | Example 1-12 | Example 1-13 |
|---|---|---|---|---|---|---|---|---|
| Organic Phase (Continuous Phase) | Vinyl-based Monomer [Parts by Weight] | St | 54 | 17.5 | 48.5 | 55 | 54 | 51 |
| | | BA | 24 | 10 | 25 | 22 | 24 | 24 |
| | | MMA | — | 50 | — | — | — | — |
| | First Crosslinking Agent [Parts by Weight] | DVB | 12 | — | 14 | 10.5 | 12 | — |
| | | TMPTA | — | — | — | — | — | — |
| | | BDODA | — | 10 | — | — | — | 20 |
| | Second Crosslinking Agent [Parts by Weight] | PEGDA | — | 5 | 5 | 5 | 5 | — |
| | | UDA | 5 | — | — | — | — | — |
| | Emulsifier [Parts by Weight] | CRS-75 | 5 | 7.5 | 7.5 | 7.5 | 5 | 5 |
| | Polymerization Initiator [Parts by Weight] | LPO | 0.5 | 0.5 | 0.5 | 0.5 | 0.5 | 0.5 |
| Aqueous Phase (Dispersed Phase) [Parts by Weight] | | Purified Water | 614 | 614 | 900 | 455 | 614 | 614 |
| Physical Properties | $\rho$ [kg/m³] | | 145 | 140 | 100 | 190 | 140 | 143 |
| | Tg [°C] | | 68 | 70 | 70 | 70 | 70 | 71 |
| | E' [MPa] | | 18.4 | 25.0 | 17.0 | 34.5 | 25.0 | 19.2 |
| | E'/$\rho$ [kN·m/kg] | | 127 | 179 | 170 | 182 | 179 | 134 |
| | Mc | | 5500 | 6000 | 4960 | 4360 | 4750 | 4700 |
| | Sa [μm] | | 10 | 15 | 9 | 6 | 15 | 8 |
| | Sz [μm] | | 160 | 202 | 280 | 99 | 350 | 156 |
| | Smoothness | | ○ | ○ | ○ | ○ | ○ | ○ |
| | S [kJ/m²] | | 0.90 | 0.67 | 0.55 | 1.45 | 0.72 | 0.77 |
| | S/$\rho$ [J·m/kg] | | 6.2 | 4.8 | 5.5 | 7.6 | 5.1 | 5.4 |
| | Resistance to Chipping | | ○ | ○ | ○ | ○ | ○ | ○ |
| | Average Cell Diameter [μm] | | 24 | 35 | 31 | 29 | 50 | 30 |

TABLE 2-continued

| | Comparative Example 1-1 | Comparative Example 1-2 | Comparative Example 1-3 | Comparative Example 1-4 | Comparative Example 1-5 | Comparative Example 1-6 |
|---|---|---|---|---|---|---|
| Resistance to Sand Catching | ○ | ○ | ○ | ○ | ○ | ○ |

TABLE 3

| Comparative Example, Reference Example No. | | | Comparative Example 1-1 | Comparative Example 1-2 | Comparative Example 1-3 | Comparative Example 1-4 | Comparative Example 1-5 | Comparative Example 1-6 |
|---|---|---|---|---|---|---|---|---|
| Organic Phase (Continuous Phase) | Vinyl-based Monomer | St [Parts by Weight] | 71.5 | 34.5 | 80 | 67 | 53 | 13 |
| | | BA [Parts by Weight] | 15.5 | 33.5 | 0 | 13 | 5 | 65 |
| | First Crosslinking Agent | DVB[ [Parts by Weight] | 3 | 22 | 15 | 0 | 22 | 12 |
| | Second Crosslinking Agent | PEGDA [Parts by Weight] | 5 | 5 | 0 | 15 | 15 | 5 |
| | Emulsifier | CRS-75 [Parts by Weight] | 5 | 5 | 5 | 5 | 5 | 5 |
| | Polymerization Initiator | LPO [Parts by Weight] | 0.5 | 0.5 | 0.5 | 0.5 | 0.5 | 0.5 |
| Aqueous Phase (Dispersed Phase) | | Purified Water [Parts by Weight] | 614 | 614 | 614 | 614 | 614 | 614 |
| Physical Properties | $\rho$ [kg/m$^3$]$\rho$ | | 147 | 145 | 139 | 143 | 143 | 153 |
| | Tg [° C.] | | 69 | 71 | 130 | 56 | 109 | −12 |
| | E' [MPa] | | 21.0 | 24.6 | 28.3 | 5.4 | 29.4 | 1.2 |
| | E'/$\rho$ [kN · m/kg] | | 143 | 170 | 204 | 38 | 206 | 8 |
| | Mc | | 52050 | 1980 | 4350 | 16000 | 1770 | 3960 |
| | Sa [μm] | | 27 | 7 | 8 | 29 | 7 | 300 |
| | Sz [μm] | | 519 | 105 | 156 | 4207 | 291 | 2149 |
| | Smoothness | | x | ○ | ○ | x | ○ | x |
| | S [kJ/m$^2$] | | 0.99 | 0.64 | 0.60 | 2.22 | 0.46 | Unmeasurable |
| | S/$\rho$ [J• · m/kg] | | 6.8 | 4.4 | 4.3 | 15.5 | 3.2 | — |
| | Resistance to Chipping | | ○ | x | x | ○ | x | x |
| | Average Cell Diameter [μm] | | 32 | 30 | 30 | 30 | 30 | 30 |
| | Resistance to Sand Catching | | ○ | ○ | ○ | ○ | ○ | ○ |

As is understood from Table 2, the HIPE foams of examples enable the processing rate to be sufficiently high during machining. In the evaluation of smoothness, machining was performed under the condition of a sufficiently high rate of 5000 mm/min in terms of a mill feed rate, and in examples, a cut surface excellent in smoothness was formed without causing chipping, cracking, or the like in the HIPE foam. This is because in examples, the apparent density $\rho$, the value S/$\rho$ of the Charpy impact strength per apparent density, the value E'/$\rho$ of the storage elastic modulus per apparent density, and the molecular weight between crosslinking points Mc are within the above-described predetermined ranges.

The vinyl-based crosslinked polymers forming the HIPE foams of examples have an open-cell structure shown in the typical example of FIG. 1 in addition to a crosslinked structure by a crosslinking agent. Thus, shrinkage due to a pressure difference between the inside and the outside of the cell, which is likely to occur in a porous material having a closed-cell structure, hardly occurs, and the size is less likely to change with time, so that excellent dimensional stability is obtained. Thus, for example, when the machined product is used as a wooden model, a high-precision casting can be produced. Since the machined product itself can be prevented from undergoing a shape change and a size change, the HIPE foams of examples are suitable for various applications in which prevention of a size change is required.

The HIPE foams of examples are crosslinked polymers formed from a copolymer of at least a styrene-based monomer and an acryl-based monomer. Thus, the HIPE foam has well-balanced stiffness and toughness while having moderate brittleness. Thus, the HIPE foam is suitable for machining.

The average cell diameter of the HIPE foam of each of examples is sufficiently smaller than the particle size of silica sand used in a sand mold. Therefore, the HIPE foam is suitable for a casting model, and particularly suitable for a wooden model used for forming a sand mold. When the machined products of the HIPE foams of examples are used as casting models, it is not necessarily required to provide a coating layer. Since the HIPE foams of examples have a small average cell diameter, a machined product having a clear appearance (i.e., fine texture) and high designability is obtained by machining.

In Comparative Example 1-1, which is an example in which the molecular weight between crosslinking points is large, the smoothness of a cut surface was insufficient.

In Comparative Example 1-2, Comparative Example 1-3, and Comparative Example 1-5, which are examples in which the value S/ρ of the Charpy impact strength per apparent density is small, chipping is likely to occur during machining.

In Comparative Example 1-4 and Comparative Example 1-6, which are examples in which the value E'/ρ of the storage elastic modulus per apparent density at 23° C. is small, the smoothness of a cut surface was insufficient.

Hereinafter, examples of the porous vinyl-based crosslinked polymer (specifically, HIPE foam) according to the fourth aspect of the present disclosure, and comparative examples will be described. In the examples, porous vinyl-based crosslinked polymers (porous materials) shown in examples in Tables 5 and 6 and comparative examples in Table 7 were produced by the following methods. The porous material in the fourth aspect of the present disclosure is not limited to the following examples, and the configuration can be changed as appropriate within the spirit of the present disclosure. "%" in examples means Wt %.

Example 2-1

First, a glass vessel equipped with a stirrer and having an internal volume of 3 L was charged with 48.5 g of styrene and 25 g of butyl acrylate as monomers, 14 g of divinyl benzene having a purity of 57% (7.98 g as divinylbenzene) as a crosslinking agent A, 5 g of polyethylene glycol diacrylate (specifically, NK Ester A-400 manufactured by Shin-Nakamura Chemical Co., Ltd./purity: 95%) (4.75 g as polyethylene glycol diacrylate) as a crosslinking agent B, 7.5 g of polyglycerol polyricinoleate (specifically, CRS-75 manufactured by Sakamoto Yakuhin Kogyo Co., Ltd.) as an emulsifier, and 0.5 g of dilauroyl peroxide as a polymerization initiator. These substances were mixed in the glass vessel to form an organic phase (specifically, oily liquid).

As the stirrer, a stirrer with a torque converter was used.

900 g of deionized water was added at a rate of about 450 g/min while the organic phase was stirred at a stirring power density of 1.6 kW/m³. Even after the addition of water was completed, stirring was continued for 10 minutes to prepare a water-in-oil (i.e., W/O) high internal phase emulsion. The stirring power density after completion of emulsification was 1.4 kW/m³.

The stirring power density (unit: kW/m³) is determined by calculating a power (unit: kW) from the torque (unit: N·m) and the rotation speed (unit: rpm) of the stirrer, and dividing the power (unit: kW) by the volume (unit: m³) of the contents.

The stirring power density was then reduced to 0.1 kW/m³. An aspirator was then connected to the glass vessel, and the inside of the vessel was decompressed to remove microbubbles contained in the emulsion. Ten minutes after the start of the decompression, stirring was stopped, and the inside of the vessel was returned to atmospheric pressure.

A stainless vessel having a length of about 140 mm, a width of about 110 mm, and a depth of about 60 mm was filled with the contents of the glass vessel (high internal phase emulsion). The stainless vessel was placed in an oven adjusted to 70° C., and the vinyl-based monomer and the like were polymerized for about 18 hours to obtain a HIPE foam. The stainless vessel was removed from the oven and cooled to room temperature.

After the cooling, the HIPE foam was removed from the stainless vessel and washed with water. The HIPE foam was then dried to a constant weight in an oven at 85° C. In this way, a rectangular parallelepiped-shaped porous vinyl-based crosslinked polymer was obtained. The apparent density of the porous vinyl-based crosslinked polymer was 100 g/L.

Table 5 shows a preparation composition and the like in this example. In the table, the net blending amount is calculated with the exclusion of an emulsifier, a polymerization initiator, and impurities. In addition, the pure blending amount of the crosslinking agent A, the net blending amount of the crosslinking agent B, the sum (A+B) of the net blending amounts of the crosslinking agent A and the crosslinking agent B, and the ratio (A/B) of the net blending amount of the crosslinking agent A to the crosslinking agent B are expressed as relative amounts against the total amount of the styrene-based monomer, the acryl-based monomer, and the crosslinking agent, which is defined as 100 parts by weight. In the table, compound names are abbreviated as follows.

St: styrene
BA: butyl acrylate
MMA: methyl methacrylate
DVB: divinylbenzene
1,4-BDODA: 1,4-butanediol diacrylate
TMPTA: trimethylolpropane triacrylate
1,6-HDODA: 1,6-hexanediol diacrylate
1,9-NDODA: 1,9-nonanediol diacrylate
PEGDA: polyethylene glycol diacrylate
UDA: urethane diacrylate
EpDA: epoxy diacrylate
X-22-164C: methacrylic-modified silicone on both ends
LPO: dilauroyl peroxide

Examples 2-2 to 2-16 and Comparative Examples 2-1 to 2-10

Porous materials were produced in the same manner as in Example 2-1 except that the types and blending ratios of the monomer, the crosslinking agent A, and the crosslinking agent B, the blending ratio of the emulsifier, and the addition amount of water were changed as shown in Tables 5 to 7. Table 4 shows details of the crosslinking agents used in examples and comparative examples shown in Tables 5 to 7.
[Evaluation]

For Examples 2-1 to 2-16 and Comparative Examples 2-1 to 2-10, measurement and evaluation were performed as described below. Tables 5 to 7 show the results.
(Apparent Density ρ)

The measurement method is the same as that for the HIPE foams of Examples 1-1 to 1-13 and Comparative Examples 1-1 to 1-6.
(Glass Transition Temperature Tg)

The measurement method is the same as that for the HIPE foams of Examples 1-1 to 1-13 and Comparative Examples 1-1 to 1-6.
(Molecular Weight Between Crosslinking Points Mc)

The measurement method is the same as that for the HIPE foams of Examples 1-1 to 1-13 and Comparative Examples 1-1 to 1-6.
(Average Cell Diameter)

The measurement method is the same as that for the HIPE foams of Examples 1-1 to 1-13 and Comparative Examples 1-1 to 1-6.

(Evaluation of Stiffness: Measurement of Compressive Strength)

Test pieces having no skin layer and having the following size were cut out from the vicinity of the center of the porous material. Using these test pieces, a compression test was conducted to measure the compressive strength. Specifically, compressive loads at a strain of 5% and a strain of 25% were determined in accordance with JIS K 6767:1999 using a tabletop precision universal tester (specifically, Autograph AGS-10kNX from Shimadzu Corporation). This compressive load was divided by the pressure receiving area of the test piece to calculate the compressive strength (i.e., compressive stresses at 5% and 25%). After the compression test, the test piece compressed to 75% was taken out, aged for 24 hours in a thermostatic chamber at a temperature of 23° C. and a humidity of 50%, and the thickness $t_2$ of the test piece was then measured. From the thickness $t_2$ and the thickness $t_1$ before the compression test, the restoration ratio was calculated in accordance with the following expression (III). Details of the compression test are as follows. A test piece in which the compressive stress at 5% per apparent density was 5000 Pa or more and the restoration ratio was 50% or more was rated "○", and the other test pieces were rated "x".

$$\text{Restoration ratio } [\%] = t_2/t_1 \times 100 \qquad \text{(III)}$$

Room temperature: 23° C.
Humidity: 50%
Test piece size: length: 50 mm, width: 50 mm, and thickness: 25 mm Compression rate 10 mm/min
Compression ratio 0 to 75%

(Evaluation of Toughness: Measurement of Bending Rupture Point Strain)

Test pieces having no skin layer and having the following size were cut out from the vicinity of the center of the porous material. Using these test pieces, a three-point bending test was conducted to measure the bending rupture point strain. The measurement was performed in accordance with JIS K 7221-1:2006 using a tabletop precision universal tester (specifically, Autograph AGS-10kNX manufactured by Shimadzu Corporation). Detailed conditions are as follows. A test piece having a bending rupture point strain of 6.5% or more was rated "○", and a test piece having a bending rupture point strain of less than 6.5% was rated "x".

Temperature: room temperature (specifically, 23° C.)
Humidity: 50%
Test piece size: 20 mm×25 mm×120 mm
Distance between supporting points: 100 mm
Tip of supporting stand and indenter: cylindrical shape with a radius of 5 mm
Descending rate of indenter: 10 mm/min

TABLE 4

| Name | Number of Functional Groups [PCS] | Molecular Weight | Functional Group Equivalent Weight [g/mol] | Purity [%] |
|---|---|---|---|---|
| DVB (divinylbenzene) | 2 | 130 | 65 | 57 |
| 1,4-BDODA (1,4-butanediol diacrylate) | 2 | 198 | 99 | 97 |
| TMPTA(trimethylolpropane triacrylate) | 3 | 338 | 113 | 90 |
| 1,6-HDODA (1,6-hexanediol diacrylate) | 2 | 226 | 113 | 92 |
| 1,9-NDODA (1,9-nonanediol diacrylate) | 2 | 268 | 134 | 95 |
| PEGDA (polyethylene glycol diacrylate) | 2 | 508 | 254 | 95 |
| UDA (urethane diacrylate) | 2 | 1500 | 750 | 95 |
| EpDA (epoxy diacrylate) | 2 | 1500 | 750 | 95 |
| X-22-164C (methacrylic-modified silicone on both ends) | 2 | 4800 | 2400 | 95 |

TABLE 5

| Example No. | | | Example 2-1 | Example 2-2 | Example 2-3 | Example 2-4 | Example 2-5 |
|---|---|---|---|---|---|---|---|
| Organic Phase (Continuous Phase) | Monomer (Monofunction) | St [Parts by Weight] | 48.5 | 54 | 55 | 63 | 42.5 |
| | | BA [Parts by Weight] | 25 | 24 | 22 | 20 | 29.5 |
| | | MMA [Parts by Weight] | — | — | — | — | — |
| | Crosslinking Agent A | Type of A (Purity [%]) | DVB (57) | DVB (57) | DVB (57) | DVB (57) | DVB (57) |
| | | Addition Amount of A [Parts by Weight] | 14 | 12 | 10.5 | 7 | 18 |
| | Crosslinking Agent B | Type of B (Purity [%]) | PEGDA (95) | PEGDA (95) | PEGDA (95) | PEGDA (95) | PEGDA (95) |
| | | Addition Amount of B [Parts by Weight] | 5 | 5 | 5 | 5 | 5 |

TABLE 5-continued

| | | | | | | | |
|---|---|---|---|---|---|---|---|
| | Emulsifier | CRS-75 [Parts by Weight] | 7.5 | 5 | 7.5 | 5 | 5 |
| | Polymerization Initiator | LPO [Parts by Weight] | 0.5 | 0.5 | 0.5 | 0.5 | 0.5 |
| Aqueous Phase (Dispersed Phase) | | Purified Water [Parts by Weight] | 900 | 614 | 455 | 614 | 614 |
| Detailed Conditions of Crosslinking Agent | Functional Group Equivalent Weight of Crosslinking Agent A [g/mol] | | 65 | 65 | 65 | 65 | 65 |
| | Functional Group Equivalent Weight of Crosslinking Agent B [g/mol] | | 254 | 254 | 254 | 254 | 254 |
| | Difference of Functional Group Equivalent Weights between Crosslinking Agents A and B [g/mol] | | 189 | 189 | 189 | 189 | 189 |
| | Pure Compounding Amount of Crosslinking Agent A* [Parts by Weight] | | 9.3 | 7.6 | 6.8 | 4.3 | 11.8 |
| | Pure Compounding Amount of Crosslinking Agent B* [Parts by Weight] | | 5.5 | 5.3 | 5.4 | 5.2 | 5.5 |
| | Sum of Pure Compounding Amounts of Crosslinking Agents A and B (A + B) [Parts by Weight] | | 14.8 | 12.9 | 12.2 | 9.5 | 17.3 |
| | Ratio of Pure Compounding Amounts of Crosslinking Agents A and B (A/B) | | 1.68 | 1.44 | 1.26 | 0.84 | 2.16 |
| Physical Properties | Density [kg/m³] | | 100 | 147 | 190 | 147 | 145 |
| | Tg [° C.] | | 70 | 68 | 70 | 68 | 68 |
| | Molecular Weight Between Crosslinking Points | | 4960 | 4840 | 4360 | 10500 | 3090 |
| | Average Cell Diameter [μm] | | 31 | 31 | 29 | 32 | 30 |
| | Compressive Stress at 5% [Pa]/ρ [kg/m³] | | 5590 | 7910 | 8680 | 8280 | 6820 |
| | Compressive Stress at 25% [Pa]/ρ [kg/m³] | | 5570 | 8230 | 9800 | 8640 | 7390 |
| | Restoration Ratio after compression at 75% [%] | | 56.5 | 56.9 | 61.5 | 50.5 | 65.2 |
| | Stiffness | | ○ | ○ | ○ | ○ | ○ |
| | Bending Rupture Point Strain [%] | | 7.4 | 8.0 | 7.6 | 9.0 | 7.0 |
| | Toughness | | ○ | ○ | ○ | ○ | ○ |

| | | Example No. | Example 2-6 | Example 2-7 | Example 2-8 | Example 2-9 |
|---|---|---|---|---|---|---|
| Organic Phase (Continuous Phase) | Monomer (Monofunction) | St [Parts by Weight] | 55.5 | 47 | 64 | 50 |
| | | BA [Parts by Weight] | 24.5 | 21 | 10 | 15 |
| | | MMA [Parts by Weight] | — | — | — | — |
| | Crosslinking Agent A | Type of A (Purity [%]) | DVB (57) | DVB (57) | DVB (57) | DVB (57) |
| | | Addition Amount of A [Parts by Weight] | 12 | 12 | 6 | 23 |

TABLE 5-continued

| | | PEGDA (95) | PEGDA (95) | PEGDA (95) | PEGDA (95) |
|---|---|---|---|---|---|
| Crosslinking Agent B | Type of B (Purity [%]) | | | | |
| | Addition Amount of B [Parts by Weight] | 3 | 15 | 15 | 7 |
| Emulsifier | CRS-75 [Parts by Weight] | 5 | 5 | 5 | 5 |
| Polymerization Initiator | LPO [Parts by Weight] | 0.5 | 0.5 | 0.5 | 0.5 |
| Aqueous Phase (Dispersed Phase) | Purified Water [Parts by Weight] | 614 | 614 | 614 | 614 |
| Detailed Conditions of Crosslinking Agent | Functional Group Equivalent Weight of Crosslinking Agent A [g/mol] | 65 | 65 | 65 | 65 |
| | Functional Group Equivalent Weight of Crosslinking Agent B [g/mol] | 254 | 254 | 254 | 254 |
| | Difference of Functional Group Equivalent Weights between Crosslinking Agents A and B [g/mol] | 189 | 189 | 189 | 189 |
| | Pure Compounding Amount of Crosslinking Agent A* [Parts by Weight] | 7.6 | 7.7 | 3.7 | 15.5 |
| | Pure Compounding Amount of Crosslinking Agent B* [Parts by Weight] | 3.2 | 16.0 | 15.5 | 7.8 |
| | Sum of Pure Compounding Amounts of Crosslinking Agents A and B (A + B) [Parts by Weight] | 10.8 | 23.7 | 19.2 | 23.3 |
| | Ratio of Pure Compounding Amounts of Crosslinking Agents A and B (A/B) | 2.40 | 0.48 | 0.24 | 1.97 |
| Physical Properties | Density [kg/m³] | 152 | 145 | 144 | 143 |
| | Tg [° C.] | 71 | 59 | 69 | 71 |
| | Molecular Weight Between Crosslinking Points | 5660 | 6390 | 1770 | 1500 |
| | Average Cell Diameter [μm] | 30 | 30 | 30 | 28 |
| | Compressive Stress at 5% [Pa]/ρ [kg/m³] | 7410 | 6570 | 8670 | 6500 |
| | Compressive Stress at 25% [Pa]/ρ [kg/m³] | 8100 | 6770 | 9180 | 7270 |
| | Restoration Ratio after compression at 75% [%] | 52.3 | 66 | 51.6 | 80.4 |
| | Stiffness | ○ | ○ | ○ | ○ |
| | Bending Rupture Point Strain [%] | 7.0 | 7.6 | 9.8 | 7.0 |
| | Toughness | ○ | ○ | ○ | ○ |

*A net blending amount was calculated excluding an emulsifier, a polymerization initiator, and impurities. The net blending amount is a blending amount based on a total of 100 parts by weight of vinyl-based monomer and a crosslinking agent (excluding impurities).

TABLE 6

| Example No. | | | Example 2-10 | Example 2-11 | Example 2-12 | Example 2-13 |
|---|---|---|---|---|---|---|
| Organic Phase (Continuous Phase) | Monomer (Monofunction) | St [Parts by Weight] | 56 | 56 | 54 | 56.5 |
| | | BA [Parts by Weight] | 24 | 24 | 24 | 23.5 |
| | | MMA [Parts by Weight] | — | — | — | — |
| | Crosslinking Agent A | Type of A (Purity [%]) | TMPTA (90) | 1,4-BDODA (97) | DVB (57) | DVB (57) |
| | | Addition Amount of A [Parts by Weight] | 10 | 10 | 12 | 10 |
| | Crosslinking Agent B | Type of B (Purity [%]) | PEGDA (95) | PEGDA (95) | UDA (95) | EpDA (95) |
| | | Addition Amount of B [Parts by Weight] | 5 | 5 | 5 | 5 |
| | Emulsifier | CRS-75 [Parts by Weight] | 5 | 5 | 5 | 5 |
| | Polymerization Initiator | LPO [Parts by Weight] | 0.5 | 0.5 | 0.5 | 0.5 |
| Aqueous Phase (Dispersed Phase) | | Purified Water [Parts by Weight] | 614 | 614 | 614 | 614 |
| Detailed Conditions of Crosslinking Agent | Functional Group Equivalent Weight of Crosslinking Agent A [g/mol] | | 113 | 99 | 65 | 65 |
| | Functional Group Equivalent Weight of Crosslinking Agent B [g/mol] | | 254 | 254 | 750 | 750 |
| | Difference of Functional Group Equivalent Weights between Crosslinking Agents A and B [g/mol] | | 141 | 155 | 685 | 685 |
| | Pure Compounding Amount of Crosslinking Agent A* [Parts by Weight] | | 9.6 | 10.3 | 7.6 | 6.3 |
| | Pure Compounding Amount of Crosslinking Agent B* [Parts by Weight] | | 5.1 | 5.0 | 5.3 | 5.3 |
| | Sum of Pure Compounding Amounts of Crosslinking Agents A and B (A + B) [Parts by Weight] | | 14.7 | 15.3 | 12.9 | 11.6 |
| | Ratio of Pure Compounding Amounts of Crosslinking Agents A and B (A/B) | | 1.89 | 2.04 | 1.44 | 1.20 |
| Physical Properties | Density [kg/m$^3$] | | 142 | 147 | 145 | 140 |
| | Tg [° C.] | | 63 | 56 | 68 | 70 |
| | Molecular Weight Between Crosslinking Points | | 5480 | 4710 | 5500 | 4580 |
| | Average Cell Diameter [μm] | | 28 | 30 | 24 | 28 |
| | Compressive Stress at 5% [Pa]/ρ [kg/m$^3$] | | 7950 | 6850 | 8290 | 7000 |
| | Compressive Stress at 25% [Pa]/ρ [kg/m$^3$] | | 7890 | 6780 | 8350 | 7250 |

TABLE 6-continued

| | | | | | | |
|---|---|---|---|---|---|---|
| Restoration Ratio after compression at 75% [%] | | | 52.3 | 50.1 | 54.1 | 55 |
| Stiffness | | | ○ | ○ | ○ | ○ |
| Bending Rupture Point Strain [%] | | | 9.8 | 10.4 | 7.4 | 8.4 |
| Toughness | | | ○ | ○ | ○ | ○ |

| | | Example No. | Example 2-14 | Example 2-15 | Example 2-16 |
|---|---|---|---|---|---|
| Organic Phase (Continuous Phase) | Monomer (Monofunction) | St [Parts by Weight] | 49 | 17.5 | 78 |
| | | BA [Parts by Weight] | 22.5 | 10 | — |
| | | MMA [Parts by Weight] | — | 50 | — |
| | Crosslinking Agent A | Type of A (Purity [%]) | DVB (57) | 1,4-BDODA (97) | DVB (57) |
| | | Addition Amount of A [Parts by Weight] | 13.5 | 10 | 12 |
| | Crosslinking Agent B | Type of B (Purity [%]) | X-22-164C (95) | PEGDA (95) | PEGDA (95) |
| | | Addition Amount of B [Parts by Weight] | 5 | 5 | 5 |
| | Emulsifier | CRS-75 [Parts by Weight] | 10 | 7.5 | 5 |
| | Polymerization Initiator | LPO [Parts by Weight] | 0.5 | 0.5 | 0.5 |
| Aqueous Phase (Dispersed Phase) | | Purified Water [Parts by Weight] | 614 | 614 | 614 |
| Detailed Conditions of Crosslinking Agent | Functional Group Equivalent Weight of Crosslinking Agent A [g/mol] | | 65 | 99 | 65 |
| | Functional Group Equivalent Weight of Crosslinking Agent B [g/mol] | | 2400 | 254 | 254 |
| | Difference of Functional Group Equivalent Weights between Crosslinking Agents A and B [g/mol] | | 2335 | 155 | 189 |
| | Pure Compounding Amount of Crosslinking Agent A* [Parts by Weight] | | 9.2 | 10.5 | 7.6 |
| | Pure Compounding Amount of Crosslinking Agent B* [Parts by Weight] | | 5.7 | 5.2 | 5.3 |
| | Sum of Pure Compounding Amounts of Crosslinking Agents A and B (A + B) [Parts by Weight] | | 14.9 | 15.7 | 12.9 |
| | Ratio of Pure Compounding Amounts of Crosslinking Agents A and B (A/B) | | 1.62 | 2.04 | 1.44 |

TABLE 6-continued

| | | | | | |
|---|---|---|---|---|---|
| Physical Properties | Density [kg/m³] | 141 | 141 | 136 |
| | Tg [° C.] | 70 | 70 | 110 |
| | Molecular Weight Between Crosslinking Points | 6000 | 6000 | 4700 |
| | Average Cell Diameter [μm] | 31 | 35 | 30 |
| | Compressive Stress at 5% [Pa]/ρ [kg/m³] | 6900 | 6900 | 11240 |
| | Compressive Stress at 25% [Pa]/ρ [kg/m³] | 7000 | 7960 | 12540 |
| | Restoration Ratio after compression at 75% [%] | 55 | 50.1 | 72.5 |
| | Stiffness | ○ | ○ | ○ |
| | Bending Rupture Point Strain [%] | 7.8 | 6.6 | 6.8 |
| | Toughness | ○ | ○ | ○ |

*A net blending amount was calculated excluding an emulsifier, a polymerization initiator, and impurities. The net blending amount is a blending amount based on a total of 100 parts by weight of vinyl-based monomer and a crosslinking agent (excluding impurities).

TABLE 7

| Comparative Example No. | | | Comparative Example 2-1 | Comparative Example 2-2 | Comparative Example 2-3 | Comparative Example 2-4 | Comparative Example 2-5 |
|---|---|---|---|---|---|---|---|
| Organic Phase (Continuous Phase) | Monomer (Monofunction) | St [Parts by Weight] | 22 | 71.5 | 37 | 69 | 57 |
| | | BA [Parts by Weight] | 39 | 15.5 | 25 | 18 | 25 |
| | | MMA [Parts by Weight] | — | — | — | — | — |
| | Crosslinking Agent A (Hard Crosslinking Agent) | Type of A (Purity [%]) | DVB (57) | DVB (57) | DVB (57) | DVB (57) | DVB (57) |
| | | Addition Amount of A [Parts by Weight] | 27 | 3 | 18 | 6 | 12 |
| | Crosslinking Agent B (Soft Crosslinking Agent) | Type of B (Purity [%]) | PEGDA (95) | PEGDA (95) | PEGDA (95) | PEGDA (95) | PEGDA (95) |
| | | Addition Amount of B [Parts by Weight] | 7 | 5 | 15 | 2 | 1 |
| | Emulsifier | CRS-75 [Parts by Weight] | 5 | 5 | 5 | 5 | 5 |
| | Polymerization Initiator | LPO [Parts by Weight] | 0.5 | 0.5 | 0.5 | 0.5 | 0.5 |
| Aqueous Phase (Dispersed Phase) | | Purified Water [Parts by Weight] | 614 | 614 | 614 | 614 | 614 |
| Detailed Conditions of Crosslinking Agent | Functional Group Equivalent Weight of Crosslinking Agent A [g/mol] | | 65 | 65 | 65 | 65 | 65 |
| | Functional Group Equivalent Weight of Crosslinking Agent B [g/mol] | | 254 | 254 | 254 | 254 | 254 |
| | Difference of Functional Group Equivalent Weights between Crosslinking Agents A and B [g/mol] | | 189 | 189 | 189 | 189 | 189 |
| | Pure Compounding Amount of Crosslinking Agent A* [Parts by Weight] | | 18.5 | 1.8 | 11.9 | 3.7 | 7.6 |

TABLE 7-continued

| | | | | | | |
|---|---|---|---|---|---|---|
| | Pure Compounding Amount of Crosslinking Agent B* [Parts by Weight] | 8.0 | 5.1 | 16.5 | 2.1 | 1.1 |
| | Sum of Pure Compounding Amounts of Crosslinking Agents A and B (A + B) [Parts by Weight] | 26.5 | 6.9 | 28.4 | 5.8 | 8.7 |
| | Ratio of Pure Compounding Amounts of Crosslinking Agents A and B (A/B) | 2.31 | 0.36 | 0.72 | 1.80 | 7.20 |
| Physical Properties | Density [kg/m$^3$] | 136 | 147 | 141 | 147 | 150 |
| | Tg [° C.] | 69 | 69 | 70 | 70 | 72 |
| | Molecular Weight Between Crosslinking Points | 1450 | 52050 | 1770 | 15000 | 5200 |
| | Average Cell Diameter [μm] | 34 | 32 | 30 | 29 | 28 |
| | Compressive Stress at 5% [Pa]/ρ [kg/m$^3$] | 4910 | 9140 | 6080 | 8350 | 8300 |
| | Compressive Stress at 25% [Pa]/ρ [kg/m$^3$] | 5500 | 9000 | 6690 | 9310 | 8680 |
| | Restoration Ratio after compression at 75% [%] | 93.2 | 46.6 | 81.3 | 44.3 | 53.0 |
| | Stiffness | x | x | ○ | x | ○ |
| | Bending Rupture Point Strain [%] | 3.8 | 10.0 | 4.2 | 9.4 | 5.0 |
| | Toughness | x | ○ | x | ○ | x |

| Comparative Example No. | | | Comparative Example 2-6 | Comparative Example 2-7 | Comparative Example 2-8 | Comparative Example 2-9 | Comparative Example 2-10 |
|---|---|---|---|---|---|---|---|
| Organic Phase (Continuous Phase) | Monomer (Monofunction) | St [Parts by Weight] | 55 | 80 | 67 | 63 | 58 |
| | | BA [Parts by Weight] | 15 | — | 13 | 15 | 20 |
| | | MMA [Parts by Weight] | — | — | — | — | — |
| | Crosslinking Agent A | Type of A (Purity [%]) | DVB (57) | DVB (57) | — | 1,9-NDODA (95) | DVB (57) |
| | | Addition Amount of A [Parts by Weight] | 6 | 15 | 0 | 12 | 12 |
| | Crosslinking Agent B | Type of B (Purity [%]) | PEGDA (95) | — | PEGDA (95) | PEGDA (95) | 1,6-NDODA (92) |
| | | Addition Amount of B [Parts by Weight] | 19 | 0 | 15 | 5 | 5 |
| | Emulsifier | CRS-75 [Parts by Weight] | 5 | 5 | 5 | 5 | 5 |
| | Polymerization Initiator | LPO [Parts by Weight] | 0.5 | 0.5 | 0.5 | 0.5 | 0.5 |
| Aqueous Phase (Dispersed Phase) | Purified Water [Parts by Weight] | | 614 | 614 | 614 | 614 | 614 |
| Detailed Conditions of Crosslinking Agent | Functional Group Equivalent Weight of Crosslinking Agent A [g/mol] | | 65 | 65 | 65 | 134 | 65 |
| | Functional Group Equivalent Weight of Crosslinking Agent B [g/mol] | | 254 | 254 | 254 | 254 | 113 |

TABLE 7-continued

| | | | | | | |
|---|---|---|---|---|---|---|
| | Difference of Functional Group Equivalent Weights between Crosslinking Agents A and B [g/mol] | 189 | 189 | 189 | 120 | 48 |
| | Pure Compounding Amount of Crosslinking Agent A* [Parts by Weight] | 3.7 | 9.7 | 0.0 | 12.1 | 7.6 |
| | Pure Compounding Amount of Crosslinking Agent B* [Parts by Weight] | 19.7 | 0.0 | 15.1 | 5.0 | 5.1 |
| | Sum of Pure Compounding Amounts of Crosslinking Agents A and B (A + B) [Parts by Weight] | 23.4 | 9.7 | 15.1 | 17.1 | 12.7 |
| | Ratio of Pure Compounding Amounts of Crosslinking Agents A and B (A/B) | 0.19 | — | 0.00 | 2.40 | 1.49 |
| Physical Properties | Density [kg/m³] | 144 | 154 | 140 | 145 | 137 |
| | Tg [° C.] | 62 | 130 | 56 | 64 | 86 |
| | Molecular Weight Between Crosslinking Points | 9000 | 4350 | 16000 | 7600 | 4500 |
| | Average Cell Diameter [μm] | 36 | 30 | 30 | 31 | 29 |
| | Compressive Stress at 5% [Pa]/ρ [kg/m³] | 6990 | 9620 | 7060 | 7760 | 9550 |
| | Compressive Stress at 25% [Pa]/ρ [kg/m³] | 6940 | 10630 | 6790 | 7770 | 10260 |
| | Restoration Ratio after compression at 75% [%] | 45.2 | 49.5 | 38.0 | 47.7 | 55.9 |
| | Stiffness | x | x | x | x | ○ |
| | Bending Rupture Point Strain [%] | 7.4 | 5.0 | 12.6 | 10.0 | 6.2 |
| | Toughness | ○ | x | ○ | ○ | x |

*A net blending amount was calculated excluding an emulsifier, a polymerization initiator, and impurities. The net blending amount is a blending amount based on a total of 100 parts by weight of vinyl-based monomer and a crosslinking agent (excluding impurities).

As is understood from Tables 5 and 6, the porous materials of examples exhibit excellent restoring force even if a large compressive stress is applied. Further, the porous materials are less likely to be ruptured by deformation because they have a high bending rupture point strain of 6.5% or more. Thus, the porous materials are excellent in both stiffness and toughness. This is because in polymerization of the high internal phase emulsion, a styrene-based monomer and/or an acryl-based monomer are used as monomers, the predetermined crosslinking agent A and crosslinking agent B are used in combination as crosslinking agents, and the addition amounts thereof are adjusted.

The porous materials of examples were machined as follows. Specifically, a linear groove was formed in the porous material using NCN 8200 manufactured by The SHODA Company as a cutting machine and Square End Mill (4 blades, diameter: 20 mm) manufactured by Fukuda Seiko Co., Ltd. as a cutting tool. Cutting conditions are as follows.

Rotation speed of mill: 3000 rpm
Mill feed rate: 5000 mm/min
Cutting depth: 10 mm Next, the surface roughness of the cut surface (specifically, bottom surface of the groove) was measured using a 3D shape measuring machine VR-3200 manufactured by KEYENCE CORPORATION. The observation magnification was 12 times, and the actual size of the measurement region was in the range of about 18 mm×24 mm. This range corresponds to the entire region of the observation surface. As the surface roughness, an arithmetic average surface roughness Sa and a maximum surface roughness Sz were measured. The arithmetic average surface roughness Sa is an average value of irregularities with respect to a reference surface, and the maximum surface roughness Sz is a difference between the highest point and the lowest point.

The results of performing the machining showed that in all examples, the arithmetic average surface roughness Sa of the cut surface was 20 μm or less, and the maximum surface roughness Sz of the cut surface was 500 μm or less. That is, the porous materials of examples were excellent in smoothness of the cut surface. The cut surface was visually evaluated, and the results showed that in any of examples, the edge portion (i.e., right angle portions formed by a porous material surface and the groove in the upper portion of the groove) in the porous material was not chipped or cracked.

The above results revealed that in examples, the porous material enabled the processing rate to be sufficiently high during machining, and even under the condition of a high processing rate during machining, a cut surface excellent in smoothness was formed without occurrence of chipping, cracking, or the like in the porous material. Therefore, the porous material can be suitably used for forming a machined product.

The average cell diameter of the porous material of each of examples is sufficiently smaller than the particle size of silica sand used in a sand mold. Therefore, the porous material is suitable for a casting model, and particularly suitable for a wooden model used for forming a sand mold. When the machined products of the porous materials of examples are used as casting models, it is not necessarily required to provide a coating layer. Since the porous materials of examples have a small average cell diameter, a machined product having a clear appearance and high designability is obtained by machining.

In Comparative Example 2-1, which is an example in which the addition amount of the crosslinking agent A is large, stiffness and toughness are insufficient. In Comparative Example 1, in particular, toughness is very low.

In Comparative Example 2-2, which is an example in which the addition amount of the crosslinking agent A is small, stiffness was insufficient.

In Comparative Example 2-3, which is an example in which the total amount of the crosslinking agent A and the crosslinking agent B (i.e., the addition amount of the crosslinking agent) is large, toughness was insufficient.

In Comparative Example 2-4, which is an example in which the total amount of the crosslinking agent A and the crosslinking agent B (i.e., the addition amount of the crosslinking agent) is small, stiffness was insufficient.

In Comparative Example 2-5, which is an example in which the ratio of the addition amount of the crosslinking agent A to the addition amount of the crosslinking agent B is large, toughness was insufficient.

In Comparative Example 2-6, which is an example in which the ratio of the addition amount of the crosslinking agent A to the addition amount of the crosslinking agent B is small, stiffness was insufficient.

In Comparative Example 2-7, which is an example in which DVB was used alone as the crosslinking agent, stiffness and toughness were insufficient.

In Comparative Example 2-8, which is an example in which PEGDA was used alone as the crosslinking agent, stiffness was insufficient.

In Comparative Example 2-9, which is an example in which a compound having a functional group equivalent of more than 130 g/mol (specifically, 1,9-NDODA) was used as the crosslinking agent A (specifically, hard crosslinking agent), stiffness was insufficient.

In Comparative Example 2-10, which is an example in which a compound having a functional group equivalent of 130 g/mol or less (specifically, 1,6-HDODA) was used as the crosslinking agent B (specifically, soft crosslinking agent), toughness was insufficient.

In Comparative Examples 2-9 and 2-10, the hard crosslinking agent is a crosslinking agent having a relatively small functional group equivalent, and the soft crosslinking agent is a crosslinking agent having a relatively large functional group equivalent.

Hereinafter, examples of the HIPE foam according to the first aspect and the impact absorbing material according to the third aspect of the present disclosure, and comparative examples will be described. An impact absorbing material 4 includes a HIPE foam 1 (see FIGS. 4(a) to 4(c)). In the examples, HIPE foams shown in examples in Tables 8 to 10 and comparative examples in Tables 11 and 12 were produced by the following methods. The HIPE foams in the present disclosure are not limited to the following examples, and the configuration can be changed as appropriate within the spirit of the present disclosure. "%" in examples means wt %.

Example 3-1

First, a glass vessel equipped with a stirrer with a torque converter and having an internal volume of 3 L was charged with 44 g of styrene and 25 g of butyl acrylate as vinyl-based monomers, 16 g of divinyl benzene having a purity of 57% (9.12 g as divinylbenzene) as a hard crosslinking agent (hereinafter, referred to as a first crosslinking agent), 5 g of polyethylene glycol diacrylate (specifically, NK Ester A-400 manufactured by Shin-Nakamura Chemical Co., Ltd./purity: 95%) (4.75 g as polyethylene glycol diacrylate) as a soft crosslinking agent (hereinafter, referred to as a second crosslinking agent), 10 g of polyglycerol polyricinoleate (specifically, CRS-75 manufactured by Sakamoto Yakuhin Kogyo Co., Ltd.) as an emulsifier, 0.5 g of dilauroyl peroxide as a polymerization initiator, 5 g of a brominated bisphenol A derivative (specifically, SR-130 manufactured by DKS Co. Ltd.: 2,2-bis(4-(2,3-dibromo-2-methylpropoxy)-3,5-dibromophenyl)propane) as a bromine-based flame retardant, and 1 g of dicumyl peroxide as a flame retardant auxiliary. These substances were mixed in a glass vessel to form an organic phase.

2400 g of deionized water was added at a rate of about 450 g/min while the organic phase was stirred at a stirring power density of 1.6 kW/m$^3$. Even after the addition of deionized water was completed, stirring was continued for 10 minutes to prepare a water-in-oil (i.e., W/O) high internal phase emulsion. The stirring power density after completion of emulsification was 1.4 kW/m$^3$. The stirring power density (kW/m$^3$) can be determined by calculating a power (kW) from the torque (N·m) and the rotation speed (rpm) of the stirrer, and dividing the power by the volume (m$^3$) of the contents.

The stirring power density was then reduced to 0.1 kW/m$^3$. An aspirator was then connected to the glass vessel, and the inside of the vessel was decompressed to remove microbubbles contained in the emulsion. Ten minutes after the start of the decompression, stirring was stopped, and the inside of the vessel was returned to atmospheric pressure.

A vessel having a length of about 250 mm, a width of about 180 mm, and a depth of about 90 mm was filled with the contents of the glass vessel (high internal phase emulsion). The vessel was placed in an oven adjusted to 70° C., and the vinyl-based monomer and the like were polymerized for about 18 hours to obtain a HIPE foam containing water. The vessel was removed from the oven and cooled to room temperature.

After the cooling, the HIPE foam was removed from the vessel and washed with water. The HIPE foam was dewatered, and the HIPE foam was then dried to a constant weight in an oven at 85° C. In this way, a rectangular parallelepiped-shaped HIPE foam (specifically, impact absorbing material) including a vinyl-based crosslinked polymer was obtained. The apparent density of this HIPE foam was 41 g/L (i.e., 41 kg/m$^3$).

Table 8 shows a preparation composition and the like in this example. The contents of various components (the vinyl-based monomer and the crosslinking agent) in the crosslinked polymer can be determined from the blending amounts of various components (for the crosslinking agent, the blending amount with the exclusion of impurities) during preparation and the total blending amount of the vinyl-based monomer component and the crosslinking agent component (with the exclusion of impurities).

In the table, compound names are abbreviated as follows.

St: styrene
BA: butyl acrylate
IBOMA: isobornyl methacrylate
DVB: divinylbenzene
PEGDA: polyethylene glycol diacrylate
PGPR: polyglycerol polyricinoleate LPO: dilauroyl peroxide LTCP: di(4-t-butylcyclohexyl)peroxydicarbonate Brominated BPA: brominated bisphenol A derivatives DCP: dicumyl peroxide

Examples 3-2 to 3-13 and Comparative Examples 3-1 to 3-8

HIPE foams were produced in the same manner as in Example 3-1 except that the preparation composition was changed as shown in Tables 8 to 10.

In Example 3-4, the stirring power density during stirring of the organic phase was 3.0 kW/m$^3$, and the stirring power density after completion of emulsification was 2.6 kW/m$^3$. In Example 3-5, the stirring power density during stirring of the organic phase was 0.04 kW/m$^3$, and the stirring power density after completion of emulsification was 0.03 kW/m$^3$. In Example 3-6, the stirring power density during stirring of the organic phase was 5.0 kW/m$^3$, and the stirring power density after completion of emulsification was 4.4 kW/m$^3$. In Example 3-7, the stirring power density during stirring of the organic phase was 0.23 kW/m$^3$, and the stirring power density after completion of emulsification was 0.20 kW/m$^3$. In Comparative Example 3-3, the stirring power density during stirring of the organic phase was 7.8 kW/m$^3$, and the stirring power density after completion of emulsification was 6.9 kW/m$^3$. In Comparative Example 3-4, the stirring power density during stirring of the organic phase was 0.02 kW/m$^3$, and the stirring power density after completion of emulsification was 0.01 kW/m$^3$. In Comparative Example 3-5, the stirring power density during stirring of the organic phase was 0.04 kW/m$^3$, and the stirring power density after completion of emulsification was 0.03 kW/m$^3$.

[Evaluation]

For Examples 3-1 to 3-13 and Comparative Examples 3-1 to 3-8, measurement and evaluation were performed as described below. Tables 8 to 12 show the results.

(Apparent Density: ρ)

The measurement method is the same as that for the HIPE foams of Examples 1-1 to 1-13 and Comparative Examples 1-1 to 1-6.

(Glass Transition Temperature: Tg)

In accordance with JIS K 7121:1987, Tg was calculated by differential scanning calorimetry (i.e., DSC) analysis using the following method. DSC 250 manufactured by TA Instruments Japan was used as a measuring apparatus. First, about 2 mg of a test piece was taken from the vicinity of the center of the HIPE foam. The test piece taken was left standing for 24 hours or more in a constant-temperature and constant-humidity chamber at a temperature of 23° C. and a humidity of 50%. As conditioning of a test piece, that in "(3) Measurement of glass transition temperature after certain heat treatment" was adopted. Specifically, the test piece was heated at a temperature rising rate of 10° C./min to a temperature higher by about 30° C. than the temperature at the end of glass transition, held at this temperature for 10 minutes, and then cooled at a cooling rate of 20° C./min to a temperature lower by about 50° C. than the glass transition temperature to condition the test piece. A DSC measurement was then performed on the conditioned test piece under the condition of a heating rate of 20° C./min to obtain a DSC curve. For example, in measurement of Tg of the HIPE foam of Example 3-1, the test piece was heated to 105° C., held at this temperature for 10 minutes, and then cooled to 20° C. This temperature was maintained for 10 minutes to stabilize the apparatus, and DSC measurement was then performed at a temperature rising rate of 10° C./min up to a temperature higher by about 30° C. than a temperature at the end of glass transition to obtain a DSC curve. The midpoint glass transition temperature was determined from this DSC curve, and this value was taken as a glass transition temperature Tg. The measurement temperature range in Examples 3-1 to 3-13 and Comparative Examples 3-1 to 3-8 was from 0° C. to 185° C.

(Molecular Weight Between Crosslinking Points: Mc)

Three test pieces each having a cubic shape of 10 mm×10 mm×10 mm and having no skin layer were cut out from the vicinity of the center of the HIPE foam. The storage elastic modulus E' in the temperature region of 0 to 200° C. was measured by performing dynamic mechanical analysis (DMA) on the three test pieces. DMA 7100 manufactured by Hitachi High-Tech Science Corporation was used as a measuring apparatus. Details of the measurement conditions are as follows.

Deformation mode: compression

Temperature: 0 to 200° C.

Temperature rising rate: 5° C./min

Frequency: 1 Hz

Load: 98 mN

The molecular weight between crosslinking points Mc was calculated in the same manner as in Examples 1-1 to 1-13 and Comparative Examples 1-1 to 1-6 except that the storage elastic modulus E' at a rubber-like flat portion and the temperature T, which had been measured by dynamic mechanical analysis on each of the three test pieces, were used.

(Average Diameter of Cells, i.e., Average Cell Diameter)

The measurement method is the same as that for the HIPE foams of Examples 1-1 to 1-13 and Comparative Examples 1-1 to 1-6. The observation condition in the low-vacuum scanning electron microscope was set to observation condition: surface (low magnification). Typical examples of the picture of a cross-section (magnification: 500 times) in examples and comparative examples are shown in FIGS. 4(a) to 4(c).

(Average Diameter of Through-Holes)

A picture of a cross-section was taken in the same manner as in the case of the cell diameter except that the observation magnification was changed to 500 times and the observation mode was changed to a reflected electron method (standard). Next, the taken picture of a cross-section was analyzed with image processing software (WinROOF 2013 manufactured by MITANI CORPORATION), and the average through-hole diameter of each sample was determined. The obtained three average through-hole diameters were arithmetically averaged to determine the average diameter of through-holes of the HIPE foam. Detailed analysis procedures and conditions were as follows.

(1) Monochrome image formation (2) Leveling filter (filter size=3×3, number of processings=1)

(3) Automatic binarization (discriminant analysis method, extraction region=dark region, target concentration range=0 to 255)

(4) Adjustment of morphology (expansion, number of times=3)

(5) Measurement from shape characteristic (measurement item=circle equivalent diameter, number of pieces)

(Average Value of Numbers of Cells Per Unit Area)

The total number of cells obtained in the measurement of the average diameter of cells was divided by the observation area (specifically, area of 7.68 mm$^2$ with a length of 2.4 mm and a width of 3.2 mm in an observed image at a magnification of 50 times) of the actual SEM image to calculate the number of cells per unit area. The obtained three numbers of cells per unit area were arithmetically averaged to determine the average value of the numbers of cells per unit area.

(Average Value of Numbers of Through-Holes Per Unit Area)

The total number of through-holes obtained in the measurement of the average diameter of through-holes was divided by the observation area (specifically, area of 76800 $\mu m^2$ with a length of 240 $\mu m$ and a width of 320 $\mu m$ in an observed image at a magnification of 500 times) of the actual SEM image to calculate the number of through-holes per unit area. The obtained three numbers of through-holes per unit area were arithmetically averaged to determine the average value of the numbers of through-holes per unit area.

(Ratio of Cell Wall Equivalent Thickness t of HIPE Foam to Apparent Density of HIPE Foam)

The calculated apparent density of the HIPE foam, the average diameter of cells of the HIPE foam, and the density of a base material resin forming the HIPE foam were substituted into the following expression ($\alpha$) to calculate the cell wall equivalent thickness t ($\mu m$) of the HIPE foam. The density of the base material resin in examples and comparative examples is $1.1 \times 10^3$ kg/m³. In the expression ($\alpha$), d is an average diameter of cells of the HIPE foam, X=$\rho s/\rho f$, $\rho s$ is a density of the base material resin, and $\rho f$ is an apparent density of the HIPE foam.

$$t = d[(X/(X-1))^{1/3} - 1] \tag{$\alpha$}$$

The calculated cell wall equivalent thickness t ($\mu m$) of the HIPE foam was divided by the apparent density (kg/m³) of the HIPE foam to calculate the ratio of the cell wall equivalent thickness t of the HIPE foam to the apparent density of the HIPE foam (m/[kg/m³]).

(Closed-Cell Ratio)

Three test pieces having a size of 25 mm×25 mm×25 mm and having no skin layer were cut out from the vicinity of the center of the HIPE foam. In accordance with JIS K 7138: 2006, the closed-cell ratio of a test piece (HIPE foam) was measured by a pressure change method (pycnometer method). For the measurement, an air-comparison pycnometer Model 1000 manufactured by Tokyo-Science. Co, Ltd was used. The closed-cell ratio of each test piece was determined from the following expression (IV), and the average value for three test pieces was adopted as a closed-cell ratio of the HIPE foam.

$$\text{Closed cell ratio } [\%] = (Vx - W/\rho)/(Va - W/\rho) \times 100 \tag{IV}$$

In expression (IV), Vx is a true volume [mL] of the HIPE foam as measured by the above-described method, Va is an apparent volume [mL] of the HIPE foam, W is a weight [g] of the test piece, and $\rho$ is a specific gravity [–] of the resin forming the HIPE foam.

In the table, "<1" means that the closed-cell ratio is less than 1%, and ">95" means that the closed-cell ratio is more than 95%.

From the viewpoint of easily suppressing a change in compression properties due to an increase in strain amount, the closed-cell ratio of the HIPE foam is preferably 10% or less, more preferably 5% or less, still more preferably 3% or less, particularly preferably less than 1%.

(Compressive Elastic Modulus: E, Compressive Stress at a Strain of 10%: $\sigma 10$, Compressive Stress at a Strain of 50%: $\sigma 50$, Etc.)

Test pieces having a size of 25 mm×50 mm×50 mm and having no skin layer were cut out from the vicinity of the center of the HIPE foam. Using these test pieces, a compression test was conducted. Specifically, the elastic modulus, the compressive stress at a strain of 10% ($\sigma 10$), the compressive stress at a strain of 50% (($50$), and the like were measured in accordance with JIS K 6767:1999 using a tabletop precision universal tester (specifically, Autograph AGS-10 kNX manufactured by Shimadzu Corporation). Herein, the compressive stress at a strain of x % is expressed as $\sigma x$. Since the magnitude of the compressive elastic modulus E is highly dependent on the apparent density $\rho$, the value E/$\rho$ of the compressive elastic modulus per apparent density was calculated by dividing the compressive elastic modulus by the apparent density of the test piece. Details of the compression test are as follows.

Room temperature: 23° C.

Humidity: 50%

Test piece size: length: 50 mm, width: 50 mm, and thickness: 25 mm

Compression rate 10 mm/min

Compression ratio 0 to 80%

(Energy Absorption Capacity EA)

The energy absorption capacity is represented by the area of a load-displacement curve (i.e., compression waveform).

The energy absorption capacity (EA) in a region from a strain amount of 0% to a strain amount of 50% in a load-displacement curve measured by the compression test was calculated. The energy absorption capacity per unit weight EA/[V·$\rho$] was calculated from the energy absorption amount EA, and the volume V and the apparent density $\rho$ of the HIPE foam used in the compression test.

From the viewpoint of obtaining an excellent energy absorption characteristic and reducing the component weight of the impact absorbing material, the energy absorption capacity EA/[V·$\rho$] is preferably 1.0 J/g or more, more preferably 1.5 J/g or more, still more preferably 2.0 J/g or more. From the viewpoint of ensuring that the impact absorbing material is not excessively hard, can moderately absorb an impact, and facilitates the security of passengers at the time of collision when used as an automobile material, the energy absorption capacity EA/[V·$\rho$] is preferably 5.0 J/g or less, more preferably 4.0 J/g or less, still more preferably 3.0 J/g or less.

(Charpy Impact Strength: S)

The measurement method is the same as that for the HIPE foams of Examples 1-1 to 1-13 and Comparative Examples 1-1 to 1-6. Charpy impact strength was measured for five test pieces cut out from the HIPE foam and having no skin layer, and the average value of the measured Charpy impact strengths was adopted as the Charpy impact strength of the HIPE foam.

From the viewpoint of suppressing excessive embrittlement of the HIPE foam and easily enhancing handleability as an impact absorbing material, the value of Charpy impact strength is preferably 100 J/m² or more, more preferably 150 J/m² or more, still more preferably 200 J/m² or more.

TABLE 8

| Example No. | | | Example 3-1 | Example 3-2 | Example 3-3 | Example 3-4 |
|---|---|---|---|---|---|---|
| Organic Phase (Continuous Phase) [parts by weight] | Vinyl-based Monomer | St | 44 | 45 | 47.5 | 45 |
| | | BA | 25 | 24.5 | 25.5 | 24.5 |
| | First Crosslinking Agent | DVB | 16 | 15.5 | 14.5 | 15.5 |
| | Second Crosslinking Agent | PEGDA | 5 | 5 | 5 | 5 |
| | Emulsifier | PGPR | 10 | 10 | 7.5 | 10 |
| | Polymerization Initiator | LPO | 0.5 | 0.5 | 1 | 1 |
| | | LTCP | — | 0.5 | — | — |
| | Additive | Brominated BPA | 5 | 15 | — | — |
| | | DCP | 1 | 1 | — | — |
| | Net Blending Amount of First Crosslinking Agent Based on 100 Parts by Weight of (T)* | | 11 | 11 | 10 | 11 |
| | Net Blending Amount of Second Crosslinking Agent Based on 100 Parts by Weight of (T)* | | 5.7 | 5.7 | 5.5 | 5.7 |
| | Net Blending Amount of First Crosslinking Agent/ Net Blending Amount of Second Crosslinking Agent | | 1.9 | 1.9 | 1.7 | 1.9 |
| Aqueous Phase (Dispersed Phase) [Parts by Weight] | | Purified Water | 2400 | 1900 | 1000 | 1900 |
| Physical Properties | Apparent Density: $\rho$ [kg/m$^3$] | | 41 | 52 | 89 | 52 |
| | Average Cell Diameter: $\Phi_1$ [μm] | | 48 | 44 | 33 | 31 |
| | Average Diameter of Through-holes: $\Phi_2$ [μm] | | 12 | 11 | 9 | 10 |
| | $\Phi_1[]/\Phi_2[]$ | | 4.0 | 4.1 | 3.7 | 3.1 |
| | Average Value of Numbers of Cells per Unit Area [pieces/mm$^2$] | | 580 | 650 | 1070 | 1000 |
| | Average Value of Numbers of Through-holes per Unit Area [pieces/mm$^2$] | | 3150 | 3420 | 3630 | 4190 |
| | Average Cell Wall Thickness: t [μm] | | 0.61 | 0.72 | 0.94 | 0.50 |
| | t/$\rho$ [μm/(kg/m$^3$)] | | 0.015 | 0.014 | 0.011 | 0.010 |
| | Closed-cell Ratio [%] | | <1 | <1 | <1 | <1 |
| | Glass Transition Temperature: Tg [° C.] | | 68 | 69 | 69 | 70 |
| | Molecular Weight Between Crosslinking Points: Mc | | 7950 | 7120 | 5860 | 7250 |
| | Compressive Elastic Modulus: E [kPa] | | 2740 | 4330 | 12330 | 4670 |
| | E/$\rho$ [N · m/kg] | | 67 | 83 | 139 | 90 |
| | $\sigma$ 10 [kPa] | | 80 | 131 | 462 | 149 |
| | $\sigma$ 20 [kPa] | | 83 | 135 | 464 | 151 |
| | $\sigma$ 30 [kPa] | | 87 | 141 | 490 | 158 |
| | $\sigma$ 40 [kPa] | | 94 | 152 | 532 | 172 |
| | $\sigma$ 50 [kPa] | | 106 | 172 | 605 | 198 |
| | $\sigma$ 60 [kPa] | | 134 | 220 | 792 | 254 |
| | $\sigma$ 70 [kPa] | | 201 | 340 | 1273 | 386 |
| | $\sigma$ 10/$\sigma$ 30 | | 0.92 | 0.93 | 0.94 | 0.94 |
| | $\sigma$ 10/$\sigma$ 50 | | 0.75 | 0.76 | 0.76 | 0.75 |
| | $\sigma$ 10/$\sigma$ 60 | | 0.60 | 0.60 | 0.58 | 0.59 |
| | $\sigma$ 10/$\sigma$ 70 | | 0.40 | 0.39 | 0.36 | 0.39 |
| | Energy Absorption Capacity (Strain: 0 to 50%): EA[J] | | 2.7 | 4.3 | 15.7 | 5.1 |
| | EA/[V · $\rho$][J/g] | | 1.05 | 1.32 | 2.82 | 1.57 |
| | Charpy impact strength: S [J/m$^2$] | | 138 | 261 | 501 | 181 |

(T)*: Total amount of vinyl-based monomer and crosslinking agent (net blending amount)

TABLE 9

| Example No. | | | Example 3-5 | Example 3-6 | Example 3-7 | Example 3-8 |
|---|---|---|---|---|---|---|
| Organic Phase (Continuous Phase) [Parts by Weight] | Vinyl-based Monomer | St | 45 | 47.5 | 47.5 | 57 |
| | | BA | 24.5 | 25.5 | 25.5 | 12.5 |
| | First Crosslinking Agent | DVB | 15.5 | 14.5 | 14.5 | 15.5 |
| | Second Crosslinking Agent | PEGDA | 5 | 5 | 5 | 5 |
| | Emulsifier | PGPR | 10 | 7.5 | 7.5 | 10 |
| | Polymerization Initiator | LPO | 1 | 1 | 1 | 1 |
| | Additive | Brominated BPA | — | — | — | — |
| | | DCP | — | — | — | — |
| | Net Blending Amount of First Crosslinking Agent Based on 100 Parts by Weight of (T)* | | 11 | 10 | 10 | 11 |
| | Net Blending Amount of Second Crosslinking Agent Based on 100 Parts by Weight of (T)* | | 5.7 | 5.5 | 5.5 | 5.7 |
| | Net Blending Amount of First Crosslinking Agent/ Net Blending Amount of Second Crosslinking Agent | | 1.9 | 1.7 | 1.7 | 1.9 |
| Aqueous Phase (Dispersed Phase) [Parts by Weight] | | Purified Water | 1900 | 1000 | 1000 | 1900 |
| Physical Properties | Apparent Density: $\rho$ [kg/m$^3$] | | 46 | 90 | 86 | 49 |
| | Average Cell Diameter: $\Phi_1$ [μm] | | 90 | 22 | 65 | 39 |
| | Average Diameter of Through-holes: $\Phi_2$ [μm] | | 19 | 7 | 14 | 10 |
| | $\Phi_1[]/\Phi_2[]$ | | 4.7 | 3.1 | 4.6 | 3.9 |
| | Average Value of Numbers of Cells per Unit Area [pieces/mm$^2$] | | 150 | 1970 | 340 | 700 |
| | Average Value of Numbers of Through-holes per Unit Area [pieces/mm$^2$] | | 1120 | 6420 | 1560 | 2510 |
| | Average Cell Wall Thickness: t [μm] | | 1.3 | 0.63 | 1.8 | 0.60 |
| | t/$\rho$ [μm/(kg/m$^3$)] | | 0.028 | 0.0071 | 0.021 | 0.012 |
| | Closed-cell Ratio [%] | | <1 | <1 | <1 | <1 |
| | Glass Transition Temperature: Tg [° C.] | | 69 | 73 | 69 | 99 |
| | Molecular Weight Between Crosslinking Points: Mc | | 7310 | 5900 | 5720 | 8940 |
| | Compressive Elastic Modulus: E [kPa] | | 3100 | 11630 | 12040 | 4600 |
| | E/$\rho$ [N · m/kg] | | 67 | 129 | 140 | 94 |
| | $\sigma$ 10 [kPa] | | 110 | 427 | 414 | 171 |
| | $\sigma$ 20 [kPa] | | 118 | 429 | 434 | 178 |
| | $\sigma$ 30 [kPa] | | 126 | 454 | 465 | 186 |
| | $\sigma$ 40 [kPa] | | 135 | 495 | 504 | 200 |
| | $\sigma$ 50 [kPa] | | 152 | 570 | 559 | 228 |
| | $\sigma$ 60 [kPa] | | 197 | 748 | 676 | 290 |
| | $\sigma$ 70 [kPa] | | 311 | 1202 | 1069 | 444 |
| | $\sigma$ 10/$\sigma$ 30 | | 0.87 | 0.94 | 0.89 | 0.92 |
| | $\sigma$ 10/$\sigma$ 50 | | 0.72 | 0.75 | 0.74 | 0.75 |
| | $\sigma$ 10/$\sigma$ 60 | | 0.56 | 0.57 | 0.61 | 0.59 |
| | $\sigma$ 10/$\sigma$ 70 | | 0.35 | 0.36 | 0.39 | 0.39 |
| | Energy Absorption Capacity (Strain: 0 to 50%): EA[J] | | 3.9 | 14.4 | 14.5 | 5.6 |
| | EA/[V · $\rho$][J/g] | | 1.36 | 2.56 | 2.70 | 1.83 |
| | Charpy impact strength: S [J/m$^2$] | | 122 | 410 | 280 | 190 |

(T)*: Total amount of vinyl-based monomer and crosslinking agent (net blending amount)

TABLE 10

| Example No. | | | Example 3-9 | Example 3-10 | Example 3-11 | Example 3-12 | Example 3-13 |
|---|---|---|---|---|---|---|---|
| Organic Phase (Continuous Phase) | Vinyl-based Monomer | St | 69.5 | 49.5 | 71 | 37 | 48 |
| | | BA | — | — | 12.5 | 28 | 26.5 |
| | | IBOMA | — | 20 | — | — | — |
| | First Crosslinking Agent | DVB | 15.5 | 15.5 | 1.5 | 20 | 15.5 |
| | Second Crosslinking Agent | PEGDA | 5 | 5 | 5 | 5 | — |
| | Emulsifier | PGPR | 10 | 10 | 10 | 10 | 10 |
| | Polymerization Initiator | LPO | 1 | 1 | 1 | 1 | 1 |
| | Additive | Brominated BPA | — | — | — | — | — |
| | | DCP | — | — | — | — | — |
| | Net Blending Amount of First Crosslinking Agent Based on 100 Parts by Weight of (T)* | | 11 | 11 | 1 | 14 | 11 |
| | Net Blending Amount of Second Crosslinking Agent Based on 100 Parts by Weight of (T)* | | 5.7 | 5.7 | 5.3 | 5.9 | — |
| | Net Blending Amount of First Crosslinking Agent/ Net Blending Amount of Second Crosslinking Agent | | 1.9 | 1.9 | 0.2 | 2.4 | — |
| Aqueous Phase (Dispersed Phase) [Parts by Weight] | Purified Water | | 1900 | 1900 | 1900 | 1900 | 1900 |
| Physical Properties | Apparent Density: $\rho$ [kg/m$^3$] | | 48 | 49 | 53 | 48 | 50 |
| | Average Cell Diameter: $\Phi_1$ [μm] | | 37 | 35 | 46 | 43 | 38 |
| | Average Diameter of Through-holes: $\Phi_2$ [μm] | | 11 | 10 | 10 | 11 | 10 |
| | $\Phi_1[]/\Phi_2[]$ | | 3.4 | 3.5 | 4.6 | 3.9 | 3.8 |
| | Average Value of Numbers of Cells per Unit Area [pieces/mm$^2$] | | 770 | 850 | 520 | 590 | 840 |
| | Average Value of Numbers of Through-holes per Unit Area [pieces/mm$^2$] | | 3250 | 2720 | 2030 | 2890 | 3660 |
| | Average Cell Wall Thickness: t [μm] | | 0.55 | 0.54 | 0.76 | 0.64 | 0.59 |
| | t/$\rho$ [μm/(kg/m$^3$)] | | 0.012 | 0.011 | 0.014 | 0.013 | 0.012 |
| | Closed-cell Ratio [%] | | <1 | <1 | <1 | <1 | <1 |
| | Glass Transition Temperature: Tg [° C.] | | 127 | 145 | 67 | 68 | 75 |
| | Molecular Weight Between Crosslinking Points: Mc | | 9670 | 8300 | 154800 | 4410 | 10200 |
| | Compressive Elastic Modulus: E [kPa] | | 4780 | 5790 | 3720 | 3050 | 4780 |
| | E/$\rho$ [N · m/kg] | | 100 | 118 | 70 | 64 | 96 |
| | $\sigma$ 10 [kPa] | | 191 | 228 | 139 | 113 | 168 |
| | $\sigma$ 20 [kPa] | | 208 | 224 | 136 | 116 | 167 |
| | $\sigma$ 30 [kPa] | | 218 | 228 | 142 | 122 | 174 |
| | $\sigma$ 40 [kPa] | | 233 | 236 | 152 | 132 | 186 |
| | $\sigma$ 50 [kPa] | | 267 | 259 | 175 | 150 | 207 |
| | $\sigma$ 60 [kPa] | | 338 | 337 | 236 | 193 | 263 |
| | $\sigma$ 70 [kPa] | | 510 | 510 | 380 | 303 | 396 |
| | $\sigma$ 10/$\sigma$ 30 | | 0.88 | 1.00 | 0.98 | 0.93 | 0.97 |
| | $\sigma$ 10/$\sigma$ 50 | | 0.72 | 0.88 | 0.79 | 0.75 | 0.81 |
| | $\sigma$ 10/$\sigma$ 60 | | 0.57 | 0.68 | 0.59 | 0.59 | 0.64 |
| | $\sigma$ 10/$\sigma$ 70 | | 0.37 | 0.45 | 0.37 | 0.37 | 0.42 |
| | Energy Absorption Capacity (Strain: 0 to 50%): EA[J] | | 6.5 | 6.9 | 4.6 | 3.8 | 5.5 |
| | EA/[V · $\rho$][J/g] | | 2.17 | 2.25 | 1.39 | 1.27 | 1.76 |
| | Charpy impact strength: S [J/m$^2$] | | 151 | 122 | 568 | 195 | 257 |

(T)*: Total amount of vinyl-based monomer and crosslinking agent (net blending amount)

TABLE 11

| Example No. | | | Comparative Example 3-1 | Comparative Example 3-2 | Comparative Example 3-3 | Comparative Example 3-4 |
|---|---|---|---|---|---|---|
| Organic Phase (Continuous Phase) [Parts by Weight] | Vinyl-based Monomer | St | 36.5 | 48.5 | 39.5 | 45 |
| | | BA | 26 | 25.5 | 21.5 | 24.5 |
| | First Crosslinking Agent | DVB | 17.5 | 13.5 | 14 | 15.5 |
| | Second Crosslinking Agent | PEGDA | 5 | 5 | 5 | 5 |
| | Emulsifier | PGPR | 15 | 7.5 | 20 | 10 |
| | Polymerization Initiator | LPO | 1 | 1 | 1 | 1 |
| | Additive | Brominated BPA | — | — | — | — |
| | | DCP | — | — | — | — |
| | Net Blending Amount of First Crosslinking Agent Based on 100 Parts by Weight of (T)* | | 13 | 9 | 11 | 11 |
| | Net Blending Amount of Second Crosslinking Agent Based on 100 Parts by Weight of (T)* | | 6.2 | 5.5 | 6.4 | 5.7 |
| | Net Blending Amount of First Crosslinking Agent/ Net Blending Amount of Second Crosslinking Agent | | 2.1 | 1.6 | 1.7 | 1.9 |
| Aqueous Phase (Dispersed Phase) [Parts by Weight] | Purified Water | | 3200 | 800 | 1900 | 1900 |
| Physical Properties | Apparent Density: $\rho$ [kg/m$^3$] | | 30 | 110 | 47 | 46 |
| | Average Cell Diameter: $\Phi_1$ [μm] | | 49 | 30 | 18 | 119 |
| | Average Diameter of Through-holes: $\Phi_2$ [μm] | | 14 | 7 | 8 | 23 |
| | $\Phi_1[]/\Phi_2[]$ | | 3.5 | 4.3 | 2.3 | 5.2 |
| | Average Value of Numbers of Cells per Unit Area [pieces/mm$^2$] | | 517 | 1110 | 2590 | 100 |
| | Average Value of Numbers of Through-holes per Unit Area [pieces/mm$^2$] | | 3050 | 5280 | 7470 | 660 |
| | Average Cell Wall Thickness: t [μm] | | 0.45 | 1.1 | 0.26 | 1.7 |
| | t/$\rho$ [μm/(kg/m$^3$)] | | 0.015 | 0.010 | 0.0056 | 0.037 |
| | Closed-cell Ratio [%] | | <1 | <1 | <1 | <1 |
| | Glass Transition Temperature: Tg [° C.] | | 73 | 70 | 79 | 70 |
| | Molecular Weight Between Crosslinking Points: Mc | | 6460 | 4960 | 6500 | 7280 |
| | Compressive Elastic Modulus: E [kPa] | | 450 | 18160 | 400 | 2850 |
| | E/$\rho$ [N · m/kg] | | 15 | 165 | 9 | 62 |
| | $\sigma$ 10 [kPa] | | 24 | 624 | 21 | 100 |
| | $\sigma$ 20 [kPa] | | 26 | 642 | 24 | 112 |
| | $\sigma$ 30 [kPa] | | 29 | 686 | 26 | 123 |
| | $\sigma$ 40 [kPa] | | 32 | 758 | 30 | 134 |
| | $\sigma$ 50 [kPa] | | 38 | 896 | 37 | 153 |
| | $\sigma$ 60 [kPa] | | 49 | 1219 | 51 | 196 |
| | $\sigma$ 70 [kPa] | | 76 | 2028 | 86 | 300 |
| | $\sigma$ 10/$\sigma$ 30 | | 0.83 | 0.91 | 0.81 | 0.81 |
| | $\sigma$ 10/$\sigma$ 50 | | 0.63 | 0.70 | 0.57 | 0.65 |
| | $\sigma$ 10/$\sigma$ 60 | | 0.49 | 0.51 | 0.41 | 0.51 |
| | $\sigma$ 10/$\sigma$ 70 | | 0.32 | 0.31 | 0.24 | 0.33 |
| | Energy Absorption Capacity (Strain: 0 to 50%): EA[J] | | 0.9 | 24.0 | 0.8 | 3.7 |
| | EA/[V · $\rho$][J/g] | | 0.48 | 3.49 | 0.27 | 1.29 |
| | Charpy impact strength: S [J/m$^2$] | | 48 | 550 | 24 | 92 |

(T)*: Total amount of vinyl-based monomer and crosslinking agent (net blending amount)

TABLE 12

| Example No. | | | Comparative Example 3-5 | Comparative Example 3-6 | Comparative Example 3-7 | Comparative Example 3-8 |
|---|---|---|---|---|---|---|
| Organic Phase (Continuous Phase) [Parts by Weight] | Vinyl-based Monomer | St | 47.5 | 29.5 | 77 | 18 |
| | | BA | 25.5 | 40 | 12.5 | 37 |
| | First Crosslinking Agent | DVB | 14.5 | 15.5 | 0.5 | 30 |
| | Second Crosslinking Agent | PEGDA | 5 | 5 | — | 5 |
| | Emulsifier | PGPR | 7.5 | 10 | 10 | 10 |
| | Polymerization Initiator | LPO | 1 | 1 | 1 | 1 |
| | Additive | Brominated BPA | — | — | — | — |
| | | DCP | — | — | — | — |
| | Net Blending Amount of First Crosslinking Agent Based on 100 Parts by Weight of (T)* | | 10 | 11 | 0.3 | 22 |
| | Net Blending Amount of Second Crosslinking Agent Based on 100 Parts by Weight of (T)* | | 5.5 | 5.7 | — | 6.2 |
| | Net Blending Amount of First Crosslinking Agent/ Net Blending Amount of Second Crosslinking Agent | | 1.7 | 1.9 | — | 3.6 |
| Aqueous Phase (Dispersed Phase) [Parts by Weight] | | Purified Water | 1000 | 1900 | 1900 | 1900 |
| Physical Properties | Apparent Density: $\rho$ [kg/m$^3$] | | 84 | 50 | 49 | 47 |
| | Average Cell Diameter: $\Phi_1$ [$\mu$m] | | 130 | 42 | 55 | 44 |
| | Average Diameter of Through-holes: $\Phi_2$ [$\mu$m] | | 25 | 10 | 16 | 11 |
| | $\Phi_1[]/\Phi_2[]$ | | 5.2 | 4.2 | 3.4 | 4.0 |
| | Average Value of Numbers of Cells per Unit Area [pieces/mm$^2$] | | 90 | 610 | 380 | 560 |
| | Average Value of Numbers of Through-holes per Unit Area [pieces/mm$^2$] | | 510 | 3070 | 2050 | 3190 |
| | Average Cell Wall Thickness: t [$\mu$m] | | 3.5 | 0.66 | 0.84 | 0.65 |
| | t/$\rho$ [$\mu$m/(kg/m$^3$)] | | 0.042 | 0.013 | 0.017 | 0.014 |
| | Closed-cell Ratio [%] | | <1 | <1 | <1 | <1 |
| | Glass Transition Temperature: Tg [° C.] | | 71 | 49 | 76 | 66 |
| | Molecular Weight Between Crosslinking Points: Mc | | 5810 | 5870 | 303200 | 2110 |
| | Compressive Elastic Modulus: E [kPa] | | 5710 | 2580 | 930 | 2030 |
| | E/$\rho$ [N · m/kg] | | 68 | 52 | 19 | 43 |
| | $\sigma$ 10 [kPa] | | 204 | 76 | 45 | 79 |
| | $\sigma$ 20 [kPa] | | 243 | 75 | 48 | 82 |
| | $\sigma$ 30 [kPa] | | 279 | 79 | 52 | 87 |
| | $\sigma$ 40 [kPa] | | 323 | 86 | 57 | 92 |
| | $\sigma$ 50 [kPa] | | 380 | 98 | 68 | 102 |
| | $\sigma$ 60 [kPa] | | 481 | 124 | 95 | 128 |
| | $\sigma$ 70 [kPa] | | 748 | 192 | 164 | 200 |
| | $\sigma$ 10/$\sigma$ 30 | | 0.73 | 0.96 | 0.87 | 0.91 |
| | $\sigma$ 10/$\sigma$ 50 | | 0.54 | 0.78 | 0.66 | 0.77 |
| | $\sigma$ 10/$\sigma$ 60 | | 0.42 | 0.61 | 0.47 | 0.62 |
| | $\sigma$ 10/$\sigma$ 70 | | 0.27 | 0.40 | 0.27 | 0.40 |
| | Energy Absorption Capacity (Strain: 0 to 50%): EA[J] | | 8.6 | 2.5 | 1.5 | 2.6 |
| | EA/[V · $\rho$][J/g] | | 1.64 | 0.80 | 0.49 | 0.89 |
| | Charpy impact strength: S [J/m$^2$] | | 150 | 340 | 50 | 73 |

(T)*: Total amount of vinyl-based monomer and crosslinking agent (net blending amount)

As is understood from Tables 10 to 12, the HIPE foams of the examples are excellent in energy absorption capacity per unit weight, and undergo little change in energy absorption performance over a wide strain amount range. Therefore, it can be said that the HIPE foams of the examples are impact absorbing materials excellent in impact absorption performance.

In Comparative Example 3-1, which is an example in which the apparent density is small, the energy absorption capacity per unit weight was insufficient.

In Comparative Example 3-2, which is an example in which the apparent density is large, the compressive load at high strain was high, and energy absorption performance at high strain decreased.

Comparative Examples 3-3 to 3-5 and 3-7 are examples in which the compressive stress ratio σ10/σ50 is small. In these comparative examples, there was a large change in compressive load in association with an increase in strain amount. In Comparative Examples 3-3 and 3-7, the energy absorption capacity per unit weight was insufficient.

Comparative Example 3-6 is an example in which the glass transition temperature is low, and Comparative Example 3-8 is an example in which the molecular weight between crosslinking points is small. In both Comparative Examples 3-6 and 3-8, the energy absorption capacity per unit weight was insufficient.

The invention claimed is:

1. A HIPE foam comprising, as a base material resin:
a crosslinked polymer formed by crosslinking a polymer comprising in polymerized form, (i-a) a styrene-based monomer and/or (i-b) an acryl-based monomer as a vinyl-based monomer which is monofunctional, and (ii) a crosslinking agent comprising a first and a second functional group comprising a vinyl group and/or an isopropenyl group,
wherein a glass transition temperature of the crosslinked polymer is 60° C. or higher,
wherein a molecular weight between crosslinking points of the crosslinked polymer is $2 \times 10^3$ or more and $2 \times 10^4$ or less,
wherein an apparent density p of the HIPE foam is 35 kg/m$^3$ or more and 500 kg/m$^3$ or less,
wherein a value S/ρ of Charpy impact strength S of the HIPE foam per apparent density ρ of the HIPE foam is 4.5 J·m/kg or more, and
wherein a value E'/ρ of a storage elastic modulus E' at 23° C. of the HIPE foam per apparent density ρ of the HIPE foam is 50 kN·m/kg or more.

2. The HIPE foam of claim 1, wherein an average diameter of cells of the HIPE foam is 20 μm or more and 100 μm or less.

3. The HIPE foam of claim 1, wherein an average value of the numbers of cells per unit area in the HIPE foam is 120 cells/mm$^2$ or more and 2400 cells/mm$^2$ or less.

4. The HIPE foam of claim 1, wherein the crosslinked polymer is a copolymer of the styrene-based monomer (i-a) and the acryl-based monomer (i-b), and
wherein the acryl-based monomer (i-b) is an ester of (meth)acrylic acid and an alcohol having 1 to 20 carbon atoms.

5. The HIPE foam of claim 1, wherein the crosslinking agent comprises, in crosslinked form,
a first crosslinking agent having a functional group equivalent of 130 g/mol or less, and
a second crosslinking agent having a functional group equivalent of more than 130 g/mol and 5000 g/mol or less.

6. A machinable material, comprising:
the HIPE foam of claim 1.

7. An impact absorbing material, comprising:
the HIPE foam of claim 1,
wherein a glass transition temperature of the crosslinked polymer is 60° C. or higher,
wherein an apparent density of the HIPE foam is 35 kg/m$^3$ or more and less than 100 kg/m$^3$, and
wherein a ratio of compressive stress at a strain of 10% to compressive stress at a strain of 50% at 23° C. in the HIPE foam is more than 0.70 and 1.0 or less.

8. A method for producing the HIPE foam of claim 1, the method comprising:
forming a high internal phase water-in-oil emulsion in which an aqueous phase comprising water is comprised in an organic phase comprising the styrene-based monomer and/or the acryl-based monomer, a crosslinking agent, an emulsifier, and a polymerization initiator; and
polymerizing the styrene-based monomer (i-a) and/or the acryl-based monomer (i-b) in the emulsion,
wherein the crosslinking agent (ii) comprises a first crosslinking agent having a functional group equivalent of 130 g/mol or less and a second crosslinking agent having a functional group equivalent of more than 130 g/mol and 5000 g/mol or less,
wherein the crosslinking agent (ii) is present in the polymerizing in an amount of 7 parts by weight or more and 27 parts by weight or less, based on a total of 100 parts by weight of the styrene-based monomer (i-a), the acryl-based monomer (i-b), and the crosslinking agent (ii),
wherein the first crosslinking agent is present in the polymerizing in an amount of 3 parts by weight or more and 17 parts by weight or less, based on a total of 100 parts by weight of the styrene-based monomer (i-a), the acryl-based monomer (i-b), and the crosslinking agent (ii), and
wherein a weight ratio of the first crosslinking agent to the second crosslinking agent is 0.3 or more and 5 or less.

9. The method of claim 8, wherein the functional group equivalent of the second crosslinking agent is larger than the functional group equivalent of the first crosslinking agent by 60 g/mol or more.

10. The method of claim 8, wherein the second crosslinking agent is present in the polymerizing in an amount of 2 parts by weight or more and 18 parts by weight or less, based on a total of 100 parts by weight of the styrene-based monomer (i-a), the acryl-based monomer (i-b), and the crosslinking agent (ii).

11. The method of claim 8, wherein the second crosslinking agent is at least one compound selected from the group consisting of polyethylene glycol (meth)acrylate, urethane (meth)acrylate, epoxy (meth)acrylate, and (meth)acrylic-modified silicone.

12. The method of claim 8, wherein the first crosslinking agent is divinylbenzene.

13. The method of claim 8, wherein the acryl-based monomer (i-b) is an ester of (meth)acrylic acid and an alcohol having 1 to 20 carbon atoms.

14. The method of claim 8, wherein a content of the aqueous phase in the high internal phase emulsion is 300 parts by weight or more and 3000 parts by weight or less, based on 100 parts by weight of the organic phase.

15. The method of claim 8, wherein the second crosslinking agent comprises polyethylene glycol (meth)acrylate, urethane (meth)acrylate, epoxy (meth)acrylate, and/or (meth)acrylic-modified silicone.

16. The HIPE foam of claim 1, wherein styrene and/or methyl methacrylate is comprised as the vinyl-based monomer, and wherein the styrene and/or the methyl methacrylate is present in the vinyl-based monomer in an amount of 40 wt % or more.

17. The HIPE foam of claim 1, wherein the crosslinked polymer forming the HIPE foam has a glass transition temperature of 60° C. or higher and 120° C. or lower, and wherein a density of the HIPE foam is in a range of from 70 to 500 kg/m$^3$.

18. The HIPE foam of claim 1, wherein the crosslinked polymer is formed by crosslinking a polymer of the styrene-based monomer (i-a).

19. The HIPE foam of claim 1, wherein the crosslinking agent comprises a vinyl functional group and an isopropenyl functional group.

20. The HIPE foam of claim 1, wherein the crosslinking agent comprises a first vinyl functional group and a second vinyl functional group.

* * * * *